(12) United States Patent
Song et al.

(10) Patent No.: US 12,143,318 B2
(45) Date of Patent: Nov. 12, 2024

(54) COMMUNICATION METHOD AND APPARATUS

(71) Applicant: HUAWEI TECHNOLOGIES CO., LTD., Shenzhen (CN)

(72) Inventors: Sida Song, Beijing (CN); Sha Ma, Beijing (CN); Lutao Gao, Beijing (CN); Lei Gao, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 323 days.

(21) Appl. No.: 17/559,412

(22) Filed: Dec. 22, 2021

(65) Prior Publication Data
US 2022/0116162 A1   Apr. 14, 2022

Related U.S. Application Data

(63) Continuation of application No. PCT/CN2020/098290, filed on Jun. 24, 2020.

(30) Foreign Application Priority Data

Jun. 27, 2019   (CN) .......................... 201910569682.0

(51) Int. Cl.
*H04L 5/00*   (2006.01)
*G01S 5/02*   (2010.01)
(Continued)

(52) U.S. Cl.
CPC .......... *H04L 5/0005* (2013.01); *G01S 5/0246* (2020.05); *G01S 5/0284* (2013.01);
(Continued)

(58) Field of Classification Search
CPC . H04L 5/00; H04L 5/0005; G01S 5/02; G01S 5/0246; G01S 5/00; G01S 5/0284;
(Continued)

(56) References Cited

U.S. PATENT DOCUMENTS

| | | | |
|---|---|---|---|
| 9,223,009 B1 | 12/2015 | Wasiewicz et al. | |
| 2008/0106458 A1* | 5/2008 | Honda | .................... G01S 7/023 342/59 |

(Continued)

FOREIGN PATENT DOCUMENTS

| | | |
|---|---|---|
| CN | 1568032 A | 1/2005 |
| CN | 1808951 A | 7/2006 |

(Continued)

OTHER PUBLICATIONS

Chen Yong et al.,"Research and Development of Automotive Collision Avoidance System",Computer Simulation, 1006-9348( 2006) 12-0239-05,Dec. 2016,with an English abstract,total 5 pages.

*Primary Examiner* — Warner Wong
(74) *Attorney, Agent, or Firm* — Rimon PC

(57) ABSTRACT

This application relates to the field of wireless communications and self-driving/intelligent driving/autonomous driving vehicles, and in particular, to the field of collaborative radars. A first apparatus receives first information from a second apparatus. The first apparatus determines, based on the first information, the priorities of a plurality of time-frequency resources included in a first time-domain range. The first apparatus further selects a first time-frequency resource among the plurality of time-frequency resources. The priority of the first time-frequency resource is the highest among the priorities of the plurality of time-frequency resources. A time-frequency resource with a comparatively high priority is selected to send a radar signal, to reduce a probability of a resource collision, and reduce and/or avoid interference between radars, especially collaborative radars.

19 Claims, 17 Drawing Sheets

(51) Int. Cl.
*H04W 72/0446* (2023.01)
*H04W 72/0453* (2023.01)
*H04W 72/56* (2023.01)
*H04W 74/0833* (2024.01)
*H04L 67/61* (2022.01)

(52) U.S. Cl.
CPC ... *H04W 72/0446* (2013.01); *H04W 72/0453* (2013.01); *H04W 72/56* (2023.01); *H04W 74/0841* (2013.01); *H04L 67/61* (2022.05)

(58) Field of Classification Search
CPC ............... H04W 72/04; H04W 72/044; H04W 72/0446; H04W 72/00; H04W 72/10; H04W 72/0453; H04W 74/0827; H04W 74/0841
See application file for complete search history.

(56) References Cited

U.S. PATENT DOCUMENTS

| | | | |
|---|---|---|---|
| 2015/0282206 A1* | 10/2015 | Kalhan | H04W 72/0446 370/330 |
| 2018/0042018 A1 | 2/2018 | Bhushan et al. | |
| 2018/0295639 A1 | 10/2018 | Bhushan et al. | |
| 2018/0356495 A1 | 12/2018 | Moss et al. | |
| 2019/0069272 A1* | 2/2019 | Tang | H04W 72/0453 |
| 2020/0221446 A1* | 7/2020 | Nam | H04W 72/21 |
| 2021/0400639 A1* | 12/2021 | Lee | H04W 72/02 |
| 2021/0410154 A1* | 12/2021 | Islam | H04L 5/0053 |
| 2022/0078823 A1* | 3/2022 | Li | H04W 72/0446 |
| 2022/0225391 A1* | 7/2022 | Yang | H04W 72/569 |
| 2022/0295524 A1* | 9/2022 | Hong | H04L 1/1861 |
| 2023/0040147 A1* | 2/2023 | Herbertsson | G01S 13/931 |

FOREIGN PATENT DOCUMENTS

| | | | | |
|---|---|---|---|---|
| CN | 101242640 A | | 8/2008 | |
| CN | 102215061 A | | 10/2011 | |
| CN | 108327718 A | | 7/2018 | |
| CN | 108710109 A | | 10/2018 | |
| CN | 110730509 | * | 1/2020 | ............ H04W 72/04 |
| JP | 2007263915 A | | 10/2007 | |
| JP | 2013160585 A | | 8/2013 | |
| WO | WO-2018135905 A1 | * | 7/2018 | ............ H04L 5/001 |
| WO | 2019190788 A1 | | 10/2019 | |

* cited by examiner

COMMUNICATION METHOD AND APPARATUS

CROSS-REFERENCE TO RELATED APPLICATIONS

This application is a continuation of International Application No. PCT/CN2020/098290, filed on Jun. 24, 2020, which claims priority to Chinese Patent Application No. 201910569682.0, filed on Jun. 27, 2019. The disclosures of the aforementioned applications are hereby incorporated by reference in their entireties.

TECHNICAL FIELD

This application relates generally to the field of communications technologies, and in particular, to communication methods and apparatus.

BACKGROUND

With technological developments, an increasing quantity of machines in modern life are developed with automation and artificial intelligence capabilities: cars are no exception. Intelligent cars (e.g., intelligent vehicles, automated vehicles, remotely operated vehicles) are gradually entering the daily lives of people. In recent years, an advanced driving assistant system (ADAS) has played an important role in intelligent cars. During operation of the car, the system uses various sensors installed on the car to sense a surrounding environment and collect data. These sensors also identify, detect, and track static and moving objects, and perform system operations and analysis with reference to map data of a navigator, so that a driver can be aware of possible dangers in advance, thereby effectively improving comfort and safety of operating the car.

In a driverless driving architecture, a sensing layer includes a visual system sensor such as an in-vehicle camera, and a radar system sensor such as an in-vehicle millimeter-wave radar, an in-vehicle laser radar, or an in-vehicle ultrasonic radar. The millimeter-wave radar is the first to become a main sensor of a driverless driving system because of low costs and a comparatively mature technology. Currently, more than 10 functions have been developed for the ADAS, and the in-vehicle millimeter-wave radar is required for adaptive cruise control (ACC), autonomous emergency braking (AEB), lane change assist (LCA), blind spot monitoring (BSD), or the like. A millimeter wave is an electromagnetic wave with a wavelength ranging from 1 mm to 10 mm, and a corresponding frequency range is 30 GHz to 300 GHz. Within this frequency band, features related to the millimeter wave are very suitable for being applied to the in-vehicle field. For example, when a bandwidth is high, frequency-domain resources are abundant and an antenna sidelobe is low: thereby helping implement imaging or quasi-imaging. When the wavelength is short, the size of a radar device and the diameter of an antenna are reduced, and so is the weight. When a beam is narrow, for example the beam of the millimeter wave is much narrower than that of a microwave for a same antenna size, the radar resolution becomes high, and penetration becomes strong. This results in a stronger capability of penetrating smoke, dust, and fog than that of a laser radar or an optical system, so that all-weather operating can be implemented.

With wide application of in-vehicle radars, mutual interference between in-vehicle radars becomes an increasingly serious issue. This mutual interference reduces a detection probability of in-vehicle radars and/or increases a false alarm probability of in-vehicle radars, thereby posing non-negligible impact to safety or comfort of driving a vehicle. Under this premise, how to reduce interference between in-vehicle radars is a technical problem that urgently needs to be resolved.

SUMMARY

Embodiments of this application provide for communication methods and apparatus, to reduce or avoid interference between radars.

According to a first aspect, a first communication method is provided. The method includes: A first apparatus receives first information from a second apparatus. The first apparatus determines, based on the first information, priorities of a plurality of time-frequency resources included in a first time-domain range. The first apparatus determines a first time-frequency resource in the plurality of time-frequency resources. A first priority of the first time-frequency resource is higher (e.g., greater) than a priority of a time-frequency resource other than the first time-frequency resource in the plurality of time-frequency resources. The first time-frequency resource is utilized to send (e.g., provide) a radar signal.

The method may be performed by the first apparatus. The first apparatus may be a processing apparatus, or may be a detection apparatus. For example, the detection apparatus is a radar detection apparatus. For example, the radar detection apparatus is a radar.

In some embodiments of this application, the first apparatus may determine the priorities of the plurality of time-frequency resources included in the first time-domain range, so that a time-frequency resource with a comparatively high priority may be selected to send a radar signal. The time-frequency resource with the comparatively high priority is, for example, a time-frequency resource with a comparatively low possibility of a collision. Therefore, in this manner, a probability of a resource collision can be reduced, so as to reduce or avoid interference between radars.

With reference to the first aspect, in a possible implementation of the first aspect, the first time-domain range is one of a plurality of time-domain ranges, and the plurality of time-domain ranges do not overlap in a time domain.

For example, the first time-domain range may be one of the plurality of time-domain ranges, the plurality of time-domain ranges may be continuous duration, and the radar detection apparatus may send a radio signal with one or more sweep periods in the continuous duration. The plurality of time-domain ranges may be time-divided, in other words, the plurality of time-domain ranges do not overlap in time.

With reference to the first aspect, in a possible implementation of the first aspect, at least two of the plurality of time-frequency resources overlap in a time domain, or the plurality of time-frequency resources do not overlap in a frequency domain.

If the technical solution in some embodiments of this application are applied to a radar capable of collaboration, at least two of the plurality of time-frequency resources may overlap in the time domain, and at least two of the plurality of time-frequency resources may overlap in the frequency domain, or may be identical in the frequency domain. The "overlapping" described herein may be understood as having an intersection but not being identical. Alternatively, if the technical solution in some embodiments of this application are applied to a radar incapable of collaboration, the plurality of time-frequency resources may be time-divided, and may also be frequency-divided. This is equivalent to that the plurality of time-frequency resources are time-divided and frequency-divided.

With reference to the first aspect, in a possible implementation of the first aspect, the first information includes information about at least one object and/or information about a radar detection apparatus carried on the at least one of one or more objects, information about an object of the one or more objects includes at least one of location information or a driving direction of the object, and information about a radar detection apparatus carried on the object includes at least one of a location of the radar detection apparatus in the object or information about a time-frequency resource occupied by the radar detection apparatus. Alternatively, the first information includes the priorities of the plurality of time-frequency resources included in the first time-domain range.

For example, the first apparatus is a processing apparatus, and the second apparatus is a communications apparatus. In this case, the first information may include the information about the at least one object and/or the information about the radar detection apparatus carried on the at least one object. After obtaining the first information, the communications apparatus sends the first information to the processing apparatus, so that the processing apparatus can determine, based on the first information, the priorities of the plurality of time-frequency resources included in the first time-domain range. Alternatively, the first apparatus is a radar detection apparatus, and the second apparatus is a processing apparatus. In this case, the first information may include the information about the at least one object and/or the information about the radar detection apparatus carried on the at least one object. The processing apparatus may send the first information to the radar detection apparatus, and the radar detection apparatus autonomously determines the priorities of the plurality of time-frequency resources based on the first information. In this case, the radar detection apparatus has a comparatively strong processing capability. Alternatively, the first apparatus is a radar detection apparatus, the second apparatus is a processing apparatus, and the first information may include the priorities of the plurality of time-frequency resources included in the first time-domain range. This is equivalent to that the processing apparatus may determine the priorities of the plurality of time-frequency resources, the processing apparatus may send the priorities of the plurality of time-frequency resources to the radar detection apparatus after determining the priorities, and the radar detection apparatus does not need to determine the priorities, thereby reducing a workload of the radar detection apparatus.

With reference to the first aspect, in a possible implementation of the first aspect, the determining, by the first apparatus based on the first information, the priorities of the plurality of time-frequency resources included in the first time-domain range includes: The first apparatus determines, according to a first rule and based on the first information, the first priority of the first time-frequency resource included in the first time-domain range. The first rule includes: at least one of when a distance between a first object and the first apparatus is greater than a distance between a second object and the first apparatus, or when a first detection range of a first radar detection apparatus carried on the first object and a second detection range of a second radar detection apparatus corresponding to the first apparatus does not have an intersection in space, and a third detection range of a third radar detection apparatus carried on the second object and the second detection range of the second radar detection apparatus corresponding to the first apparatus have an intersection in space, a second priority of a second time-frequency resource is higher than a third priority of a third time-frequency resource, where the second time-frequency resource is a second time-frequency resource occupied by the first radar detection apparatus carried on the first object, and the third time-frequency resource is a third time-frequency resource occupied by the second radar detection apparatus carried on the second object.

For example, the first rule may include: when the distance between the first object and the first apparatus is greater than the distance between the second object and the first apparatus, the priority of the second time-frequency resource is higher than the priority of the third time-frequency resource. Alternatively, the first rule may include: when the detection range of the first radar detection apparatus carried on the first object and the detection range of the second radar detection apparatus corresponding to the first apparatus have no intersection in space, and the detection range of the third radar detection apparatus carried on the second object and the detection range of the second radar detection apparatus corresponding to the first apparatus have an intersection in space, the priority of the second time-frequency resource is higher than the priority of the third time-frequency resource. Alternatively, the first rule may include: when the distance between the first object and the first apparatus is greater than the distance between the second object and the first apparatus, the detection range of the first radar detection apparatus carried on the first object and the detection range of the second radar detection apparatus corresponding to the first apparatus have no intersection in space, and the detection range of the third radar detection apparatus carried on the second object and the detection range of the second radar detection apparatus corresponding to the first apparatus have an intersection in space, the priority of the second time-frequency resource is higher than the priority of the third time-frequency resource.

If a distance between an object and the first apparatus is comparatively long, even if a time-frequency resource occupied by the object is simultaneously used by the first apparatus, a possibility that the first apparatus collides with the object is comparatively low. Therefore, a priority of the time-frequency resource occupied by the object may be comparatively high. However, if a distance between an object and the first apparatus is comparatively long, if a time-frequency resource occupied by the object is simultaneously used by the first apparatus, a possibility that the first apparatus collides with the object is comparatively high. In addition, if detection ranges of two radar detection apparatuses have an intersection in space, if the two radar detection apparatuses use a same time-frequency resource to send a radar signal, a possibility of a collision is comparatively high. Therefore, if a detection range of a radar detection apparatus and the detection range of the second radar detection apparatus have no intersection in space, for the first apparatus, a priority of a time-frequency resource occupied by the radar detection apparatus is comparatively high. However, if a detection range of a radar detection apparatus and the detection range of the second radar detection apparatus have an intersection in space, for the first apparatus, a priority of a time-frequency resource occupied by the radar detection apparatus is comparatively low. Determining a priority of a time-frequency resource according to this rule helps reduce a probability of collision on a selected resource.

With reference to the first aspect, in a possible implementation of the first aspect, the first apparatus is a radar detection apparatus, and the method further includes: the radar detection apparatus sends a first radar signal on the first time-frequency resource.

After determining the first time-frequency resource, the radar detection apparatus may send the first radar signal on the first time-frequency resource. The first time-frequency resource is selected based on the determined priorities. Therefore, the probability of resource collision is comparatively low.

With reference to the first aspect, in a possible implementation of the first aspect, the first apparatus is a processing apparatus, and the method further includes: The processing apparatus sends information about the first time-frequency resource to a radar detection apparatus. The information about the first time-frequency resource is to be utilized (e.g., used) by the radar detection apparatus to send a radar signal.

If the first apparatus is the processing apparatus, after determining the first time-frequency resource, the processing apparatus may send the information about the first time-frequency resource to the radar detection apparatus, so that the radar detection apparatus may send the radar signal on the first time-frequency resource.

With reference to the first aspect, in a possible implementation of the first aspect, the first apparatus is a radar detection apparatus, and the method further includes: The radar detection apparatus sends information about the first time-frequency resource to a processing apparatus or a communications apparatus. Alternatively, the first apparatus is the processing apparatus, and the method further includes: The processing apparatus sends information about the first time-frequency resource to the communications apparatus.

The radar detection apparatus or the processing apparatus finally sends the information about the first time-frequency resource to the communications apparatus, and the communications apparatus may broadcast the information about the first time-frequency resource, so that another processing apparatus or another radar detection apparatus may learn of the first time-frequency resource used by the radar detection apparatus, to reduce a probability of a resource collision.

With reference to the first aspect, in a possible implementation of the first aspect, the first apparatus is a radar detection apparatus, and after the determining a first time-frequency resource in the plurality of time-frequency resources, the method further includes: the radar detection apparatus determines that the radar detection apparatus is subject to interference. Alternatively, the first apparatus is a processing apparatus, and after the determining the first time-frequency resource in the plurality of time-frequency resources, the method further includes: The processing apparatus receives interference indication information from a radar detection apparatus. The interference indication information is used to indicate that the radar detection apparatus is subject to interference.

The radar detection apparatus may be subject to interference after sending the first radar signal on the first time-frequency resource.

With reference to the first aspect, in a possible implementation of the first aspect, the method further includes: The first apparatus adjusts, according to the first rule and based on the first information, the priorities of the plurality of time-frequency resources included in the first time-domain range. The first rule further includes lowering a priority of a time-frequency resource of the plurality of time-frequency resources currently utilized by the first apparatus.

If the radar detection apparatus is subject to interference after sending the first radar signal on the first time-frequency resource, the first apparatus may adjust the priorities of the plurality of time-frequency resources. During adjustment, the priority of the time-frequency resource currently used by the first apparatus (for example, the first time-frequency resource) may be lowered. After the priorities are adjusted, the first apparatus may reselect, based on adjusted priorities, a time-frequency resource to send a radar signal. Because the priority of the currently used time-frequency resource is lowered during the adjustment, a possibility that the first apparatus selects the currently used time-frequency resource again during reselection is comparatively low. Therefore, interference can be reduced.

With reference to the first aspect, in a possible implementation of the first aspect, the method further includes: The first apparatus obtains a detection result for at least one object, where the detection result includes information about the at least one object. The first apparatus obtains a matching degree between the detection result and second information, where the second information is a part of the first information, and the second information includes the information about the at least one object. The first apparatus adjusts, based on the matching degree and/or the first information, the priorities of the plurality of time-frequency resources included in the first time-domain range.

The first apparatus sends the first radar signal to perform detection on another object. After sending the first radar signal, the first apparatus may obtain the detection result for the at least one object. In addition, the first apparatus may further adjust the priorities of the plurality of time-frequency resources, so that a priority of a time-frequency resource can be adjusted in a comparatively timely manner.

With reference to the first aspect, in a possible implementation of the first aspect, the first apparatus is a radar detection apparatus, and the obtaining, by the first apparatus, a detection result for at least one object includes: The radar detection apparatus performs detection on the at least one object, and obtains the detection result. Alternatively, the first apparatus is a processing apparatus, and the obtaining, by the first apparatus, a detection result for at least one object includes: The processing apparatus receives the detection result from a radar detection apparatus.

If the first apparatus is the radar detection apparatus, the radar detection apparatus may directly obtain the detection result for the at least one object. Alternatively, if the first apparatus is the processing apparatus, the radar detection apparatus may obtain the detection result for the at least one object, and the radar detection apparatus may send the detection result to the processing apparatus, so that the processing apparatus obtains the detection result.

With reference to the first aspect, in a possible implementation of the first aspect, the first apparatus is a radar detection apparatus, and the obtaining, by the first apparatus, a matching degree between the detection result and the second information includes: The radar detection apparatus performs matching between the detection result and the obtained second information, to obtain the matching degree between the detection result and the second information. Alternatively, the radar detection apparatus sends the detection result to the processing apparatus, and the radar detection apparatus receives third information from the processing apparatus. The third information is used to indicate the matching degree between the detection result and the second information.

If the first apparatus is the radar detection apparatus, the radar detection apparatus may autonomously perform matching between the detection result and the second information to obtain the matching degree. This manner has a comparatively high requirement on a processing capability of the radar detection apparatus. Alternatively, the processing apparatus may perform matching between the detection result and the second information to obtain the matching degree, then the processing apparatus sends the matching degree to the radar detection apparatus, and the radar detection apparatus does not need to perform matching. This manner has a comparatively low requirement on a capability of the radar detection apparatus, and is universally applicable to a comparatively large quantity of radar detection apparatuses.

With reference to the first aspect, in a possible implementation of the first aspect, the first apparatus is a processing apparatus, and the obtaining, by the first apparatus, a matching degree between the detection result and the second information includes: The processing apparatus performs matching between the detection result and the obtained second information, to obtain the matching degree between the detection result and the second information.

If the first apparatus is the processing apparatus, the processing apparatus may perform matching between the detection result and the second information to obtain the matching degree.

With reference to the first aspect, in a possible implementation of the first aspect, the adjusting, by the first apparatus based on the matching degree and/or the first information, the priorities of the plurality of time-frequency resources included in the first time-domain range includes: The first apparatus determines, according to a second rule and based on the matching degree and/or the first information, the priorities of the plurality of time-frequency resources included in the first time-domain range. The second rule includes one or any combination of the following: when the matching degree between the detection result and the second information is less than a first threshold, and/or when the first apparatus determines that the first apparatus is subject to interference, lowering a priority of a time-frequency resource currently used by the first apparatus; or when a distance between a first object and the first apparatus is greater than a distance between a second object and the first apparatus, and/or when a detection range of a first radar detection apparatus carried on the first object and a detection range of a second radar detection apparatus corresponding to the first apparatus have no intersection in space, and a detection range of a third radar detection apparatus carried on the second object and the detection range of the second radar detection apparatus corresponding to the first apparatus have an intersection in space, a priority of a second time-frequency resource is higher than a priority of a third time-frequency resource, where the second time-frequency resource is a time-frequency resource occupied by the first radar detection apparatus carried on the first object, and the third time-frequency resource is a time-frequency resource occupied by the second radar detection apparatus carried on the second object.

For example, the second rule includes: when the matching degree between the detection result and the second information is less than the first threshold, lowering the priority of the time-frequency resource currently used by the first apparatus. Alternatively, the second rule includes: when the first apparatus determines that the first apparatus is subject to interference, lowering the priority of the time-frequency resource currently used by the first apparatus. Alternatively, the second rule includes: when the matching degree between the detection result and the second information is less than the first threshold, and the first apparatus determines that the first apparatus is subject to interference, lowering the priority of the time-frequency resource currently used by the first apparatus. Alternatively, the second rule includes: when the distance between the first object and the first apparatus is greater than the distance between the second object and the first apparatus, the priority of the second time-frequency resource is higher than the priority of the third time-frequency resource. Alternatively, the second rule includes: when the detection range of the first radar detection apparatus carried on the first object and the detection range of the second radar detection apparatus corresponding to the first apparatus have no intersection in space, and the detection range of the third radar detection apparatus carried on the second object and the detection range of the second radar detection apparatus corresponding to the first apparatus have an intersection in space, the priority of the second time-frequency resource is higher than the priority of the third time-frequency resource. Alternatively, the second rule includes: when the distance between the first object and the first apparatus is greater than the distance between the second object and the first apparatus, the detection range of the first radar detection apparatus carried on the first object and the detection range of the second radar detection apparatus corresponding to the first apparatus have no intersection in space, and the detection range of the third radar detection apparatus carried on the second object and the detection range of the second radar detection apparatus corresponding to the first apparatus have an intersection in space, the priority of the second time-frequency resource is higher than the priority of the third time-frequency resource. Alternatively, the second rule includes: when the matching degree between the detection result and the second information is less than the first threshold, lowering the priority of the time-frequency resource currently used by the first apparatus; and when the detection range of the first radar detection apparatus carried on the first object and the detection range of the second radar detection apparatus corresponding to the first apparatus have no intersection in space, and the detection range of the third radar detection apparatus carried on the second object and the detection range of the second radar detection apparatus corresponding to the first apparatus have an intersection in space, the priority of the second time-frequency resource is higher than the priority of the third time-frequency resource. Alternatively, the second rule includes: when the matching degree between the detection result and the second information is less than the first threshold, and the first apparatus determines that the first apparatus is subject to interference, lowering the priority of the time-frequency resource currently used by the first apparatus; and when the distance between the first object and the first apparatus is greater than the distance between the second object and the first apparatus, the priority of the second time-frequency resource is higher than the priority of the third time-frequency resource.

The first apparatus may adjust a priority of a time-frequency resource at any time in a process of sending a radar signal, so that the priority is updated in a comparatively timely manner.

With reference to the first aspect, in a possible implementation of the first aspect, the first apparatus is a radar detection apparatus, and the method further includes: The radar detection apparatus determines a fourth time-frequency resource based on adjusted priorities. According to the adjusted priorities, a priority of the fourth time-frequency resource is not lower than a priority of a time-frequency resource other than the fourth time-frequency resource in the plurality of time-frequency resources. The radar detection apparatus sends a radar signal on the fourth time-frequency resource.

After the priorities are adjusted, the radar detection apparatus may reselect the fourth time-frequency resource based on the adjusted priorities, and send the radar signal (for example, referred to as a second radar signal) on the fourth time-frequency resource. When the fourth time-frequency resource is selected, the priority of the time-frequency resource currently used by the first apparatus may have been lowered. Therefore, the selected fourth time-frequency resource is probably not a time-frequency resource previously used by the first apparatus (for example, the first time-frequency resource). Therefore, the radar detection apparatus sends the radar signal on the fourth time-frequency resource, so that interference can be reduced.

With reference to the first aspect, in a possible implementation of the first aspect, the first apparatus is a processing apparatus, and the method further includes: The processing apparatus determines a fourth time-frequency resource based on adjusted priorities. According to the adjusted priorities, a priority of the fourth time-frequency resource is not lower than a priority of a time-frequency resource other than the fourth time-frequency resource in the plurality of time-frequency resources. The processing apparatus sends information about the fourth time-frequency resource to a radar detection apparatus. The information about the fourth time-frequency resource is to be used by the radar detection apparatus to send a radar signal.

Alternatively, the processing apparatus may select the fourth time-frequency resource based on the adjusted priorities. After selecting the fourth time-frequency resource, the processing apparatus may send the information about the fourth time-frequency resource to the radar detection apparatus, and the radar detection apparatus may send the radar signal on the fourth time-frequency resource.

According to a second aspect, a second communication method is provided. The method includes: A first apparatus obtains a detection result for at least one object, where the detection result includes information about the at least one object. The first apparatus obtains a matching degree between the detection result and second information, where the second information includes the information about the at least one object. The first apparatus determines, based on the matching degree and/or first information, priorities of a plurality of time-frequency resources included in the first time-domain range, where the first information includes the second information, and the first information further includes information about a radar detection apparatus carried on the at least one object. Information about one object in the information about the at least one object includes at least one of location information or the driving direction of the object. Information about a radar detection apparatus carried on the one of the at least one object includes at least one of a location of the radar detection apparatus in the object or information about a time-frequency resource occupied by the radar detection apparatus.

The method may be performed by the first apparatus. The first apparatus may be a processing apparatus, or may be a detection apparatus. For example, the detection apparatus is a radar detection apparatus. For example, the radar detection apparatus is a radar.

In some embodiments of this application, during detection, the first apparatus may determine, based on a detection result, the priorities of the plurality of time-frequency resources included in the first time-domain range, so that a time-frequency resource with a comparatively high priority may be selected to send a radar signal. The time-frequency resource with the comparatively high priority is, for example, a time-frequency resource with a comparatively low possibility of a collision. Therefore, in this manner, a probability of a resource collision can be reduced, so as to reduce or avoid interference between radars. With this method, regardless of whether a priority of a time-frequency resource is set when a radar detection apparatus is initially put into use (or when the radar detection apparatus is powered on to work), the priority of the time-frequency resource may be set (or adjusted) during detection by the radar detection apparatus. This manner is comparatively flexible.

With reference to the second aspect, in a possible implementation of the second aspect, the first apparatus is a radar detection apparatus, and the obtaining, by the first apparatus, a detection result for at least one object includes: The radar detection apparatus performs detection on the at least one object, and obtains the detection result. Alternatively, the first apparatus is a processing apparatus, and the obtaining, by the first apparatus, a detection result for at least one object includes: The processing apparatus receives the detection result from a radar detection apparatus.

With reference to the second aspect, in a possible implementation of the second aspect, the first apparatus is a radar detection apparatus, and the obtaining, by the first apparatus, a matching degree between the detection result and the second information includes: The radar detection apparatus performs matching between the detection result and the obtained second information, to obtain the matching degree between the detection result and the second information. Alternatively, the radar detection apparatus sends the detection result to the processing apparatus, and the radar detection apparatus receives third information from the processing apparatus. The third information is used to indicate the matching degree between the detection result and the second information.

With reference to the second aspect, in a possible implementation of the second aspect, the first apparatus is a processing apparatus, and the obtaining, by the first apparatus, a matching degree between the detection result and the second information includes: The processing apparatus performs matching between the detection result and the obtained second information, to obtain the matching degree between the detection result and the second information.

With reference to the second aspect, in a possible implementation of the second aspect, the determining, by the first apparatus based on the matching degree and/or the first information, the priorities of the plurality of time-frequency resources included in the first time-domain range includes: The first apparatus determines, according to a second rule and based on the matching degree and/or the first information, the first priority of the first time-frequency resource included in the first time-domain range. The second rule includes one or any combination of the following: when the matching degree between the detection result and the second information is less than a first threshold, and/or when the first apparatus determines that the first apparatus is subject to interference, lowering a priority of a time-frequency resource currently used by the first apparatus; or when a first distance between a first object and the first apparatus is greater than a second distance between a second object and the first apparatus, and/or when a first detection range of a first radar detection apparatus carried on the first object and a second detection range of a second radar detection apparatus corresponding to the first apparatus have no intersection in space, and a third detection range of a third radar detection apparatus carried on the second object and the second detection range of the second radar detection apparatus corresponding to the first apparatus have an intersection in space, a second priority of a second time-frequency resource is higher than a third priority of a third time-frequency resource, where the second time-frequency resource is a time-frequency resource occupied by the first radar detection apparatus carried on the first object, and the third time-frequency resource is a time-frequency resource occupied by the second radar detection apparatus carried on the second object.

With reference to the second aspect, in a possible implementation of the second aspect, the first apparatus is a radar detection apparatus, and the method further includes: The radar detection apparatus determines a fourth time-frequency resource based on the determined priorities. According to the determined priorities, a fourth priority of the fourth time-frequency resource is not lower than a priority of a time-frequency resource other than the fourth time-frequency resource in the plurality of time-frequency resources. The radar detection apparatus sends a second radar signal on the fourth time-frequency resource.

With reference to the second aspect, in a possible implementation of the second aspect, the first apparatus is a processing apparatus, and the method further includes: The processing apparatus determines a fourth time-frequency resource based on the determined priorities. According to the determined priorities, a priority of the fourth time-frequency resource is not lower than a priority of a time-frequency resource other than the fourth time-frequency resource in the plurality of time-frequency resources. The processing apparatus sends information about the fourth time-frequency resource to a radar detection apparatus. The information about the fourth time-frequency resource is to be used by the radar detection apparatus to send a radar signal.

For technical effects of the second aspect or the possible implementations of the second aspect, refer to the descriptions of the technical effects of the first aspect or the corresponding implementations of the first aspect.

According to a third aspect, a third communication method is provided. The method includes: A communications apparatus receives information about a first time-frequency resource. The information about the first time-frequency resource is information about a time-frequency resource used by a radar detection apparatus corresponding to the communications apparatus and the processing apparatus. The communications apparatus broadcasts the information about the first time-frequency resource.

The radar detection apparatus or the processing apparatus may send the information about the first time-frequency resource to the communications apparatus, and the communications apparatus may broadcast the information about the first time-frequency resource, so that another processing apparatus or another radar detection apparatus may learn of the first time-frequency resource used by the radar detection apparatus, to reduce a probability of a resource collision.

With reference to the third aspect, in a possible implementation of the third aspect, the method further includes: The communications apparatus broadcasts information about an object carrying the communications apparatus and/or information about a radar detection apparatus carried on the object carrying the communications apparatus. The information about the object includes at least one of location information of the object or a driving direction of the object. The information about the radar detection apparatus carried on the object includes a location of the radar detection apparatus in the object.

In addition to the information about the first time-frequency resource, the communications apparatus may further broadcast other information, so that another processing apparatus or another radar detection apparatus can obtain a comparatively large amount of information, thereby reducing a probability of a resource collision. For example, the another processing apparatus or radar detection apparatus may also determine a priority of a time-frequency resource based on the obtained information.

With reference to the third aspect, in a possible implementation of the third aspect, the method further includes: The communications apparatus receives, from another communications apparatus, information about at least one object and/or information about a radar detection apparatus carried on the at least one object. Information about one of the at least one object includes at least one of location information or a driving direction of the object. Information about a radar detection apparatus carried on the one of the at least one object includes at least one of a location of the radar detection apparatus in the object or information about a time-frequency resource occupied by the radar detection apparatus. The communications apparatus sends the received information to the processing apparatus.

The communications apparatus may obtain information from another communications apparatus, and the communications apparatus may send the information to the processing apparatus, so that the processing apparatus or the radar detection apparatus may determine a priority of a time-frequency resource.

For technical effects of the third aspect or the possible implementations of the third aspect, refer to the descriptions of the technical effects of the first aspect or the corresponding implementations of the first aspect, or refer to the descriptions of the technical effects of the second aspect or the corresponding implementations of the second aspect.

According to a fourth aspect, a first first-apparatus is provided. The first apparatus is configured to perform the method in any one of the first aspect or the possible implementations of the first aspect. The first apparatus may include modules configured to perform the method in any one of the first aspect or the possible implementations of the first aspect, for example, include a processing module and a transceiver module. The transceiver module may be a functional module, and the functional module can not only perform a function of receiving information, but also perform a function of sending information. Alternatively, the transceiver module may be a general term of a sending module and a receiving module. The sending module is configured to perform a function of sending information, and the receiving module is configured to perform a function of receiving information. For example, the first apparatus is a processing apparatus or a radar detection apparatus.

The transceiver module is configured to receive first information from a second apparatus.

The processing module is configured to determine, based on the first information, priorities of a plurality of time-frequency resources included in a first time-domain range.

The processing module is further configured to determine a first time-frequency resource in the plurality of time-frequency resources. A priority of the first time-frequency resource is not lower than a priority of a time-frequency resource other than the first time-frequency resource in the plurality of time-frequency resources. The first time-frequency resource is used to send a radar signal.

With reference to the fourth aspect, in a possible implementation of the fourth aspect, the first time-domain range is one of a plurality of time-domain ranges, and the plurality of time-domain ranges do not overlap in a time domain.

With reference to the fourth aspect, in a possible implementation of the fourth aspect, at least two of the plurality of time-frequency resources overlap in the time domain, or the plurality of time-frequency resources do not overlap in a frequency domain.

With reference to the fourth aspect, in a possible implementation of the fourth aspect, the first information includes information about at least one object and/or information about a radar detection apparatus carried on the at least one object, information about one of the at least one object includes at least one of location information or a driving direction of the object, and information about a radar detection apparatus carried on the one of the at least one object includes at least one of a location of the radar detection apparatus in the object or information about a time-frequency resource occupied by the radar detection apparatus. Alternatively, the first information includes the priorities of the plurality of time-frequency resources included in the first time-domain range.

With reference to the fourth aspect, in a possible implementation of the fourth aspect, the processing module is configured to determine, based on the first information in the following manner, the priorities of the plurality of time-frequency resources included in the first time-domain range: determining, according to a first rule and based on the first information, a priority of a time-frequency resource included in the first time-domain range, where the first rule includes: when a distance between a first object and the first apparatus is greater than a distance between a second object and the first apparatus, and/or when a detection range of a first radar detection apparatus carried on the first object and a detection range of a second radar detection apparatus corresponding to the apparatus have no intersection in space, and a detection range of a third radar detection apparatus carried on the second object and the detection range of the second radar detection apparatus corresponding to the apparatus have an intersection in space, a priority of a second time-frequency resource is higher than a priority of a third time-frequency resource, where the second time-frequency resource is a time-frequency resource occupied by the first radar detection apparatus carried on the first object, and the third time-frequency resource is a time-frequency resource occupied by the second radar detection apparatus carried on the second object.

With reference to the fourth aspect, in a possible implementation of the fourth aspect, the first apparatus is a radar detection apparatus, and the transceiver module is further configured to send a first radar signal on the first time-frequency resource.

With reference to the fourth aspect, in a possible implementation of the fourth aspect, the first apparatus is a processing apparatus, and the transceiver module is further configured to send information about the first time-frequency resource to a radar detection apparatus. The information about the first time-frequency resource is to be used by the radar detection apparatus to send a radar signal.

With reference to the fourth aspect, in a possible implementation of the fourth aspect, the first apparatus is a radar detection apparatus, and the transceiver module is further configured to send information about the first time-frequency resource to a processing apparatus or a communications apparatus. Alternatively, the first apparatus is a processing apparatus, and the transceiver module is further configured to send information about the first time-frequency resource to a communications apparatus.

With reference to the fourth aspect, in a possible implementation of the fourth aspect, the first apparatus is a radar detection apparatus, and the processing module is further configured to: after determining the first time-frequency resource in the plurality of time-frequency resources, determine that the radar detection apparatus is subject to interference. Alternatively, the first apparatus is a processing apparatus, and the transceiver module is further configured to: after the processing module determines the first time-frequency resource in the plurality of time-frequency resources, receive interference indication information from a radar detection apparatus. The interference indication information is used to indicate that the radar detection apparatus is subject to interference.

With reference to the fourth aspect, in a possible implementation of the fourth aspect, the processing module is further configured to adjust, according to the first rule and based on the first information, the priorities of the plurality of time-frequency resources included in the first time-domain range. The first rule further includes lowering a priority of a time-frequency resource currently used by the first apparatus.

With reference to the fourth aspect, in a possible implementation of the fourth aspect, the processing module is further configured to: obtain a detection result for at least one object, where the detection result includes information about the at least one object; obtain a matching degree between the detection result and second information, where the second information is a part of the first information, and the second information includes the information about the at least one object; and adjust, based on the matching degree and/or the first information, the priorities of the plurality of time-frequency resources included in the first time-domain range.

With reference to the fourth aspect, in a possible implementation of the fourth aspect, the first apparatus is a radar detection apparatus, and the processing module is configured to obtain the detection result for the at least one object in the following manner: performing detection on the at least one object, and obtaining the detection result. Alternatively, the first apparatus is a processing apparatus, and the processing module is configured to obtain the detection result for the at least one object in the following manner: receiving, by using the transceiver module, the detection result from a radar detection apparatus.

With reference to the fourth aspect, in a possible implementation of the fourth aspect, the first apparatus is a radar detection apparatus, and the processing module is configured to obtain the matching degree between the detection result and the second information in the following manner: performing matching between the detection result and the obtained second information, to obtain the matching degree between the detection result and the second information; or sending, by using the transceiver module, the detection result to the processing apparatus, and receiving, by using the transceiver module, third information from the processing apparatus, where the third information is used to indicate the matching degree between the detection result and the second information.

With reference to the fourth aspect, in a possible implementation of the fourth aspect, the first apparatus is a processing apparatus, and the processing module is configured to obtain the matching degree between the detection result and the second information in the following manner: performing matching between the detection result and the obtained second information, to obtain the matching degree between the detection result and the second information.

With reference to the fourth aspect, in a possible implementation of the fourth aspect, the processing module is configured to adjust, based on the matching degree and/or the first information in the following manner, the priorities of the plurality of time-frequency resources included in the first time-domain range: determining, according to a second rule and based on the matching degree and/or the first information, the priorities of the plurality of time-frequency resources included in the first time-domain range. The second rule includes one or any combination of the following:

when the matching degree between the detection result and the second information is less than a first threshold, and/or when the first apparatus determines that the first apparatus is subject to interference, lowering a priority of a time-frequency resource currently used by the first apparatus; or when a distance between a first object and the first apparatus is greater than a distance between a second object and the first apparatus, and/or when a detection range of a first radar detection apparatus carried on the first object and a detection range of a second radar detection apparatus corresponding to the first apparatus have no intersection in space, and a detection range of a third radar detection apparatus carried on the second object and the detection range of the second radar detection apparatus corresponding to the first apparatus have an intersection in space, a priority of a second time-frequency resource is higher than a priority of a third time-frequency resource, where the second time-frequency resource is a time-frequency resource occupied by the first radar detection apparatus carried on the first object, and the third time-frequency resource is a time-frequency resource occupied by the second radar detection apparatus carried on the second object.

With reference to the fourth aspect, in a possible implementation of the fourth aspect, the first apparatus is a radar detection apparatus.

The processing module is further configured to determine a fourth time-frequency resource based on adjusted priorities. According to the adjusted priorities, a priority of the fourth time-frequency resource is not lower than a priority of a time-frequency resource other than the fourth time-frequency resource in the plurality of time-frequency resources.

The transceiver module is further configured to send a radar signal on the fourth time-frequency resource.

With reference to the fourth aspect, in a possible implementation of the fourth aspect, the first apparatus is a processing apparatus.

The processing module is further configured to determine a fourth time-frequency resource based on adjusted priorities. According to the adjusted priorities, a priority of the fourth time-frequency resource is not lower than a priority of a time-frequency resource other than the fourth time-frequency resource in the plurality of time-frequency resources.

The transceiver module is further configured to send information about the fourth time-frequency resource to a radar detection apparatus. The information about the fourth time-frequency resource is to be used by the radar detection apparatus to send a radar signal.

For technical effects of the fourth aspect or the implementations of the fourth aspect, refer to the descriptions of the technical effects of the first aspect or the implementations of the first aspect. Details are not described again.

According to a fifth aspect, a second first-apparatus is provided. The first apparatus is configured to perform the method in any one of the second aspect or the possible implementations of the second aspect. The first apparatus may include modules configured to perform the method in any one of the second aspect or the possible implementations of the second aspect, for example, include a processing module and a transceiver module. The transceiver module may be a functional module, and the functional module can not only perform a function of receiving information, but also perform a function of sending information. Alternatively, the transceiver module may be a general term of a sending module and a receiving module. The sending module is configured to perform a function of sending information, and the receiving module is configured to perform a function of receiving information. For example, the first apparatus is a processing apparatus or a radar detection apparatus.

The processing module is configured to obtain a detection result for at least one object. The detection result includes information about the at least one object.

The processing module is further configured to obtain a matching degree between the detection result and second information. The second information includes the information about the at least one object.

The processing module is further configured to determine, based on the matching degree and/or first information, priorities of a plurality of time-frequency resources included in the first time-domain range. The first information includes the second information, and the first information further includes information about a radar detection apparatus carried on the at least one object.

Information about one object in the information about the at least one object includes at least one of location information or the driving direction of the object. Information about a radar detection apparatus carried on the one of the at least one object includes at least one of a location of the radar detection apparatus in the object or information about a time-frequency resource occupied by the radar detection apparatus.

With reference to the fifth aspect, in a possible implementation of the fifth aspect, the first apparatus is a radar detection apparatus, and the processing module is configured to obtain the detection result for the at least one object in the following manner: performing detection on the at least one object, and obtaining the detection result. Alternatively, the first apparatus is a processing apparatus, and the processing module is configured to obtain the detection result for the at least one object in the following manner: receiving, by using the transceiver module, the detection result from a radar detection apparatus.

With reference to the fifth aspect, in a possible implementation of the fifth aspect, the first apparatus is a radar detection apparatus, and the processing module is configured to obtain the matching degree between the detection result and the second information in the following manner: performing matching between the detection result and the obtained second information, to obtain the matching degree between the detection result and the second information; or sending, by using the transceiver module, the detection result to the processing apparatus, and receiving, by using the transceiver module, third information from the processing apparatus, where the third information is used to indicate the matching degree between the detection result and the second information.

With reference to the fifth aspect, in a possible implementation of the fifth aspect, the first apparatus is a processing apparatus, and the processing module is configured to obtain the matching degree between the detection result and the second information in the following manner: performing matching between the detection result and the obtained second information, to obtain the matching degree between the detection result and the second information.

With reference to the fifth aspect, in a possible implementation of the fifth aspect, the processing module is configured to determine, based on the matching degree and/or the first information in the following manner, the priorities of the plurality of time-frequency resources included in the first time-domain range: determining, according to a second rule and based on the matching degree and/or the first information, a priority of a time-frequency resource included in the first time-domain range. The second rule includes one or any combination of the following: when the matching degree between the detection result and the second information is less than a first threshold, and/or when the first apparatus determines that the first apparatus is subject to interference, lowering a priority of a time-frequency resource currently used by the first apparatus; or when a distance between a first object and the first apparatus is greater than a distance between a second object and the first apparatus, and/or when a detection range of a first radar detection apparatus carried on the first object and a detection range of a second radar detection apparatus corresponding to the first apparatus have no intersection in space, and a detection range of a third radar detection apparatus carried on the second object and the detection range of the second radar detection apparatus corresponding to the first apparatus have an intersection in space, a priority of a second time-frequency resource is higher than a priority of a third time-frequency resource, where the second time-frequency resource is a time-frequency resource occupied by the first radar detection apparatus carried on the first object, and the third time-frequency resource is a time-frequency resource occupied by the second radar detection apparatus carried on the second object.

With reference to the fifth aspect, in a possible implementation of the fifth aspect, the first apparatus is a radar detection apparatus.

The processing module is further configured to determine a fourth time-frequency resource based on the determined priorities. According to the determined priorities, a priority of the fourth time-frequency resource is not lower than a priority of a time-frequency resource other than the fourth time-frequency resource in the plurality of time-frequency resources.

The transceiver module is further configured to send a second radar signal on the fourth time-frequency resource.

With reference to the fifth aspect, in a possible implementation of the fifth aspect, the first apparatus is a processing apparatus.

The processing module is further configured to determine a fourth time-frequency resource based on the determined priorities. According to the determined priorities, a priority of the fourth time-frequency resource is not lower than a priority of a time-frequency resource other than the fourth time-frequency resource in the plurality of time-frequency resources.

The transceiver module is further configured to send information about the fourth time-frequency resource to a radar detection apparatus. The information about the fourth time-frequency resource is to be used by the radar detection apparatus to send a radar signal.

For technical effects of the fifth aspect or the implementations of the fifth aspect, refer to the descriptions of the technical effects of the second aspect or the implementations of the second aspect. Details are not described again.

According to a sixth aspect, a first communications apparatus is provided. For example, the communications apparatus is the aforementioned communications apparatus. The communications apparatus is configured to perform the method in any one of the third aspect or the possible implementations of the third aspect. The communications apparatus may include modules configured to perform the method in any one of the third aspect or the possible implementations of the third aspect, for example, include a processing module and a transceiver module. The transceiver module may be a functional module, and the functional module can not only perform a function of receiving information, but also perform a function of sending information. Alternatively, the transceiver module may be a general term of a sending module and a receiving module. The sending module is configured to perform a function of sending information, and the receiving module is configured to perform a function of receiving information.

The transceiver module is configured to receive information about a first time-frequency resource. The information about the first time-frequency resource is information about a time-frequency resource used by a radar detection apparatus corresponding to the communications apparatus and the processing apparatus.

The transceiver module is further configured to broadcast the information about the first time-frequency resource.

With reference to the sixth aspect, in a possible implementation of the sixth aspect, the transceiver module is further configured to broadcast information about an object carrying the communications apparatus and/or information about a radar detection apparatus carried on the object carrying the communications apparatus. The information about the object includes at least one of location information of the object or a driving direction of the object. The information about the radar detection apparatus carried on the object includes a location of the radar detection apparatus in the object.

With reference to the sixth aspect, in a possible implementation of the sixth aspect, the transceiver module is further configured to: receive, from another communications apparatus, information about at least one object and/or information about a radar detection apparatus carried on the at least one object, where information about one of the at least one object includes at least one of location information or a driving direction of the object, and information about a radar detection apparatus carried on the one of the at least one object includes at least one of a location of the radar detection apparatus in the object or information about a time-frequency resource occupied by the radar detection apparatus; and send the received information to the processing apparatus.

The transceiver module may include an interface for communication between the communications apparatus and the processing apparatus, an interface for communication between the communications apparatus and the radar detection apparatus, and an interface for communication between the communications apparatus and another communications apparatus. The interface used by the communications apparatus to communicate with the processing apparatus and the interface used by the communications apparatus to communicate with the radar detection apparatus may be a same interface, or may be different interfaces. In addition, the interface used by the communications apparatus to communicate with the another communications apparatus and the interface used by the communications apparatus to communicate with the processing apparatus or the radar detection apparatus may be different interfaces. For example, the communications apparatus communicates with the radar detection apparatus or the processing apparatus in a wired manner, but communicates with the another communications apparatus in a wireless manner.

For technical effects of the sixth aspect or the implementations of the sixth aspect, refer to the descriptions of the technical effects of the third aspect or the implementations of the third aspect. Details are not described again.

According to a seventh aspect, a third first-apparatus is provided. The first apparatus includes a processor and a memory, and optionally, further includes a transceiver. The processor, the memory, and the transceiver are configured to implement the method described in the first aspect or the possible designs of the first aspect. For example, the first apparatus is a chip disposed in a communications device. For example, the transceiver is implemented by an antenna, a feeder, and a codec in the communications device. Alternatively, if the first apparatus is a chip disposed in a communications device, the transceiver is, for example, a communications interface in the chip, and the communications interface is connected to a radio frequency transceiver component in the communications device, to send/receive information by using the radio frequency transceiver component.

The transceiver is configured to receive first information from a second apparatus.

The processor is configured to determine, based on the first information, priorities of a plurality of time-frequency resources included in a first time-domain range.

The processor is further configured to determine a first time-frequency resource in the plurality of time-frequency resources. A priority of the first time-frequency resource is not lower than a priority of a time-frequency resource other than the first time-frequency resource in the plurality of time-frequency resources. The first time-frequency resource is used to send a radar signal.

With reference to the seventh aspect, in a possible implementation of the seventh aspect, the first time-domain range is one of a plurality of time-domain ranges, and the plurality of time-domain ranges do not overlap in a time domain.

With reference to the seventh aspect, in a possible implementation of the seventh aspect, at least two of the plurality of time-frequency resources overlap in the time domain, or the plurality of time-frequency resources do not overlap in the frequency domain.

With reference to the seventh aspect, in a possible implementation of the seventh aspect, the first information includes information about at least one object and/or information about a radar detection apparatus carried on the at least one object, information about one of the at least one object includes at least one of location information or a driving direction of the object, and information about a radar detection apparatus carried on the one of the at least one object includes at least one of a location of the radar detection apparatus in the object or information about a time-frequency resource occupied by the radar detection apparatus. Alternatively, the first information includes the priorities of the plurality of time-frequency resources included in the first time-domain range.

With reference to the seventh aspect, in a possible implementation of the seventh aspect, the processor is configured to determine, based on the first information in the following manner, the priorities of the plurality of time-frequency resources included in the first time-domain range: determining, according to a first rule and based on the first information, a priority of a time-frequency resource included in the first time-domain range, where the first rule includes: when a distance between a first object and the first apparatus is greater than a distance between a second object and the first apparatus, and/or when a detection range of a first radar detection apparatus carried on the first object and a detection range of a second radar detection apparatus corresponding to the apparatus have no intersection in space, and a detection range of a third radar detection apparatus carried on the second object and the detection range of the second radar detection apparatus corresponding to the apparatus have an intersection in space, a priority of a second time-frequency resource is higher than a priority of a third time-frequency resource, where the second time-frequency resource is a time-frequency resource occupied by the first radar detection apparatus carried on the first object, and the third time-frequency resource is a time-frequency resource occupied by the second radar detection apparatus carried on the second object.

With reference to the seventh aspect, in a possible implementation of the seventh aspect, the first apparatus is a radar detection apparatus, and the transceiver is further configured to send a first radar signal on the first time-frequency resource.

With reference to the seventh aspect, in a possible implementation of the seventh aspect, the first apparatus is a processing apparatus, and the transceiver is further configured to send information about the first time-frequency resource to a radar detection apparatus. The information about the first time-frequency resource is to be used by the radar detection apparatus to send a radar signal.

With reference to the seventh aspect, in a possible implementation of the seventh aspect, the first apparatus is a radar detection apparatus, and the transceiver is further configured to send information about the first time-frequency resource to a processing apparatus or a communications apparatus. Alternatively, the first apparatus is a processing apparatus, and the transceiver is further configured to send information about the first time-frequency resource to a communications apparatus.

With reference to the seventh aspect, in a possible implementation of the seventh aspect, the first apparatus is a radar detection apparatus, and the processor is further configured to: after determining the first time-frequency resource in the plurality of time-frequency resources, determine that the radar detection apparatus is subject to interference. Alternatively, the first apparatus is a processing apparatus, and the transceiver is further configured to: after the processor determines the first time-frequency resource in the plurality of time-frequency resources, receive interference indication information from a radar detection apparatus. The interference indication information is used to indicate that the radar detection apparatus is subject to interference.

With reference to the seventh aspect, in a possible implementation of the seventh aspect, the processor is further configured to adjust, according to the first rule and based on the first information, the priorities of the plurality of time-frequency resources included in the first time-domain range. The first rule further includes lowering a priority of a time-frequency resource currently used by the first apparatus.

With reference to the seventh aspect, in a possible implementation of the seventh aspect, the processor is further configured to: obtain a detection result for at least one object, where the detection result includes information about the at least one object; obtain a matching degree between the detection result and second information, where the second information is a part of the first information, and the second information includes the information about the at least one object; and adjust, based on the matching degree and/or the first information, the priorities of the plurality of time-frequency resources included in the first time-domain range.

With reference to the seventh aspect, in a possible implementation of the seventh aspect, the first apparatus is a radar detection apparatus, and the processor is configured to obtain the detection result for the at least one object in the following manner: performing detection on the at least one object, and obtaining the detection result. Alternatively, the first apparatus is a processing apparatus, and the processor is configured to obtain the detection result for the at least one object in the following manner: receiving, by using the transceiver, the detection result from a radar detection apparatus.

With reference to the seventh aspect, in a possible implementation of the seventh aspect, the first apparatus is a radar detection apparatus, and the processor is configured to obtain the matching degree between the detection result and the second information in the following manner: performing matching between the detection result and the obtained second information, to obtain the matching degree between the detection result and the second information; or sending, by using the transceiver, the detection result to the processing apparatus, and receiving, by using the transceiver, third information from the processing apparatus, where the third information is used to indicate the matching degree between the detection result and the second information.

With reference to the seventh aspect, in a possible implementation of the seventh aspect, the first apparatus is a processing apparatus, and the processor is configured to obtain the matching degree between the detection result and the second information in the following manner: performing matching between the detection result and the obtained second information, to obtain the matching degree between the detection result and the second information.

With reference to the seventh aspect, in a possible implementation of the seventh aspect, the processor is configured to adjust, based on the matching degree and/or the first information in the following manner, the priorities of the plurality of time-frequency resources included in the first time-domain range: determining, according to a second rule and based on the matching degree and/or the first information, the priorities of the plurality of time-frequency resources included in the first time-domain range. The second rule includes one or any combination of the following: when the matching degree between the detection result and the second information is less than a first threshold, and/or when the first apparatus determines that the first apparatus is subject to interference, lowering a priority of a time-frequency resource currently used by the first apparatus; or when a distance between a first object and the first apparatus is greater than a distance between a second object and the first apparatus, and/or when a detection range of a first radar detection apparatus carried on the first object and a detection range of a second radar detection apparatus corresponding to the first apparatus have no intersection in space, and a detection range of a third radar detection apparatus carried on the second object and the detection range of the second radar detection apparatus corresponding to the first apparatus have an intersection in space, a priority of a second time-frequency resource is higher than a priority of a third time-frequency resource, where the second time-frequency resource is a time-frequency resource occupied by the first radar detection apparatus carried on the first object, and the third time-frequency resource is a time-frequency resource occupied by the second radar detection apparatus carried on the second object.

With reference to the seventh aspect, in a possible implementation of the seventh aspect, the first apparatus is a radar detection apparatus.

The processor is further configured to determine a fourth time-frequency resource based on adjusted priorities. According to the adjusted priorities, a priority of the fourth time-frequency resource is not lower than a priority of a time-frequency resource other than the fourth time-frequency resource in the plurality of time-frequency resources.

The transceiver is further configured to send a radar signal on the fourth time-frequency resource.

With reference to the seventh aspect, in a possible implementation of the seventh aspect, the first apparatus is a processing apparatus.

The processor is further configured to determine a fourth time-frequency resource based on adjusted priorities. According to the adjusted priorities, a priority of the fourth time-frequency resource is not lower than a priority of a time-frequency resource other than the fourth time-frequency resource in the plurality of time-frequency resources.

The transceiver is further configured to send information about the fourth time-frequency resource to a radar detection apparatus. The information about the fourth time-frequency resource is to be used by the radar detection apparatus to send a radar signal.

For technical effects of the seventh aspect or the implementations of the seventh aspect, refer to the descriptions of the technical effects of the first aspect or the implementations of the first aspect. Details are not described again.

According to an eighth aspect, a fourth first-apparatus is provided. The first apparatus includes a processor and a memory, and optionally, further includes a transceiver. The processor, the memory, and the transceiver are configured to implement the method described in the second aspect or the possible designs of the second aspect. For example, the first apparatus is a chip disposed in a communications device. For example, the transceiver is implemented by an antenna, a feeder, and a codec in the communications device. Alternatively, if the first apparatus is a chip disposed in a communications device, the transceiver is, for example, a communications interface in the chip, and the communications interface is connected to a radio frequency transceiver component in the communications device, to send/receive information by using the radio frequency transceiver component.

The processor is configured to obtain a detection result for at least one object. The detection result includes information about the at least one object.

The processor is further configured to obtain a matching degree between the detection result and second information. The second information includes the information about the at least one object.

The processor is further configured to determine, based on the matching degree and/or first information, priorities of a plurality of time-frequency resources included in the first time-domain range. The first information includes the second information, and the first information further includes information about a radar detection apparatus carried on the at least one object.

Information about one object in the information about the at least one object includes at least one of location information or the driving direction of the object. Information about a radar detection apparatus carried on the one of the at least one object includes at least one of a location of the radar detection apparatus in the object or information about a time-frequency resource occupied by the radar detection apparatus.

With reference to the eighth aspect, in a possible implementation of the eighth aspect, the first apparatus is a radar detection apparatus, and the processor is configured to obtain the detection result for the at least one object in the following manner: performing detection on the at least one object, and obtaining the detection result. Alternatively, the first apparatus is a processing apparatus, and the processor is configured to obtain the detection result for the at least one object in the following manner: receiving, by using the transceiver, the detection result from a radar detection apparatus.

With reference to the eighth aspect, in a possible implementation of the eighth aspect, the first apparatus is a radar detection apparatus, and the processor is configured to obtain the matching degree between the detection result and the second information in the following manner: performing matching between the detection result and the obtained second information, to obtain the matching degree between the detection result and the second information; or sending, by using the transceiver, the detection result to the processing apparatus, and receiving, by using the transceiver, third information from the processing apparatus, where the third information is used to indicate the matching degree between the detection result and the second information.

With reference to the eighth aspect, in a possible implementation of the eighth aspect, the first apparatus is a processing apparatus, and the processor is configured to obtain the matching degree between the detection result and the second information in the following manner: performing matching between the detection result and the obtained second information, to obtain the matching degree between the detection result and the second information.

With reference to the eighth aspect, in a possible implementation of the eighth aspect, the processor is configured to determine, based on the matching degree and/or the first information in the following manner, the priorities of the plurality of time-frequency resources included in the first time-domain range: determining, according to a second rule and based on the matching degree and/or the first information, a priority of a time-frequency resource included in the first time-domain range. The second rule includes one or any combination of the following: when the matching degree between the detection result and the second information is less than a first threshold, and/or when the first apparatus determines that the first apparatus is subject to interference, lowering a priority of a time-frequency resource currently used by the first apparatus; or when a distance between a first object and the first apparatus is greater than a distance between a second object and the first apparatus, and/or when a detection range of a first radar detection apparatus carried on the first object and a detection range of a second radar detection apparatus corresponding to the first apparatus have no intersection in space, and a detection range of a third radar detection apparatus carried on the second object and the detection range of the second radar detection apparatus corresponding to the first apparatus have an intersection in space, a priority of a second time-frequency resource is higher than a priority of a third time-frequency resource, where the second time-frequency resource is a time-frequency resource occupied by the first radar detection apparatus carried on the first object, and the third time-frequency resource is a time-frequency resource occupied by the second radar detection apparatus carried on the second object.

With reference to the eighth aspect, in a possible implementation of the eighth aspect, the first apparatus is a radar detection apparatus.

The processor is further configured to determine a fourth time-frequency resource based on the determined priorities. According to the determined priorities, a priority of the fourth time-frequency resource is not lower than a priority of a time-frequency resource other than the fourth time-frequency resource in the plurality of time-frequency resources.

The transceiver is further configured to send a second radar signal on the fourth time-frequency resource.

With reference to the eighth aspect, in a possible implementation of the eighth aspect, the first apparatus is a processing apparatus.

The processor is further configured to determine a fourth time-frequency resource based on the determined priorities. According to the determined priorities, a priority of the fourth time-frequency resource is not lower than a priority of a time-frequency resource other than the fourth time-frequency resource in the plurality of time-frequency resources.

The transceiver is further configured to send information about the fourth time-frequency resource to a radar detection apparatus. The information about the fourth time-frequency resource is to be used by the radar detection apparatus to send a radar signal.

For technical effects of the eighth aspect or the implementations of the eighth aspect, refer to the descriptions of the technical effects of the second aspect or the implementations of the second aspect. Details are not described again.

According to a ninth aspect, a second communications apparatus is provided. The communications apparatus includes a processor and a memory, and optionally, further includes a transceiver. The processor, the memory, and the transceiver are configured to implement the method described in the third aspect or the possible designs of the third aspect. For example, the communications apparatus is a chip disposed in a communications device. For example, the transceiver is implemented by an antenna, a feeder, and a codec in the communications device. Alternatively, if the communications apparatus is a chip disposed in a communications device, the transceiver is, for example, a communications interface in the chip, and the communications interface is connected to a radio frequency transceiver component in the communications device, to send/receive information by using the radio frequency transceiver component.

The transceiver is configured to receive information about a first time-frequency resource. The information about the first time-frequency resource is information about a time-frequency resource used by a radar detection apparatus corresponding to the communications apparatus and the processing apparatus.

The transceiver is further configured to broadcast the information about the first time-frequency resource.

With reference to the ninth aspect, in a possible implementation of the ninth aspect, the transceiver is further configured to broadcast information about an object carrying the communications apparatus and/or information about a radar detection apparatus carried on the object carrying the communications apparatus. The information about the object includes at least one of location information of the object or a driving direction of the object. The information about the radar detection apparatus carried on the object includes a location of the radar detection apparatus in the object.

With reference to the ninth aspect, in a possible implementation of the ninth aspect, the transceiver is further configured to: receive, from another communications apparatus, information about at least one object and/or information about a radar detection apparatus carried on the at least one object, where information about one of the at least one object includes at least one of location information or a driving direction of the object, and information about a radar detection apparatus carried on the one of the at least one object includes at least one of a location of the radar detection apparatus in the object or information about a time-frequency resource occupied by the radar detection apparatus; and send the received information to the processing apparatus.

The transceiver may include an interface for communication between the communications apparatus and the processing apparatus, an interface for communication between the communications apparatus and the radar detection apparatus, and an interface for communication between the communications apparatus and another communications apparatus. The interface used by the communications apparatus to communicate with the processing apparatus and the interface used by the communications apparatus to communicate with the radar detection apparatus may be a same interface, or may be different interfaces. In addition, the interface used by the communications apparatus to communicate with the another communications apparatus and the interface used by the communications apparatus to communicate with the processing apparatus or the radar detection apparatus may be different interfaces. For example, the communications apparatus communicates with the radar detection apparatus or the processing apparatus in a wired manner, but communicates with the another communications apparatus in a wireless manner.

For technical effects of the ninth aspect or the implementations of the ninth aspect, refer to the descriptions of the technical effects of the third aspect or the implementations of the third aspect. Details are not described again.

According to a tenth aspect, a fifth first-apparatus is provided. The first apparatus may be the first apparatus in the foregoing method designs. For example, the first apparatus is a chip disposed in a communications device. The first apparatus includes: a memory, configured to store computer-executable program code; and a processor, where the processor is coupled to the memory. The program code stored in the memory includes an instruction. When the processor executes the instruction, the fifth first-apparatus is enabled to perform the method in any one of the first aspect or the possible implementations of the first aspect.

The fifth first-apparatus may further include a communications interface. The communications interface may be a transceiver in a communications device, for example, is implemented by an antenna, a feeder, and a codec in the first apparatus. Alternatively, if the fifth first-apparatus is a chip disposed in a communications device, the communications interface may be an input/output interface of the chip, for example, an input/output pin.

According to an eleventh aspect, a sixth first-apparatus is provided. The first apparatus may be the first apparatus in the foregoing method designs. For example, the first apparatus is a chip disposed in a communications device. The first apparatus includes: a memory, configured to store computer-executable program code; and a processor, where the processor is coupled to the memory. The program code stored in the memory includes an instruction. When the processor executes the instruction, the sixth first-apparatus is enabled to perform the method in any one of the second aspect or the possible implementations of the second aspect.

The sixth first-apparatus may further include a communications interface. The communications interface may be a transceiver in a communications device, for example, is implemented by an antenna, a feeder, and a codec in the first apparatus. Alternatively, if the sixth first-apparatus is a chip disposed in a communications device, the communications interface may be an input/output interface of the chip, for example, an input/output pin.

According to a twelfth aspect, a third communications apparatus is provided. The communications apparatus may be the communications apparatus in the foregoing method designs. For example, the communications apparatus is a chip disposed in a communications device. The communications apparatus includes: a memory, configured to store computer-executable program code; and a processor, where the processor is coupled to the memory. The program code stored in the memory includes an instruction. When the processor executes the instruction, the third communications apparatus is enabled to perform the method in any one of the third aspect or the possible implementations of the third aspect.

The third communications apparatus may further include a communications interface. The communications interface may be a transceiver in a communications device, for example, is implemented by an antenna, a feeder, and a codec in the communications apparatus. Alternatively, if the third communications apparatus is a chip disposed in a communications device, the communications interface may be an input/output interface of the chip, for example, an input/output pin.

According to a thirteenth aspect, a communications system is provided. The communications system may include the first first-apparatus in the fourth aspect, the third first-apparatus in the seventh aspect, or the fifth first-apparatus in the tenth aspect, and includes the second first-apparatus in the fifth aspect, the fourth first-apparatus in the eighth aspect, or the sixth first-apparatus in the eleventh aspect, and includes the first communications apparatus in the sixth aspect, the second communications apparatus in the ninth aspect, or the third communications apparatus in the twelfth aspect.

The communications system may be one communications device, or may be two different communications devices, where one communications device includes a first apparatus, and the other communications device includes a communications apparatus.

According to a fourteenth aspect, a computer storage medium is provided. The computer-readable storage medium stores an instruction. When the instruction runs on a computer, the computer is enabled to perform the method in any one of the first aspect or the possible designs of the first aspect.

According to a fifteenth aspect, a computer storage medium is provided. The computer-readable storage medium stores an instruction. When the instruction runs on a computer, the computer is enabled to perform the method in any one of the second aspect or the possible designs of the second aspect.

According to a sixteenth aspect, a computer storage medium is provided. The computer-readable storage medium stores an instruction. When the instruction runs on a computer, the computer is enabled to perform the method in any one of the third aspect or the possible designs of the third aspect.

According to a seventeenth aspect, a computer program product including an instruction is provided. The computer program product stores the instruction. When the instruction runs on a computer, the computer is enabled to perform the method in any one of the first aspect or the possible designs of the first aspect.

According to an eighteenth aspect, a computer program product including an instruction is provided. The computer program product stores the instruction. When the instruction runs on a computer, the computer is enabled to perform the method in any one of the second aspect or the possible designs of the second aspect.

According to a nineteenth aspect, a computer program product including an instruction is provided. The computer program product stores the instruction. When the instruction runs on a computer, the computer is enabled to perform the method in any one of the third aspect or the possible design of the third aspect.

In the embodiments of this application, the first apparatus may select a time-frequency resource with a comparatively high priority to send a radar signal. The time-frequency resource with the comparatively high priority is, for example, a time-frequency resource with a comparatively low possibility of a collision. Therefore, in this manner, a probability of a resource collision can be reduced, so as to reduce or avoid interference between radars.

DESCRIPTION OF EMBODIMENTS

Figure 1:
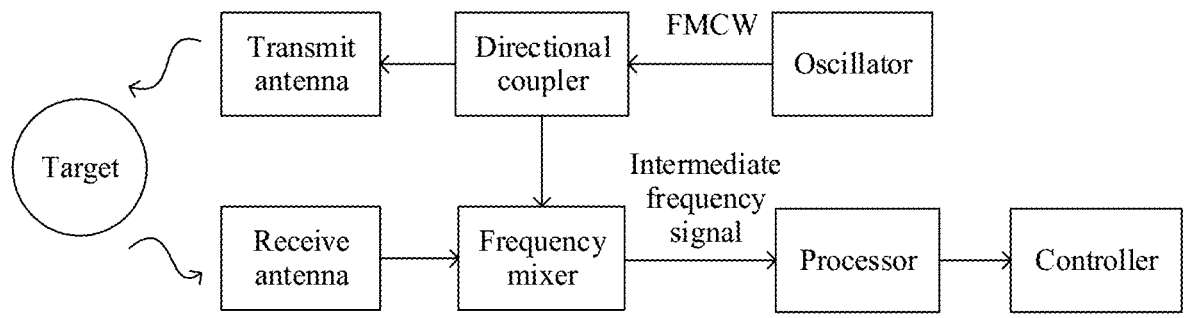
FIG. 1 is a schematic structural diagram of a radar apparatus.

To make the objectives, technical solutions and advantages of the embodiments of this application clearer, the following further describes the embodiments of this application in detail with reference to the accompanying drawings.

In the following, some terms of the embodiments of this application are described, so as to help persons skilled in the art have a better understanding.

(1) A radar detection apparatus is, for example, a radar, or may be another apparatus used for detection (for example, ranging).

(2) A radar, or referred to as a radar apparatus, may also be referred to as a detector, a radar detection apparatus, a radar signal sending apparatus, or the like. An operating principle of the radar is to transmit a signal (or referred to as a detection signal) and receive a reflected signal reflected by a target object, to perform detection on the corresponding target object. The signal transmitted by the radar may be a radar signal. Correspondingly, the received reflected signal reflected by the target object may also be a radar signal.

(3) A transmission period of a radar detection apparatus (or referred to as a sweep period, a sweep time, sweep duration, or the like of the radar detection apparatus) is a period in which the radar detection apparatus transmits a radar signal with a complete waveform. The radar detection apparatus usually sends a radar signal with a plurality of sweep periods in continuous duration.

(4) Initial frequency of a radar detection apparatus: At the beginning of a transmission period, a radar detection apparatus transmits a radar signal at a frequency, where the frequency is referred to as an initial frequency of the radar detection apparatus. In addition, transmission frequencies of some radar detection apparatuses change within a transmission period based on the initial frequency. However, some radar detection apparatuses perform transmission at a constant frequency, and transmission frequencies of these radar detection apparatuses do not change within a transmission period.

(5) Sweep bandwidth of a radar detection apparatus, and bandwidth occupied by a waveform of a radar signal sent by a radar detection apparatus: It should be noted herein that the "sweep bandwidth" is defined for ease of description, and is technically a bandwidth occupied by a waveform of a radar signal sent by a radar detection apparatus. Further, a frequency band occupied by a waveform of a radar signal sent by a radar detection apparatus may be referred to as a sweep frequency band.

(6) A frequency-modulated continuous wave (FMCW) is an electromagnetic wave whose frequency changes with time.

(7) A linear frequency-modulated continuous wave is an electromagnetic wave whose frequency changes linearly with time. The linear change herein is usually a linear change within a transmission period. A waveform of a linear frequency-modulated continuous wave is usually a sawtooth wave or a triangular wave, or there may be another possible waveform, for example, a linear frequency-modulated step-frequency waveform.

(8) A maximum ranging distance of a radar detection apparatus, or referred to as a maximum detection distance of a radar detection apparatus, is a parameter related to a configuration of the radar detection apparatus (for example, related to a factory setting parameter of the radar detection apparatus). For example, the radar detection apparatus is a radar, a maximum ranging distance of a long-range adaptive cruise control (ACC) radar is 250 m, and a maximum ranging distance of a medium-range radar is 70-150 m.

(9) Intermediate frequency (IF) signal: For example, a radar detection apparatus is a radar. A local-frequency signal of the radar and a reflected signal (e.g., a signal obtained by reflecting a transmitted signal of the radar by a target object) received by the radar are processed by a frequency mixer, and then a processed signal passes through a low-pass filter to obtain an intermediate frequency signal. A part of a frequency-modulated continuous wave signal generated by an oscillator is used as the local-frequency signal, and a part of the frequency-modulated continuous wave signal is transmitted by a transmit antenna as the transmitted signal. Frequency mixing is performed on the local-frequency signal and the reflected signal that is specific to the transmitted signal and that is received by a receive antenna, to obtain the "intermediate frequency signal". One or more of location information, speed information, or angle information of the target object may be obtained by using the intermediate frequency signal. The location information may be information about a location of the target object relative to the current radar. The speed information may be information about a speed of the target object relative to the current radar. The angle information may be information about an angle of the target object relative to the current radar. Further, a frequency of the intermediate frequency signal is referred to as an intermediate frequency.

(10) "At least one" means one or more, and "plurality" means at least two. The term "and/or" describes an association relationship between associated objects and represents that three relationships may exist. For example, A and/or B may represent the following three cases: Only A exists, both A and B exist, and only B exists. The character "/" generally indicates an "or" relationship between the associated objects. "At least one of the following" or a similar expression thereof indicates any combination of the following, and includes any combination of one or more of the following. For example, at least one of a, b, or c may indicate a, b, c, a and b, a and c, b and c, or a, b, and c, where a, b, or c may be singular or plural.

In addition, unless otherwise specified, ordinal numbers such as "first" and "second" in the embodiments of this application are used to distinguish between a plurality of objects, but are not used to limit sequences, time sequences, priorities, or importance degrees of the plurality of objects. For example, first information and second information are merely intended to distinguish between different information, but do not indicate a difference in content, priorities, sending sequences, importance degrees, or the like of the two types of information.

The foregoing describes some concepts in the embodiments of this application, and the following describes technical features in the embodiments of this application.

With developments in technology, an increasing quantity of machines in modern life are developing towards automation and intelligence. Cars used for mobile travel are no exception. Intelligent cars are gradually entering people's daily life. In recent years, an ADAS has played an important role in an intelligent car. During operation of the car (e.g., vehicle), the system uses various sensors installed on the car to sense a surrounding environment and collect data. The various sensors are further configured to identify, detect, and track static and moving objects, and perform system operations and analysis with reference to map data of a navigator at any time, so that a driver can be aware of a possible danger in advance, thereby effectively improving comfort and safety of driving the car. It can be said that real driverless (e.g., autonomous) driving is a product achieved when the ADAS develops to the acme (e.g., summit, pinnacle). In a driverless driving architecture, a sensing layer is compared to an "eye" of a car, and includes a visual system sensor such as an in-vehicle camera, and a radar system sensor such as an in-vehicle millimeter-wave radar, an in-vehicle laser radar, or an in-vehicle ultrasonic radar. The millimeter-wave radar is the first to become a main sensor of a driverless driving system because of low costs and a comparatively mature technology. Currently, more than 10 functions have been developed for the ADAS, and the in-vehicle millimeter-wave radar is required for adaptive cruise, autonomous emergency braking, lane change assist, blind spot monitoring, or the like.

A millimeter wave is an electromagnetic wave with a wavelength ranging from 1 mm to 10 mm, and a corresponding frequency range is 30 GHz to 300 GHz. At this frequency band, features related to the millimeter wave result in the millimeter wave to be very suitable for being applied to the in-vehicle field. When a bandwidth is high: Frequency-domain resources are abundant, and an antenna sidelobe is low, thereby helping implement imaging or quasi-imaging. When a wavelength is short: A size of a radar device and a diameter of an antenna are reduced, and a weight is reduced. When a beam is narrow: A beam of the millimeter wave is much narrower than that of a microwave for a same antenna size, and a radar resolution is high. When penetration is strong: A capability of penetrating smoke, dust, and fog is stronger than that of a laser radar or an optical system, and all-weather operating is implemented.

An in-vehicle millimeter-wave radar system usually includes apparatuses such as an oscillator, a transmit antenna, a receive antenna, a frequency mixer, a processor, and a controller. FIG. 1 is a diagram of an operating principle of a millimeter-wave radar. The oscillator generates a radar signal whose frequency increases linearly with time, and the radar signal is usually a frequency-modulated continuous wave. A part of the radar signal is output by a directional coupler to the frequency mixer as a local-frequency signal, and a part of the radar signal is transmitted by the transmit antenna. The receive antenna receives a radar signal that is reflected back after a transmitted radar signal encounters an object in front of a vehicle. The frequency mixer performs frequency mixing on the received radar signal and the local-frequency signal, to obtain an intermediate frequency signal. The intermediate frequency signal includes information about a distance, a speed, an angle, and the like of the target object relative to the radar system. The intermediate frequency signal passes through a low-pass filter and is amplified. Then a processed signal is transmitted to the processor. The processor processes the received signal, where the processor usually performs fast Fourier transformation, spectrum analysis, and the like on the received signal, to obtain the information about the distance, the speed, the angle, and the like of the target object relative to the radar system. Finally, the processor may output the obtained information to the controller to control behavior of the vehicle.

A waveform of the frequency-modulated continuous wave of the millimeter-wave radar is usually a sawtooth wave or a triangular wave. The following describes in detail a ranging principle of the millimeter-wave radar by using the sawtooth wave as an example. A ranging principle of the triangular wave is similar to that of the sawtooth wave.

Figure 2:
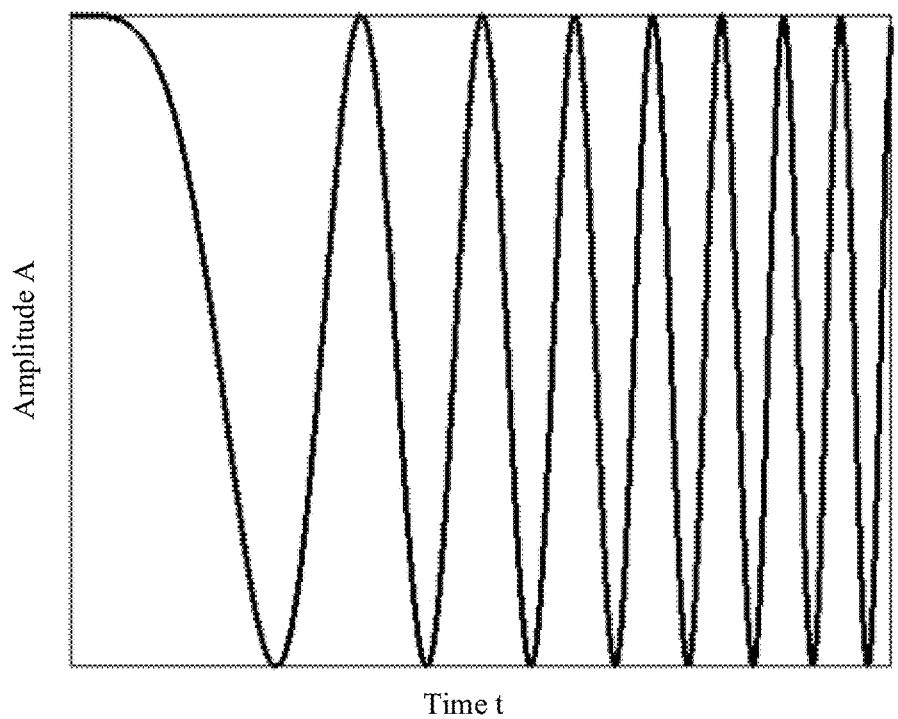
FIG. 2 is a schematic diagram of a frequency-modulated continuous wave.
Figure 3:
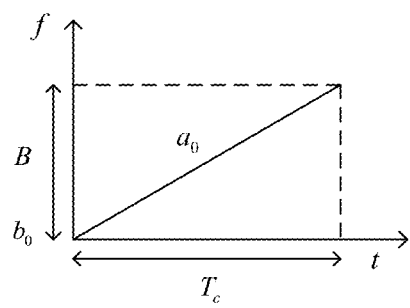
FIG. 3 is a schematic diagram of a linear change of a frequency of a frequency-modulated continuous wave with time.

As shown in FIG. 2, a linear frequency-modulated continuous wave is a signal whose frequency changes linearly with time. As shown in FIG. 3, a period of a frequency-modulated continuous wave is $T_c$, a slope of the frequency-modulated continuous wave is $a_0$, a bandwidth of the frequency-modulated continuous wave is B, and a starting frequency of the frequency-modulated continuous wave is $b_0$. The frequency-modulated continuous wave signal shown in FIG. 2 is also referred to as a linear frequency-modulated pulse (chirp) signal.

An equivalent baseband signal of a single-period frequency-modulated continuous wave output by the oscillator of the millimeter-wave radar may be expressed as follows:

$$S_{BB}^T(t) = A\exp\left\{j2\pi\left[\frac{a_0}{2}t^2 + b_0 t + \varphi_0\right]\right\}, 0 \le t \le T_c \quad \text{(Formula 1.1)}$$

where A represents an amplitude of the equivalent baseband signal, $a_0$ represents a slope of the equivalent baseband signal, $b_0$ represents an intercept of the equivalent baseband signal on a Y-axis, $\varphi_0$ represents an initial phase of the equivalent baseband signal, exp represents an exponential function of e, and because a frequency is defined as a change rate of a phase relative to time, a frequency of the equivalent baseband signal is as follows:

$$f = \frac{d\left(\frac{a_0}{2}t^2 + b_0 t + \varphi_0\right)}{dt} = a_0 t + b_0, 0 \le t \le T_c \quad \text{(Formula 1.2)}$$

An image of the formula 1.2 is shown in FIG. 3.

After the equivalent baseband signal transmitted by the oscillator undergoes up-conversion, a processed signal is radiated by the transmit antenna of the millimeter-wave radar. A transmitted signal may be expressed as follows:

$$S_{RF}^T(t) = A\exp\left\{j2\pi\left[\frac{a_0}{2}t^2 + b_0 t + \varphi_0\right]\right\}\exp(j2\pi f_c t) = \quad \text{(Formula 1.3)}$$
$$A\exp\left\{j2\pi\left[\frac{a_0}{2}t^2 + (b_0 + f_c)t + \varphi_0\right]\right\}, 0 \le t \le T_c$$

Figure 4:
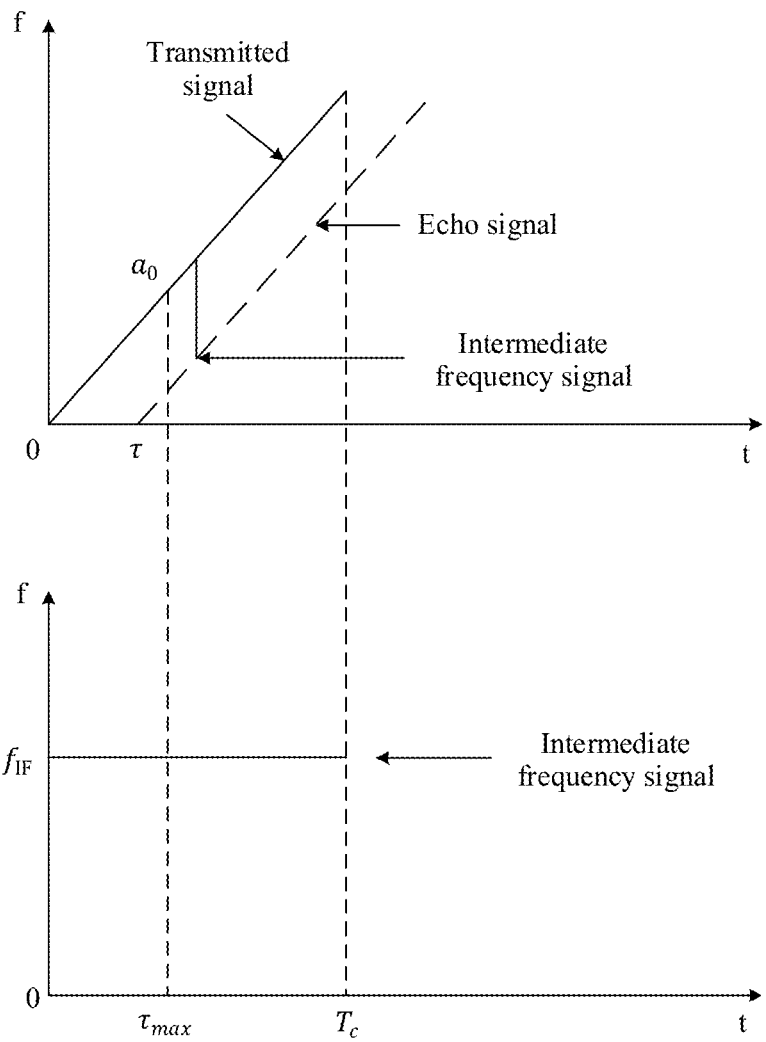
FIG. 4 is a schematic diagram of possible frequency changes of a transmitted signal, a reflected signal, and an intermediate frequency signal.

After encountering an obstacle, the signal is reflected back, and then a reflected signal is received by the millimeter-wave radar. A shape of a waveform of the transmitted signal is the same as that of a waveform of the reflected signal, but there is a delay τ of the waveform of the reflected signal relative to the waveform of the transmitted signal. Refer to FIG. 4. In FIG. 4, an echo signal is the reflected signal. The received reflected signal may be expressed as follows:

$$S_{RF}^R(t-\tau) = A'\exp\left\{j2\pi\left[\frac{a_0}{2}(t-\tau)^2 + (b_0 + f_c)(t-\tau) + \varphi_0\right]\right\}, \quad \text{(Formula 1.4)}$$
$$0 \le t \le T_c$$

A signal obtained by performing down-conversion on the received equivalent baseband signal is as follows:

$$S_{BB}^R(t-\tau) = A'\exp\left\{j2\pi\left[\frac{a_0}{2}(t-\tau)^2 + b_0(t-\tau) - f_c\tau + \varphi_0\right]\right\}, \quad \text{(Formula 1.5)}$$
$$0 \le t \le T_c$$

where A' is an amplitude of a signal obtained after the equivalent baseband signal transmitted by the oscillator undergoes a transmit antenna gain, target reflection, a propagation loss, and a receive antenna gain, and i is a delay between a time when a transmitter of the millimeter-wave radar sends the radar signal and a time when a receiver of the millimeter-wave radar receives the echo signal (namely, the reflected signal), as shown in FIG. 4, where the delay is equal to twofold of a distance divided by the speed of light. In addition, in FIG. 4, $\tau_{max}$ represents an echo delay corresponding to a maximum detection distance of the millimeter-wave radar, that is, $\tau_{max}$ is a delay of a reflected signal received by the millimeter-wave radar relative to a transmitted signal when a distance between the millimeter-wave radar and the target object is the maximum detection distance of the millimeter-wave radar, and a relationship between τ and a target distance d may be expressed as follows:

$$\tau = \frac{2d}{c} \quad \text{(Formula 1.6)}$$

where c is the speed of light.

The frequency mixer of the millimeter-wave radar performs frequency mixing on the received signal and the local-frequency signal, a processed signal passes through the low-pass filter, and then the intermediate frequency signal is output. The intermediate frequency signal is expressed as follows:

$$S_{IF}(t) = S_{BB}^T(t) \times [S_{BB}^R(t-\tau)]^* = AA' \exp(j2\pi f_c \tau)) \cdot \quad \text{(Formula 1.7)}$$
$$\exp\left[-j2\pi\left(\frac{a_0}{2}\tau^2 - b_0\tau\right)\right]\exp[j2\pi(a_0\tau t)], \tau \leq t \leq T_c$$

The intermediate frequency signal is sent to the processor of the millimeter-wave radar for processing such as fast Fourier transformation, to obtain a frequency $f_{IF}$ of the intermediate frequency signal.

In addition, as shown in FIG. 4, the frequency of the intermediate frequency signal is a product of a slope of the waveform of the transmitted signal and the delay $\tau$:

$$f_{IF} = a_0 \cdot \tau = \frac{B}{T_c} \cdot \frac{2d}{c} = \frac{2d}{c \cdot T_c} B \quad \text{(Formula 1.8)}$$

Therefore, the distance d between the millimeter-wave radar and the target object is as follows:

$$d = \frac{c \cdot T_c}{2B} f_{IF} \quad \text{(Formula 1.9)}$$

It can be learned from the foregoing deduction process that, a frequency difference between the transmitted signal and the received signal (that is, the frequency of the intermediate frequency signal) and the delay are in a linear relationship: A longer distance from the target object indicates a later time for receiving the reflected signal, and a larger frequency difference between the reflected signal and the transmitted signal. Therefore, the distance between the radar and the target object may be determined by determining a magnitude of the frequency of the intermediate frequency signal. In addition, the foregoing process of processing the radar signal is merely an example, and a specific radar processing process is not limited.

As a penetration rate of in-vehicle radars increases, mutual interference between in-vehicle radars becomes increasingly serious. This greatly reduces a radar detection probability or increases a false alarm probability of radar detection, thereby posing non-negligible impact to safety or comfort of driving.

Figure 5:
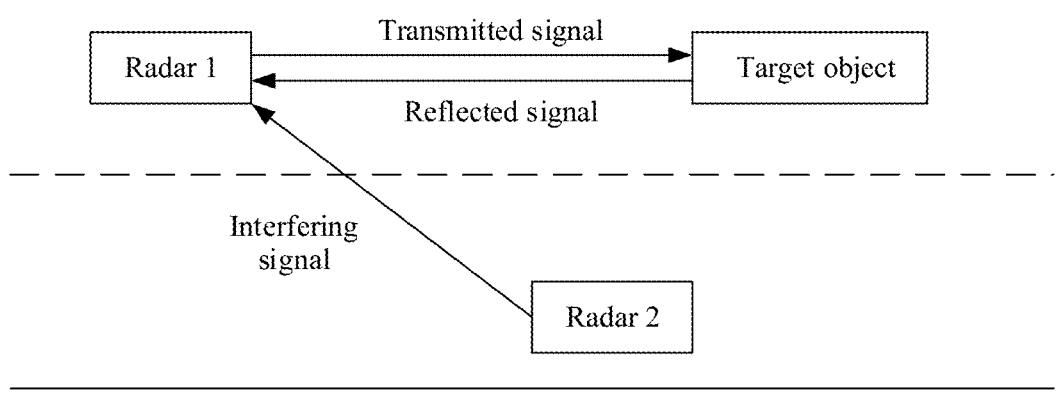
FIG. 5 is a schematic diagram of mutual interference between in-vehicle radars.

FIG. 5 is a schematic diagram of mutual interference between in-vehicle radars. A radar 1 transmits a transmitted signal, and receives a reflected signal obtained by reflecting the transmitted signal by a target object. When the radar 1 receives the reflected signal, a receive antenna of the radar 1 also receives a transmitted signal or a reflected signal from a radar 2. In this case, the transmitted signal from the radar 2 or the reflected signal from the radar 2 that is received by the radar 1 is an interfering signal for the radar 1.

For example, it is assumed that the radar 1 is an observing radar, a slope of a frequency-modulated continuous wave of the radar 1 is $a_0$, an intercept of the frequency-modulated continuous wave is $b_0$, and a period of the frequency-modulated continuous wave is $T_c$; and that the radar 2 is an interfering radar, a slope of a frequency-modulated continuous wave of the radar 2 is $a_1$, and an intercept of the frequency-modulated continuous wave is $b_1$. In this case, it is assumed that $b_0=b_1$. An echo delay corresponding to a maximum ranging distance of the radar 1 Is $\tau_{max}$ (that is, a delay calculated by substituting the maximum detection distance of the radar into the formula 1.6, for example, the maximum detection distance of the radar is 250 m, and the delay calculated by substituting the maximum detection distance of the radar into the formula 1.6 is 1.67 s). A delay of an interfering signal from the radar 2 that arrives at a receiver of the radar 1 is $\tau_1$. A timing error $\Delta\tau$ at a transmitting moment of the radar (for example, an error at the transmitting moment due to a timing error of a global positioning system (GPS), for example, 60 ns) is considered. A time interval in which the radar performs detection on a received signal is $\tau_{max}$-$T_c$.

Figure 6:
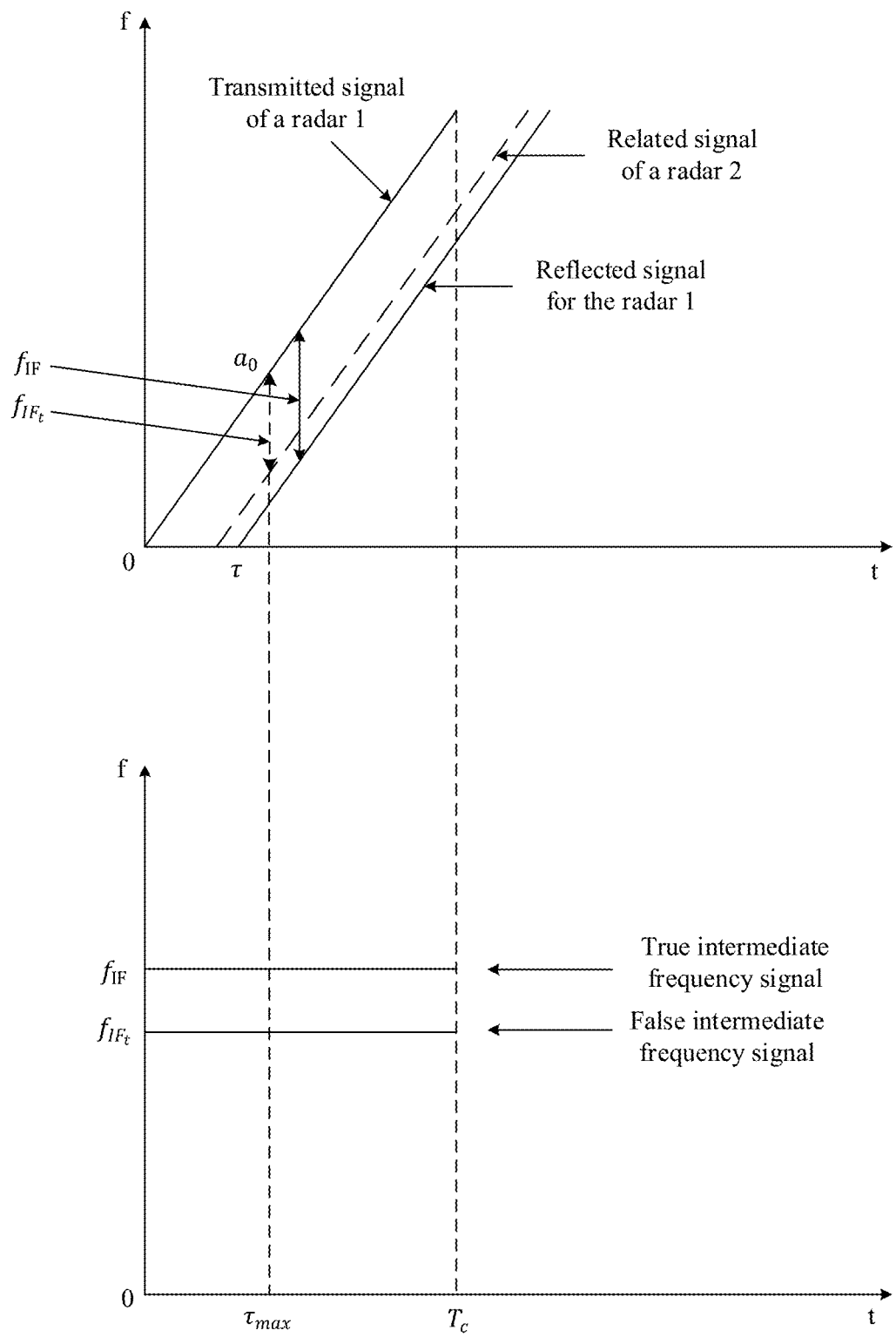
FIG. 6 and FIG. 7 are schematic diagrams of a possible false intermediate frequency signal.
Figure 7:
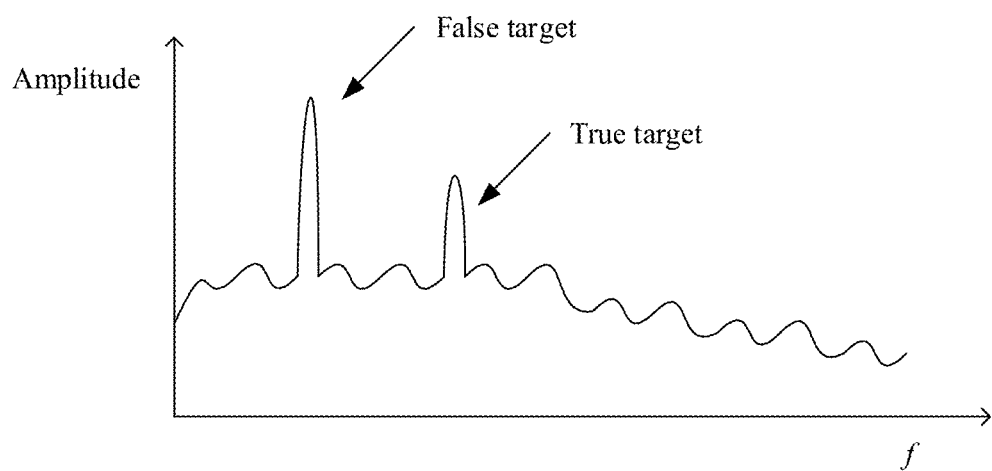

FIG. 6 and FIG. 7 are schematic diagrams of a possible false intermediate frequency signal. If a slope of a radar signal sent by a radar 1 is the same as that of a radar signal sent by a radar 2, that is, $a_0=a_1$, and operating frequency bands of the radar 1 and the radar 2 overlap, a false alarm occurs. As shown in FIG. 6, the radar 1 transmits a signal to a target object, and receives a reflected signal from the target object. However, within a time range from a time when the radar 1 transmits the signal to a time when the radar 1 receives the reflected signal, a receive antenna of the radar 1 receives a transmitted signal or a reflected signal (a dashed line) from the radar 2. A signal waveform of the radar 1 is the same as that of the radar 2, and sweep bandwidths of the radar 1 and the radar 2 are the same. If the radar 1 receives the signal that is at a corresponding frequency and that is indicated by the dashed line within a target echo observation range of the radar 1, the radar 1 considers that a "target object 1" exists. If the radar 1 detects the signal indicated by the dashed line and a reflected signal indicated by a solid line within a signal processing time interval ($\tau_{max}$-$T_c$), the radar 1 mistakes the received signal indicated by the dashed line as the reflected signal from an object in front. In this case, a false intermediate frequency signal is generated. After performing fast Fourier transformation and spectrum analysis, the radar 1 may find two peak values, as shown in FIG. 7. Each peak value corresponds to one target object, and the radar 1 considers that both the "target object 1" and a "target object 2" exist. The radar 1 mistakenly considers that the "target object 1" exists in front, but the "target object 1" actually does not exist. This is referred to as a "ghost" or a "false alarm". After a false alarm is generated, a self-driving car slows down or suddenly brakes when there is no object in front, thereby degrading comfort of driving.

Figure 8:
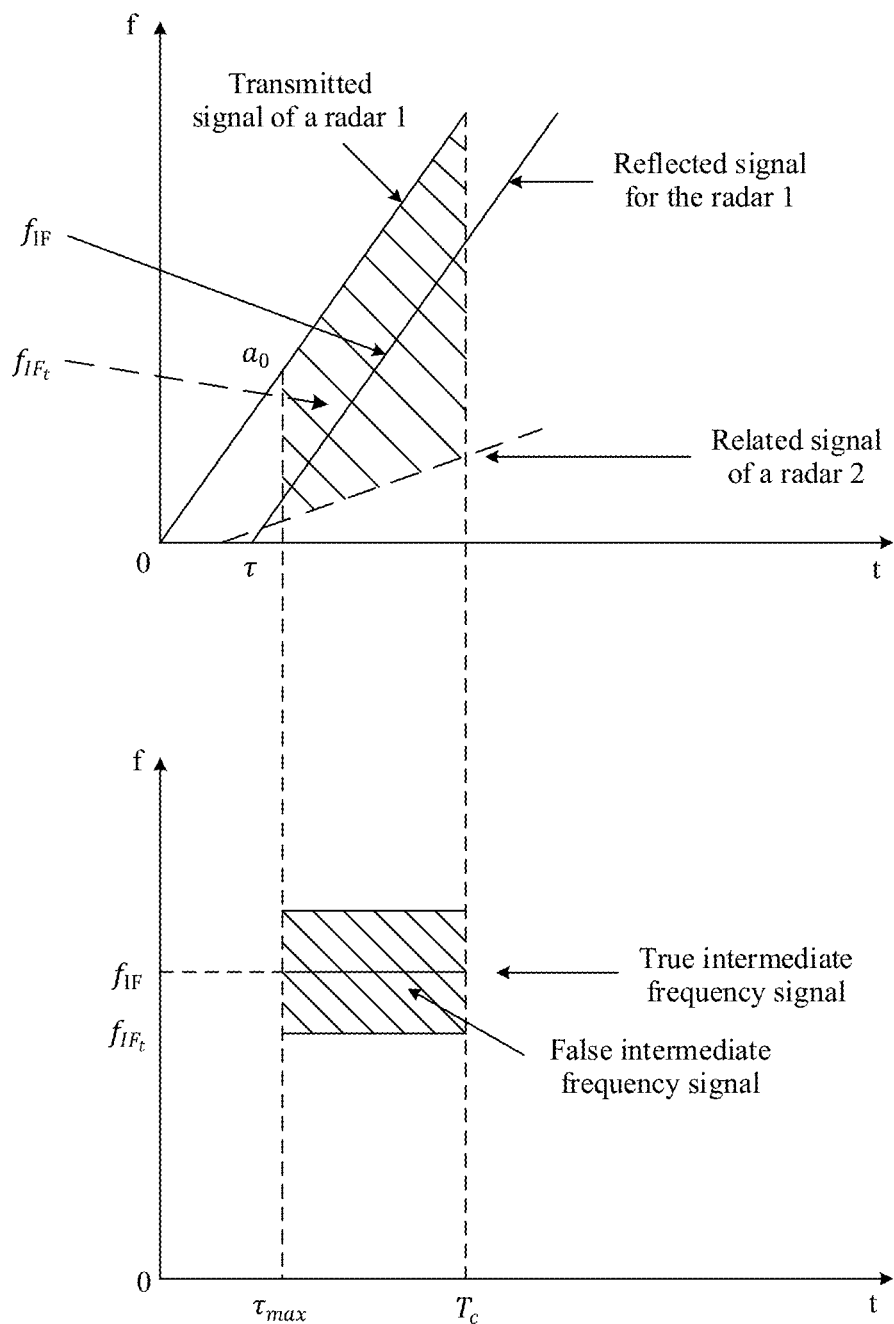
FIG. 8 and FIG. 9 are schematic diagrams in which a possible interfering signal submerges a target signal.
Figure 9:
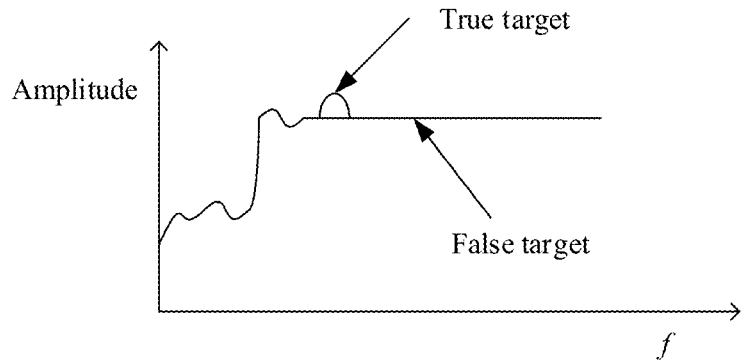

FIG. 8 and FIG. 9 are schematic diagrams in which a possible interfering signal submerges a target signal. As shown in FIG. 8, a radar 1 transmits a signal to a target object, and receives a reflected signal from the target object. However, a receive antenna of the radar 1 receives a transmitted signal or a reflected signal (a dashed line) from a radar 2 within a target echo observation range of the radar 1. A signal waveform of the radar 1 differs from that of the radar 2 in a slope. Within a signal detection time interval ($\tau_{max}$-$T_c$), the radar 1 detects both a reflected signal for the radar 1 and a related signal of the radar 2. After frequency mixing is performed on the related signal of the radar 2 and the reflected signal for the radar 1 that are detected, an intermediate frequency signal including various frequency components is generated. After fast Fourier transformation is performed, as shown in FIG. 9, an interference platform appears, so that a "protruding" degree of a real target object is insufficient. This increases detection difficulty, and increases a possibility of missing detection. After missing detection occurs, when there is an object in front, a self-driving car may mistakenly consider that there is no object in front, and does not slow down or brake, thereby causing a traffic accident and reducing safety of vehicle driving.

Figure 10:
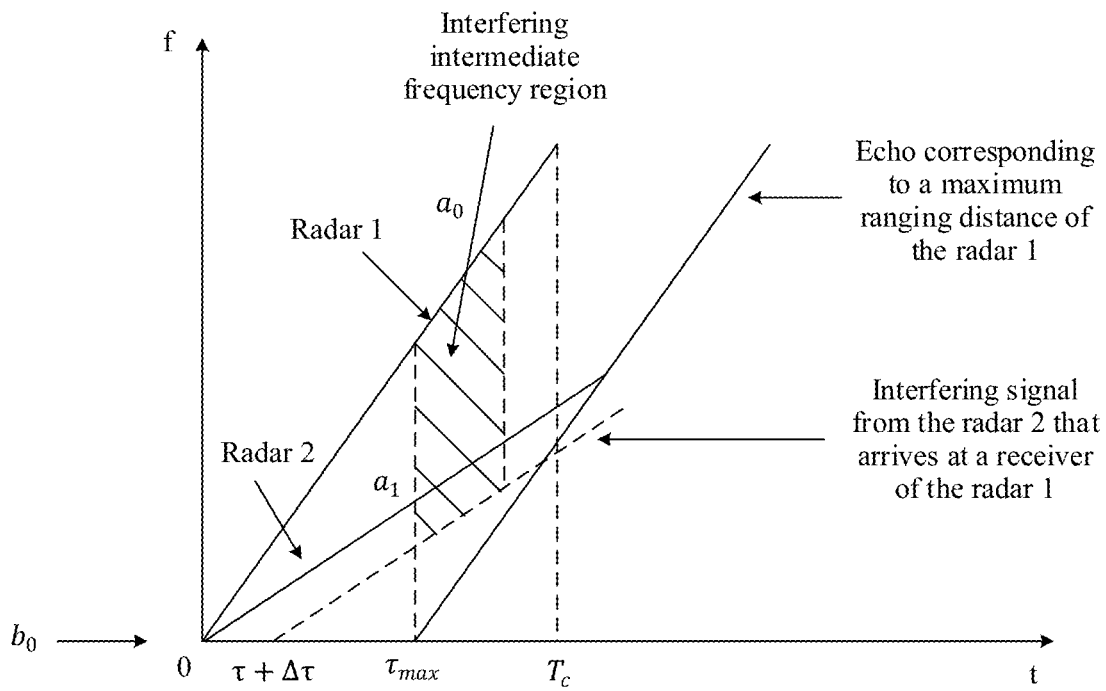
FIG. 10 is a schematic diagram of an interference platform.

The signal waveform of the radar 1 differs from that of the radar 2 in the slope. If a slope of the waveform of the radar 1 is $a_0$ and a slope of the waveform of the radar 2 is $a_1$, a difference between the two slopes may be classified into the following two cases:

When $a_1 < a_0$, as shown in FIG. 10, an interference platform appears, thereby causing missing detection.

Figure 11:
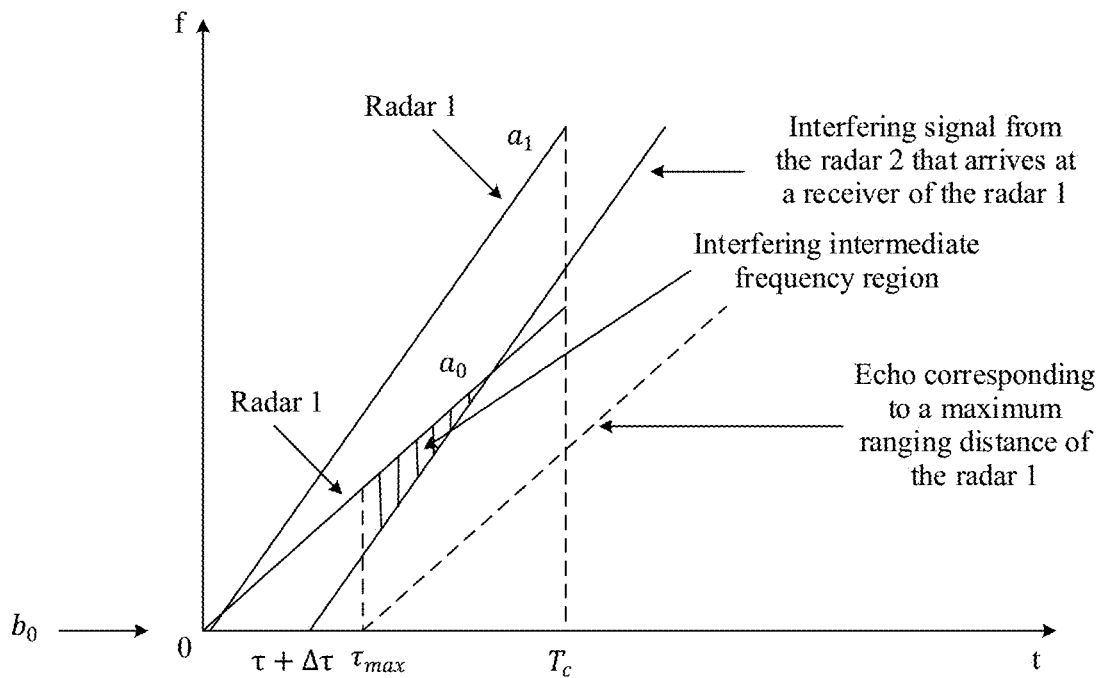
FIG. 11 is a schematic diagram of an interference platform.

When $a_1 > a_0$, as shown in FIG. 11, an interference platform also appears, thereby causing missing detection.

It should be noted herein that, a person skilled in the art can learn that a signal received at a moment or in a period of time may be an interfering signal, or may be a reflected signal from a target object, and a radar detection status can be clearly manifested by a related change status of time and a frequency of a transmitted/reflected signal. Therefore, in subsequent descriptions of the embodiments of this application, a curve diagram manifesting a slope (a frequency change range in a unit time) of a transmitted/reflected signal is mostly used to indicate mutual interference between radars.

However, if a radar detection probability is reduced or a false alarm probability of radar detection is increased, non-negligible impact is posed to safety or comfort of driving. Therefore, how to reduce interference between in-vehicle radars is a problem that needs to be resolved.

Figure 12:
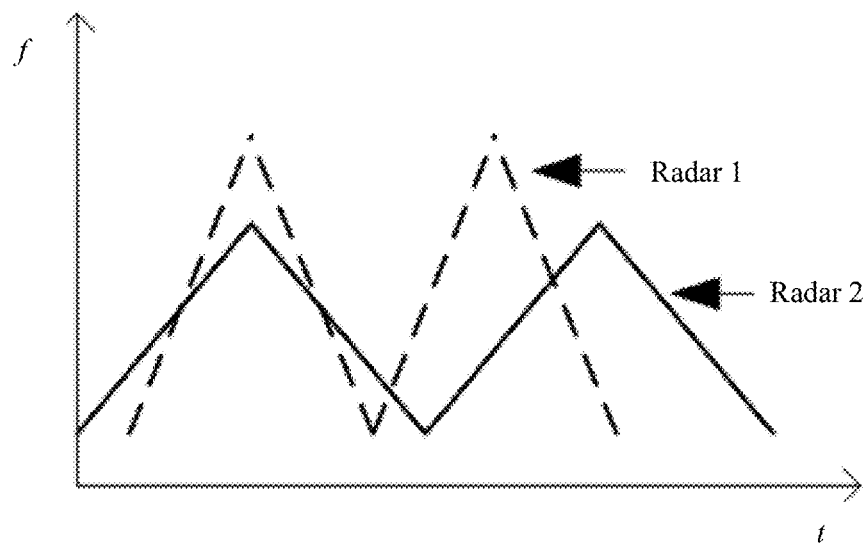
FIG. 12 is a schematic diagram of a possible solution.
Figure 13:
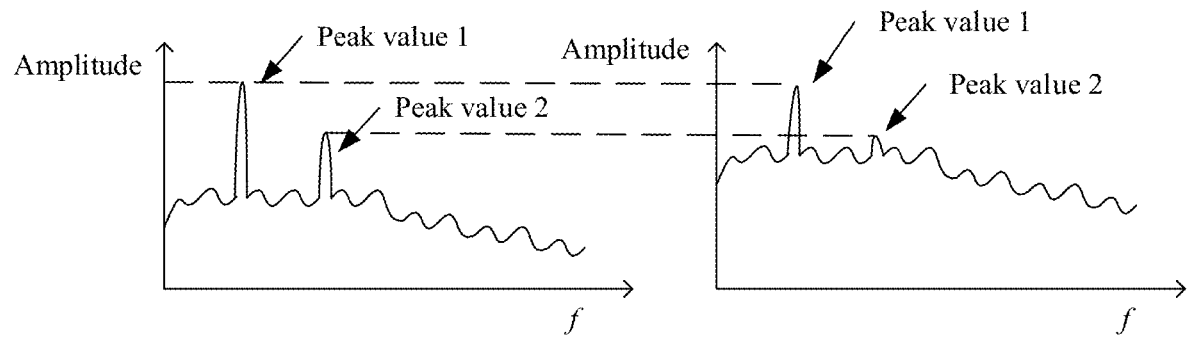
FIG. 13 is a schematic diagram of a possible false alarm result.

To resolve the foregoing problem, in a possible solution, different parameters such as waveform slopes and periods may be set for different radars. FIG. 12 is a schematic diagram of a possible solution. As shown in FIG. 12, parameters such as a slope and a transmission period of a waveform of a signal of a radar 1 are different from those of a radar 2. In this case, even if the radar 1 receives the signal of the radar 2, because the waveforms of the signals of the radar 1 and the radar 2 are different, no intermediate frequency signal with a constant frequency is generated when the signals pass through a frequency mixer, that is, when a difference between frequencies of the two signals is calculated. Only an intermediate frequency signal with a constant frequency is manifested as a peak signal in spectrum analysis. Therefore, this method can reduce a probability that a ghost occurs. However, if the radar 1 receives the signal of the radar 2, and an interfering signal obtained after the signals pass through the frequency mixer falls within a valid receive intermediate frequency bandwidth, a strength of the interfering signal is increased. After a level of the interfering signal is raised, an original target is submerged by interference, as shown in FIG. 13. FIG. 13 is a schematic diagram of a possible missing detection result. A consequence is that an obstacle in front of a vehicle is not detected, and therefore missing detection occurs. This poses serious impact to safety of vehicle driving, especially safety of a driverless driving vehicle.

Figure 14:
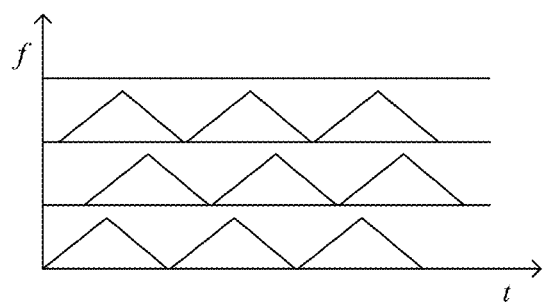
FIG. 14 is a schematic diagram of another possible solution.
Figure 15:
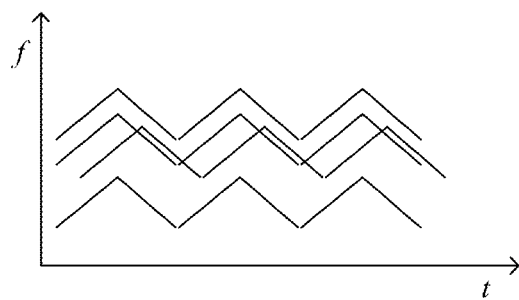
FIG. 15 is a schematic diagram of still another possible solution.

FIG. 14 is a schematic diagram of another possible solution. A technology used in this solution is a radar waveform frequency shift technology. If a radar detects interference from another radar within a sweep frequency band of the radar, the radar switches to another frequency band to prevent interference between a plurality of radars. In the frequency shift technology, a frequency shift interval may be greater than a sweep bandwidth of a radar, as shown in FIG. 14. In this case, waveforms of radars are completely frequency-divided without overlapping. However, because a frequency shift interval is set, excessive frequency-domain resources are occupied, but frequency-domain resources currently allocated to an in-vehicle radar are limited. Alternatively, the frequency shift technology is still used, but a radar performs a random frequency shift after detecting interference from another radar within an operating frequency band of the radar, as shown in FIG. 15. FIG. 15 is a schematic diagram of still another possible solution. In this case, interference can be reduced to some extent. However, a completely random frequency shift inevitably makes waveforms, obtained through the frequency shift, of two radars excessively close in a frequency domain. As a result, a ghost occurs or a strength of an interfering signal increases, thereby causing missing detection of an object.

In view of this, the technical solutions in the embodiments of this application are provided. In some embodiments of this application, the first apparatus may determine the priorities of the plurality of time-frequency resources included in the first time-domain range, so that a time-frequency resource with a comparatively high priority may be selected to send a radar signal. The time-frequency resource with the comparatively high priority is, for example, a time-frequency resource with a comparatively low possibility of a collision. Therefore, in this manner, a probability of a resource collision can be reduced, so as to reduce or avoid interference between radars.

Figure 16:
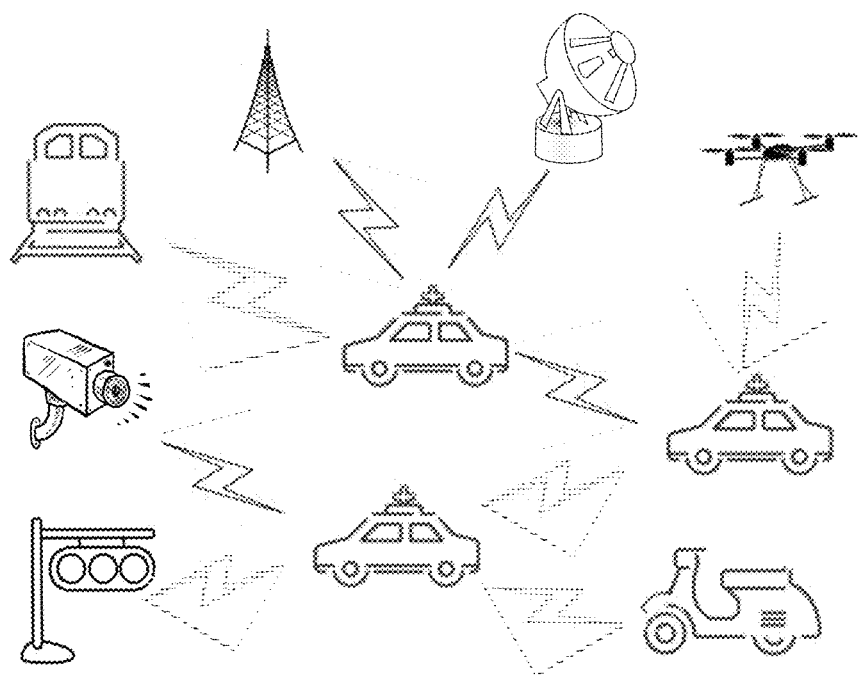
FIG. 16 is a schematic diagram of a possible application scenario according to an embodiment of this application.

FIG. 16 is a schematic diagram of a possible application scenario according to an embodiment of this application. The application scenario may be driverless driving, self-driving, intelligent driving, autonomous driving, connected driving, or the like. A radar detection apparatus may be installed on a motor vehicle (for example, a driverless vehicle, an intelligent vehicle, an electric vehicle, an autonomous vehicle, or a digital vehicle), an unmanned aerial vehicle, a rail vehicle, a bicycle, a signal light, a speed measurement apparatus, a network device (for example, a base station or a terminal device in various systems), or the like. In addition to the radar detection apparatus, a processing apparatus and a communications apparatus may be further installed on these apparatuses. The embodiments of this application are applicable not only to a radar detection apparatus between vehicles, but also to a radar detection apparatus between a vehicle and other apparatus such as an unmanned aerial vehicle, or a radar detection apparatus between other apparatuses. In addition, the radar detection apparatus, the processing apparatus, and the communications apparatus may be installed on a mobile device. For example, the radar detection apparatus is installed on a vehicle as an in-vehicle radar detection apparatus. Alternatively, the radar detection apparatus, the processing apparatus, and the communications apparatus may be installed on a fixed device, for example, installed on a device such as a road side unit (RSU). Installation locations, functions, and the like of the radar detection apparatus, the processing apparatus, and the communications apparatus are not limited in the embodiments of this application.

Figure 17A:
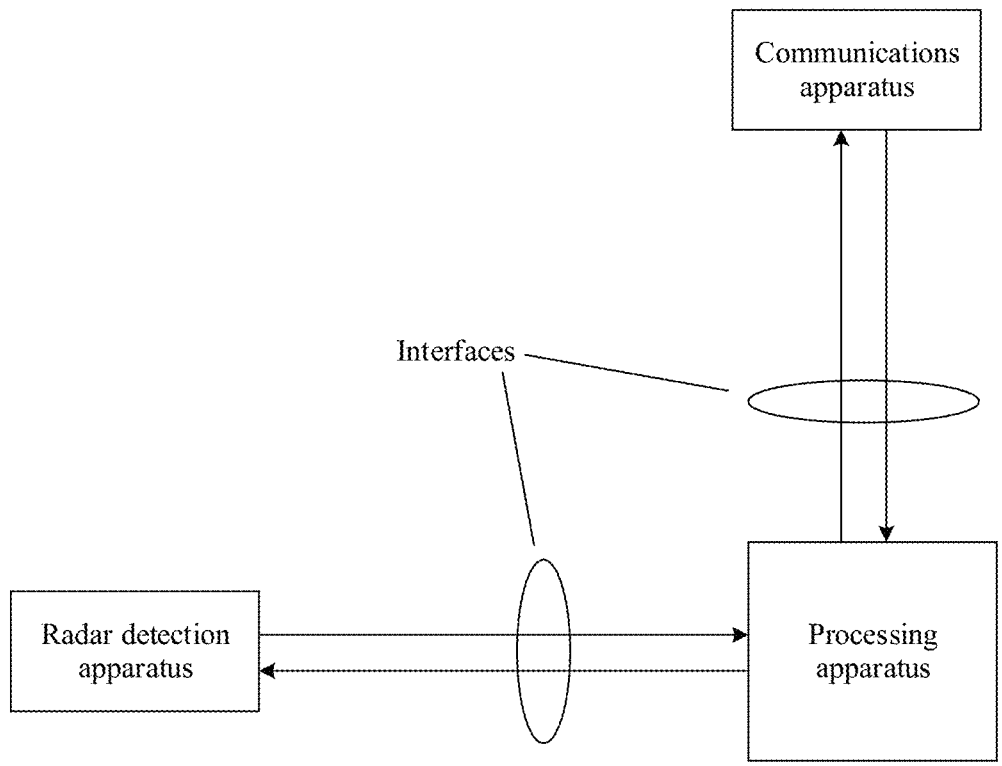
FIG. 17A is a schematic diagram of a system architecture according to an embodiment of this application.

FIG. 17A is a schematic diagram of a system architecture to which an embodiment of this application is applied. FIG. 17A includes a radar detection apparatus, a processing apparatus, and a communications apparatus. The radar detection apparatus and the processing apparatus may communicate with each other. For example, the radar detection apparatus has an interface for communicating with the processing apparatus, the processing apparatus also has an interface for communicating with the radar detection apparatus, and the radar detection apparatus and the processing apparatus may communicate with each other by using a corresponding interface. Alternatively, the radar detection apparatus and the processing apparatus may communicate with each other in a wireless manner. The processing apparatus and the communications apparatus may also communicate with each other. For example, the communications apparatus has an interface for communicating with the processing apparatus, the processing apparatus also has an interface for communicating with the communications apparatus, and the communications apparatus and the processing apparatus may communicate with each other by using a corresponding interface. Alternatively, the communications apparatus and the processing apparatus may communicate with each other in a wireless manner. In addition, the communications apparatus and the radar detection apparatus may also communicate with each other. For example, the radar detection apparatus has an interface for communicating with the communications apparatus, the communications apparatus also has an interface for communicating with the radar detection apparatus, and the radar detection apparatus and the communications apparatus may communicate with each other by using a corresponding interface. Alternatively, the radar detection apparatus and the communications apparatus may communicate with each other in a wireless manner. Alternatively, the radar detection apparatus and the communications apparatus may be unable to communicate with each other, and information may be transferred between the radar detection apparatus and the communications apparatus by using the processing apparatus.

Figure 17B:
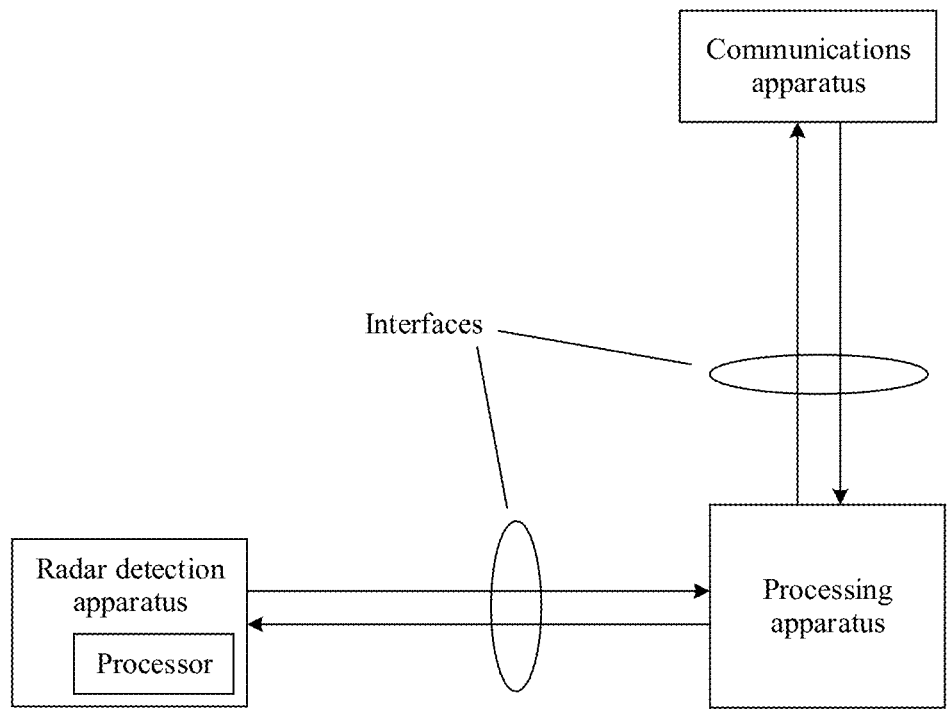
FIG. 17B is a schematic diagram of another system architecture according to an embodiment of this application.

FIG. 17B is a schematic diagram of another system architecture to which an embodiment of this application is applied. FIG. 17B includes a radar detection apparatus, a processing apparatus, and a communications apparatus. A difference between FIG. 17B and FIG. 17A lies only in that the radar detection apparatus in FIG. 17B is more intelligent than the radar detection apparatus in FIG. 17A. It can be learned that a processor is further disposed in the radar detection apparatus in FIG. 17B. It can be considered that the radar detection apparatus in FIG. 17A has a basic processing capability, for example, a capability of performing detection on a target. However, in addition to the basic processing capability, the radar detection apparatus in FIG. 17B further has an extended processing capability, for example, a capability of determining a priority of a time-frequency resource, and/or a capability of selecting a corresponding time-frequency resource from a plurality of time-frequency resources.

In addition, regardless of the system architecture shown in FIG. 17A or the system architecture shown in FIG. 17B, the radar detection apparatus, the processing apparatus, and the communications apparatus may be three separate apparatuses. For example, the three apparatuses are all installed on a vehicle or an RSU. Alternatively, the radar detection apparatus, the processing apparatus, and the communications apparatus may be integrated into one apparatus. For example, the apparatus is generally referred to as a radar detection apparatus, or for differentiation, the apparatus may be referred to as a third radar detection apparatus. For example, the apparatus is installed on a vehicle or an RSU. Alternatively, the radar detection apparatus and the processing apparatus may be integrated into one apparatus. For example, the apparatus is generally referred to as a radar detection apparatus, or for differentiation, the apparatus may be referred to as a third radar detection apparatus. In addition, the communications apparatus may be an independent apparatus. Alternatively, the radar detection apparatus and the communications apparatus may be integrated into one apparatus. For example, the apparatus is generally referred to as a radar detection apparatus, or for differentiation, the apparatus may be referred to as a third radar detection apparatus. In addition, the processing apparatus may be an independent apparatus. Alternatively, the processing apparatus and the communications apparatus may be integrated into one apparatus, and the radar detection apparatus may be an independent apparatus. Regardless of whether the radar detection apparatus, the processing apparatus, and the communications apparatus are integrated into one apparatus or are separate apparatuses, the radar detection apparatus, the processing apparatus, and the communications apparatus are used for description below. The embodiments of this application may be performed by a first apparatus, and the first apparatus may be the radar detection apparatus or the processing apparatus.

In addition, in the embodiments of this application, an "object" may be a carrier that carries a radar detection apparatus, for example, a vehicle or an RSU. One object may carry at least one radar detection apparatus, at least one processing apparatus, and at least one communications apparatus. A radar detection apparatus, a processing apparatus, and a communications apparatus carried on one object may be in a one-to-one correspondence. Alternatively, a plurality of radar detection apparatuses may correspond to one processing apparatus, a plurality of radar detection apparatuses may correspond to one communications apparatus, a plurality of processing apparatuses may correspond to one communications apparatus, or the like. For example, one object may carry two radar detection apparatuses, two processing apparatuses, and two communications apparatuses, where the radar detection apparatuses, the processing apparatuses, and the communications apparatuses are in a one-to-one correspondence; or one object may carry two radar detection apparatuses, one processing apparatus, and one communication apparatus, where the two radar detection apparatuses both correspond to the processing apparatus and the communication apparatus; or one object may carry four radar detection apparatuses, two processing apparatuses, and two communications apparatuses, where every two radar detection apparatuses correspond to one processing apparatus and one communications apparatus; or one object may carry four radar detection apparatuses, two processing apparatuses, and one communications apparatus, where every two radar detection apparatuses correspond to one processing apparatus, and the four radar detection apparatuses and the two processing apparatuses all correspond to the communications apparatus.

In addition, a signal sent by a radar detection apparatus may be a radio signal, and the radio signal may be considered as a radar signal. In the embodiments of this application, an example in which a detection apparatus is a radar detection apparatus and a signal sent by the radar detection apparatus is a radar signal is used.

It should be noted that, in the embodiments of this application, a first time-domain range may be one of a plurality of time-domain ranges, the plurality of time-domain ranges may be continuous duration, and a radar detection apparatus may send a radio signal with one or more sweep periods in the continuous duration. The plurality of time-domain ranges may be time-divided, in other words, the plurality of time-domain ranges do not overlap in time. This may be understood as that any two of the plurality of time-domain ranges do not overlap in a time domain. A time-domain range may also be referred to as a time-domain unit, a time-domain resource, a time unit, a time resource, duration, or the like. A specific name is not limited. A length of a time-domain range, for example, a length of the first time-domain range, may be equal to a transmission period (or referred to as a sweep period, sweep duration, or the like) of the radar detection apparatus. In other words, a time-domain length of each of the plurality of time-domain ranges may be the sweep period of the radar detection apparatus. Alternatively, a length of a time-domain range, for example, a length of the first time-domain range, may be equal to an integer multiple of a sweep period of the radar detection apparatus. For example, if duration of the first time-domain range is 500 sweep periods, correspondingly, the radar detection apparatus needs to transmit a radar signal with 500 sweep periods in the first time-domain range. In some scenarios, time-domain lengths of the plurality of time-domain ranges are the same. For example, a time-domain length of the plurality of time-domain ranges is one frame (for example, 50 ms), and a time-domain length of each time-domain range is, for example, 5 ms. Alternatively, in some other scenarios, time-domain lengths of the plurality of time-domain ranges may not be exactly the same.

The following describes the technical solutions provided in the embodiments of this application with reference to the accompanying drawings.

Figure 18:
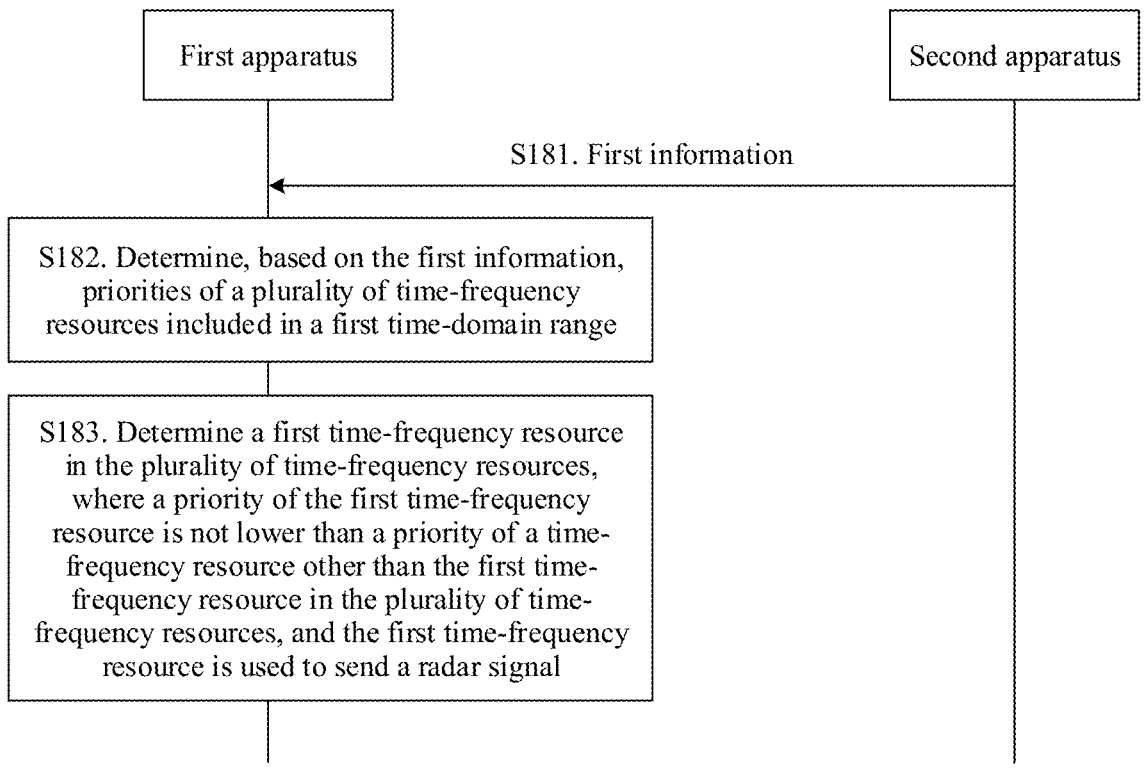
FIG. 18 is a flowchart of a first communication method according to an embodiment of this application.

Embodiments of this application provide for a communication method. FIG. 18 is a flowchart of the method. In the following description process, an example in which the method is applied to the network architecture shown in FIG. 16 is used, and an example in which the method is applied to the system architecture shown in FIG. 17A or FIG. 17B is also used. The method provided in the embodiment shown in FIG. 18 may be performed by a first apparatus. The first apparatus may be the radar detection apparatus or the processing apparatus shown in FIG. 17A or FIG. 17B. In addition, the first apparatus may be installed on a vehicle in the network architecture shown in FIG. 16.

S181. The first apparatus receives first information from a second apparatus.

If the first apparatus is, for example, a radar detection apparatus, the second apparatus may be a processing apparatus. Alternatively, the first apparatus is a processing apparatus, and the second apparatus may be a communications apparatus. Alternatively, if a radar detection apparatus and a communications apparatus can communicate with each other, the first apparatus may be the radar detection apparatus, and the second apparatus is the communications apparatus.

In an optional manner, if the first apparatus is a processing apparatus, the first information may include information about at least one object and/or information about a radar detection apparatus carried on the at least one object. The first information may include the information about the at least one object or the information about the radar detection apparatus carried on the at least one object, or include the information about the at least one object and the information about the radar detection apparatus carried on the at least one object.

Information about one of the at least one object includes at least one of location information or a driving direction of the object. For example, the information may include the location information of the object, the driving direction of the object, or includes the location information and the driving direction of the object. Information about a radar detection apparatus carried on the one of the at least one object includes at least one of a location of the radar detection apparatus in the object or information about a time-frequency resource occupied by the radar detection apparatus, for example, includes the location of the radar detection apparatus in the object or the information about the time-frequency resource occupied by the radar detection apparatus, or includes the location of the radar detection apparatus in the object and the information about the time-frequency resource occupied by the radar detection apparatus. Certainly, one object may carry one or more radar detection apparatuses. If one object carries a plurality of radar detection apparatuses, information about a radar detection apparatus carried on the object may include information about all or some of the radar detection apparatuses carried on the object.

As described above, an "object" may be a carrier that carries a radar detection apparatus, for example, a vehicle or an RSU. The first information may be information received by a communications apparatus from other communications apparatus. The other communications apparatus may include a communications apparatus carried on another object. Alternatively, if an object carrying the first apparatus further carries other communications apparatuses in addition to a communications apparatus corresponding to the first apparatus, the other communications apparatus may also include one or more communications apparatuses carried on the object other than the communications apparatus corresponding to the first apparatus. For example, a processing apparatus carried on an object may send information about the object and/or information about a radar detection apparatus carried on the object to a communications apparatus corresponding to the processing apparatus, and the communications apparatus may broadcast the information, so that another communications apparatus may receive the information. Alternatively, if the radar detection apparatus can directly communicate with the communications apparatus, the information about the radar detection apparatus carried on the object may be alternatively sent by the radar detection apparatus to the communications apparatus. If the communications apparatus cannot directly communicate with the radar detection apparatus, the communications apparatus may send the first information to the processing apparatus after receiving the first information. Alternatively, if the communications apparatus can directly communicate with the radar detection apparatus, after receiving the first information, the communications apparatus may send the first information to the radar detection apparatus, or send the first information to the processing apparatus, or separately send the first information to the radar detection apparatus and the processing apparatus.

In another optional embodiments, if the first apparatus is a radar detection apparatus, the first information may include information about at least one object and/or information about a radar detection apparatus carried on the at least one object. For example, the second apparatus may be a processing apparatus. This is equivalent to that a communications apparatus receives the first information and sends the first information to the processing apparatus, and then the processing apparatus sends the first information to the radar detection apparatus. Alternatively, the second apparatus may be a communications apparatus, the communications apparatus can directly communicate with the radar detection apparatus, and the communications apparatus may directly send the first information to the radar detection apparatus after receiving the first information. In this manner, the radar detection apparatus needs to autonomously determine priorities of a plurality of time-frequency resources included in a first time-domain range. Therefore, this manner is comparatively applicable to a radar detection apparatus with a comparatively strong capability. For example, this manner is applicable to the radar detection apparatus shown in FIG. 17B.

Alternatively, if the first apparatus is a radar detection apparatus, the first information may include priorities of a plurality of time-frequency resources included in a first time-domain range. In this case, the second apparatus may be a processing apparatus. This is equivalent to that, after receiving information about at least one object and/or information about a radar detection apparatus carried on the at least one object, a communications apparatus may send the received information to the processing apparatus, the processing apparatus determines the priorities of the plurality of time-frequency resources included in the first time-domain range, and then sends a determining result to the radar detection apparatus, and the radar detection apparatus does not need to perform determining autonomously. This manner is applicable to the radar detection apparatus shown in FIG. 17A or the radar detection apparatus shown in FIG. 17B.

S182. The first apparatus determines, based on the first information, priorities of a plurality of time-frequency resources included in a first time-domain range.

As described above, the first time-domain range may be one of a plurality of time-domain ranges. In this case, the first apparatus may first determine the first time-domain range in the plurality of time-domain ranges. For example, the first apparatus may randomly select one of the plurality of time-domain ranges as the first time-domain range, or the first apparatus may have another selection manner. For example, the first apparatus may obtain received signal powers of the plurality of time-domain ranges, and select a time-domain range with a smallest received signal power as the first time-domain range.

If the first apparatus is a radar detection apparatus, the radar detection apparatus may perform listening to obtain the received signal powers of the plurality of time-domain ranges, and the radar detection apparatus may autonomously select the time-domain range with the smallest received signal power from the plurality of time-domain ranges. This manner is applicable to the radar detection apparatus shown in FIG. 17A or the radar detection apparatus shown in FIG. 17B. Alternatively, because the radar detection apparatus needs to autonomously select the time-domain range with the smallest received signal power, this manner is more applicable to the radar detection apparatus shown in FIG. 17B. Alternatively, if the first apparatus is a radar detection apparatus, the radar detection apparatus may perform listening to obtain the received signal powers of the plurality of time-domain ranges, and the radar detection apparatus may send the obtained received signal powers of the plurality of time-domain ranges to a processing apparatus. Therefore, the processing apparatus may obtain the received signal powers of the plurality of time-domain ranges, the processing apparatus may select the time-domain range with the smallest received signal power from the plurality of time-domain ranges, and then the processing apparatus sends information about the selected time-domain range to the radar detection apparatus. This manner is applicable to the radar detection apparatus shown in FIG. 17A or the radar detection apparatus shown in FIG. 17B. Alternatively, if the first apparatus is a processing apparatus, a radar detection apparatus may perform listening (e.g., measuring, sensing) to obtain the received signal powers of the plurality of time-domain ranges, and the radar detection apparatus may send the obtained received signal powers of the plurality of time-domain ranges to the processing apparatus. Therefore, the processing apparatus may obtain the received signal powers of the plurality of time-domain ranges, and the processing apparatus may select the time-domain range with the smallest received signal power from the plurality of time-domain ranges. This manner is applicable to the radar detection apparatus shown in FIG. 17A or the radar detection apparatus shown in FIG. 17B. If received signal powers of at least two of the plurality of time-domain ranges are the same and are the smallest, the processing apparatus or the radar detection apparatus may select one of the at least two time-domain ranges as the first time-domain range, for example, may randomly select a time-domain range from the at least two time-domain ranges.

For example, the first time-domain range may include the plurality of time-frequency resources. How to determine specific time-frequency resources in the first time-domain range is not limited to embodiments of this application. If the technical solution in embodiments of this application are applied to a radar detection apparatus capable of collaboration, at least two of the plurality of time-frequency resources may overlap in a time domain. In this case, at least two of the plurality of time-frequency resources may overlap in a frequency domain, or the plurality of time-frequency resources may be identical in the frequency domain. The "overlapping" described herein may be understood as having an intersection but not being identical.

Alternatively, if the technical solution in embodiments of this application are applied to a radar detection apparatus incapable of collaboration, the plurality of time-frequency resources may be frequency-divided. For example, a plurality of time-domain resources do not overlap in the frequency domain. This may be understood as that any two of the plurality of time-domain resources do not overlap in the frequency domain. The "not overlapping" may be understood as having no intersection. Further, optionally, a plurality of time-domain resources may completely overlap in a time domain. This may be understood as that any two of the plurality of time-domain resources completely overlap in the time domain. If the time-domain lengths of two time-domain resources are the same, that the two time-domain resources completely overlap in the time domain may mean that time-domain locations of the two time-domain resources are completely the same. Alternatively, if time-domain lengths of two time-domain resources are different, that the two time-domain resources completely overlap in the time domain may mean that a time-domain location of one of the two time-domain resources is completely included in a time-domain location of the other time-domain resource. Alternatively, a plurality of time-domain resources may not overlap in the time domain. This may be understood as that any two of the plurality of time-domain resources do not overlap in the time domain. This is equivalent to that the plurality of time-frequency resources are time-divided and frequency-divided.

The radar detection apparatus being capable of collaboration means that one or more of a time at which the radar detection apparatus sends a radio signal, a frequency of a radio signal sent by the radar detection apparatus, a waveform of a radio signal sent by the radar detection apparatus, or the like may be selected from a preset resource pool to reduce interference. For example, the time at which the radar detection apparatus sends the radio signal may be selected from the preset resource pool; the frequency of the radio signal sent by the radar detection apparatus may be selected from the preset resource pool; the waveform of the radio signal sent by the radar detection apparatus may be selected from the preset resource pool; both the time at which the radar detection apparatus sends the radio signal and the frequency of the radio signal sent by the radar detection apparatus may be selected from the preset resource pool; both the time at which the radar detection apparatus sends the radio signal and the waveform of the radio signal sent by the radar detection apparatus may be selected from the preset resource pool; or the time at which the radar detection apparatus sends the radio signal, the frequency of the radio signal sent by the radar detection apparatus, and the waveform of the radio signal sent by the radar detection apparatus may be all selected from the preset resource pool. A resource pool used for selecting the time at which the radio signal is sent, a resource pool used for selecting the frequency of the sent radio signal, and a resource pool used for selecting the waveform of the sent radio signal may be a same resource pool. For example, the same resource pool includes a plurality of different types of elements. Alternatively, the three resource pools may be different resource pools.

The radar detection apparatus incapable of collaboration means that none of one or more of a time at which the radar detection apparatus sends a radio signal, a frequency of a radio signal sent by the radar detection apparatus, a waveform of a radio signal sent by the radar detection apparatus, or the like is selected from a preset resource pool, for example, is autonomously determined by the radar detection apparatus.

The first apparatus may determine the priorities of the plurality of the time-frequency resources included in the first time-domain range. If the first apparatus is a radar detection apparatus, the radar detection apparatus may autonomously determine the priorities of the plurality of time-frequency resources. This manner is comparatively applicable to a radar detection apparatus with a comparatively strong capability. For example, this manner is applicable to the radar detection apparatus shown in FIG. 17B. For example, the first information may include information about at least one object and/or information about a radar detection apparatus carried on the at least one object. After receiving the first information, a communications apparatus sends the first information to a processing apparatus, and then the processing apparatus sends the first information to the radar detection apparatus. Alternatively, the communications apparatus may directly send the first information to the radar detection apparatus. After obtaining the first information, the radar detection apparatus may determine the priorities of the plurality of time-frequency resources based on the first information.

Alternatively, if the first apparatus is a radar detection apparatus, a processing apparatus may determine the priorities of the plurality of time-frequency resources. After receiving information about at least one object and/or information about a radar detection apparatus carried on the at least one object, a communications apparatus sends the information to the processing apparatus. The processing apparatus determines the priorities of the plurality of time-frequency resources based on the information. Then the processing apparatus directly sends the priorities of the plurality of time-frequency resources to the radar detection apparatus. In this case, the first information includes the priorities of the plurality of time-frequency resources. This manner is applicable to the radar detection apparatus shown in FIG. 17A or the radar detection apparatus shown in FIG. 17B.

Alternatively, if the first apparatus is a processing apparatus, the first information may include information about at least one object and/or information about a radar detection apparatus carried on the at least one object. After receiving the first information, a communications apparatus sends the first information to the processing apparatus. The processing apparatus determines the priorities of the plurality of time-frequency resources based on the first information. This manner is applicable to the radar detection apparatus shown in FIG. 17A or the radar detection apparatus shown in FIG. 17B.

Regardless of whether the priorities of the plurality of time-frequency resources are determined by the radar detection apparatus based on the first information, or the priorities of the plurality of time-frequency resources are determined by the processing apparatus based on the first information, determining manners may be similar. For example, a manner of determining, by the first apparatus, the priorities of the plurality of time-frequency resources based on the first information may be as follows: The first apparatus determines the priorities of the plurality of time-frequency resources according to a first rule and based on the first information.

The first rule is as follows: when a distance between a first object and the first apparatus is greater than a distance between a second object and the first apparatus, and/or when a detection range of a first radar detection apparatus carried on the first object and a detection range of a second radar detection apparatus corresponding to the first apparatus have no intersection in space, and a detection range of a third radar detection apparatus carried on the second object and the detection range of the second radar detection apparatus corresponding to the first apparatus have an intersection in space, a priority of a second time-frequency resource is higher than a priority of a third time-frequency resource.

The first rule may include: when the distance between the first object and the first apparatus is greater than the distance between the second object and the first apparatus, the priority of the second time-frequency resource is higher than the priority of the third time-frequency resource. Alternatively, the first rule includes: when the detection range of the first radar detection apparatus carried on the first object and the detection range of the second radar detection apparatus corresponding to the first apparatus have no intersection in space, and the detection range of the third radar detection apparatus carried on the second object and the detection range of the second radar detection apparatus corresponding to the first apparatus have an intersection in space, the priority of the second time-frequency resource is higher than the priority of the third time-frequency resource. Alternatively, the first rule includes: when the distance between the first object and the first apparatus is greater than the distance between the second object and the first apparatus, the detection range of the first radar detection apparatus carried on the first object and the detection range of the second radar detection apparatus corresponding to the first apparatus have no intersection in space, and the detection range of the third radar detection apparatus carried on the second object and the detection range of the second radar detection apparatus corresponding to the first apparatus have an intersection in space, the priority of the second time-frequency resource is higher than the priority of the third time-frequency resource.

The second radar detection apparatus corresponding to the first apparatus is mentioned in the first rule. If the first apparatus is a radar detection apparatus, the second radar detection apparatus corresponding to the first apparatus is the first apparatus itself; or if the first apparatus is a processing apparatus, the second radar detection apparatus corresponding to the first apparatus is a radar detection apparatus corresponding to the processing apparatus. In the embodiments of this application, that a radar detection apparatus corresponds to a processing apparatus means that the radar detection apparatus can communicate with the processing apparatus; that a radar detection apparatus corresponds to a communications apparatus means that the radar detection apparatus can directly communicate with the communications apparatus, or means that the radar detection apparatus can communicate with the communications apparatus by using a processing apparatus; that a processing apparatus corresponds to a communications apparatus means that the processing apparatus can communicate with the communications apparatus.

For example, the first rule includes: when the distance between the first object and the first apparatus is greater than the distance between the second object and the first apparatus, the priority of the second time-frequency resource is higher than the priority of the third time-frequency resource. The second time-frequency resource is a time-frequency resource occupied by the first object. The third time-frequency resource is a time-frequency resource occupied by the second object. For example, the first object is a vehicle 1, the second object is a vehicle 2, a distance between the vehicle 1 and the first apparatus is 100 m, and a distance between the vehicle 2 and the first apparatus is 80 m. In this case, the priority of the second time-frequency resource is higher than the priority of the third time-frequency resource. If a distance between an object and the first apparatus is comparatively long, even if a time-frequency resource occupied by the object is simultaneously used by the first apparatus, a possibility of a resource collision between the first apparatus and the object is comparatively low. Therefore, a priority of the time-frequency resource occupied by the object may be comparatively high. However, if a distance between an object and the first apparatus is comparatively short, if a time-frequency resource occupied by the object is simultaneously used by the first apparatus, a possibility of a resource collision between the first apparatus and the object is comparatively high. Therefore, if a time-frequency resource is selected based on a priority specified in this manner, a probability of a resource collision can be reduced.

The second time-frequency resource is the time-frequency resource occupied by the first object, and may be a time-frequency resource occupied by a radar detection apparatus carried on the first object, for example, a time-frequency resource occupied by the first radar detection apparatus carried on the first object. For example, the first object may carry one or more radar detection apparatuses. If the first object carries a plurality of radar detection apparatuses, the second time-frequency resource may be a time-frequency resource occupied by one of the radar detection apparatuses (e.g., the first radar detection apparatus). This is also true for the third time-frequency resource. The third time-frequency resource is the time-frequency resource occupied by the second object, and may be a time-frequency resource occupied by a radar detection apparatus carried on the second object, for example, a time-frequency resource occupied by the third radar detection apparatus carried on the second object. For example, the second object may carry one or more radar detection apparatuses. If the second object carries a plurality of radar detection apparatuses, the third time-frequency resource may be a time-frequency resource occupied by one of the radar detection apparatuses (e.g., the third radar detection apparatus).

In addition, a distance between an object and the first apparatus may be a distance between the object and the first apparatus, or a distance between the object and an object carrying the first apparatus, or a distance between a radar detection apparatus carried on the object and the first apparatus. For example, the first object is a vehicle 1, a vehicle 2 carries the first apparatus, the first apparatus is a radar detection apparatus 2, and the vehicle 1 carries a radar detection apparatus 1. In this case, the distance between the first object and the first apparatus may be a distance between the vehicle 1 and the radar detection apparatus 2, or a distance between the vehicle 1 and the vehicle 2, or a distance between the radar detection apparatus 1 and the radar detection apparatus 2. If a distance between an object and the object carrying the first apparatus is directly used as a distance between the object and the first apparatus, a calculation manner is comparatively simple. Alternatively, because the second time-frequency resource (or the third time-frequency resource) is actually a time-frequency resource occupied by one radar detection apparatus, one object may carry one or more radar detection apparatuses, and distances between different radar detection apparatuses and the first apparatus may be different, if a distance between a radar detection apparatus carried on an object and the first apparatus is used as a distance between the object and the first apparatus, a result is comparatively accurate.

Alternatively, the first rule includes: when the detection range of the first radar detection apparatus carried on the first object and the detection range of the second radar detection apparatus corresponding to the first apparatus have no intersection in space, and the detection range of the third radar detection apparatus carried on the second object and the detection range of the second radar detection apparatus corresponding to the first apparatus have an intersection in space, the priority of the second time-frequency resource is higher than the priority of the third time-frequency resource.

Figure 19A:
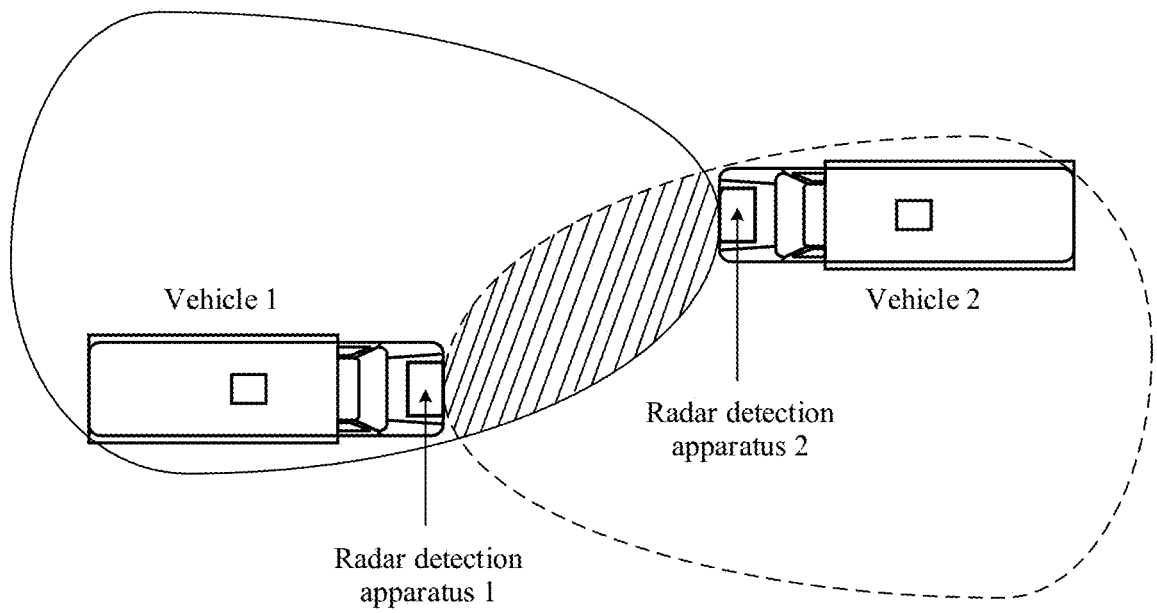
FIG. 19A is a schematic diagram in which detection ranges of two radar detection apparatuses have an intersection in space according to an embodiment of this application.

For a radar detection apparatus, there is a radiation angle when a signal is transmitted. If radiation angles of two radar detection apparatuses have an intersection in space, it is considered that detection ranges of the two radar detection apparatuses have an intersection in space. For example, referring to FIG. 19A, a vehicle 1 carries a radar detection apparatus 1, and a vehicle 2 carries a radar detection apparatus 2. A detection range of the radar detection apparatus 1 is shown by a dashed ring in FIG. 19A, and a detection range of the radar detection apparatus 2 is shown by a solid ring in FIG. 19A. It can be learned that the two detection ranges have an intersection in space, and a part shown by an oblique line is the intersection of the two detection ranges.

If detection ranges of two radar detection apparatuses have an intersection in space, if the two radar detection apparatuses use a same time-frequency resource to send a radar signal, a possibility of a collision is comparatively high. Therefore, if the detection range of the first radar detection apparatus and the detection range of the second radar detection apparatus have no intersection in space, but the detection range of the third radar detection apparatus and the detection range of the second radar detection apparatus have an intersection in space, the priority of the second time-frequency resource is higher than the priority of the third time-frequency resource. This is equivalent to that, if a detection range of a radar detection apparatus and the detection range of the second radar detection apparatus have no intersection in space, for the first apparatus, a priority of a time-frequency resource occupied by the radar detection apparatus is comparatively high. However, if a detection range of a radar detection apparatus and the detection range of the second radar detection apparatus have an intersection in space, for the first apparatus, a priority of a time-frequency resource occupied by the radar detection apparatus is comparatively low. In this manner, a probability of a resource collision can be reduced.

Alternatively, the first rule includes: when the distance between the first object and the first apparatus is greater than the distance between the second object and the first apparatus, and when the detection range of the first radar detection apparatus carried on the first object and the detection range of the second radar detection apparatus corresponding to the first apparatus have no intersection in space, and the detection range of the third radar detection apparatus carried on the second object and the detection range of the second radar detection apparatus corresponding to the first apparatus have an intersection in space, the priority of the second time-frequency resource is higher than the priority of the third time-frequency resource. When the two conditions are met, it is determined that the priority of the second time-frequency resource is higher than the priority of the third time-frequency resource. If only one of the two conditions is met, a magnitude relationship between the priority of the second time-frequency resource and the priority of the third time-frequency resource cannot be determined. A conditional limitation is added, so that a determined priority of a time-frequency resource can be more accurate.

Certainly, in addition to the foregoing rules, the first rule may further include another rule; or the first rule may not include the foregoing rules, but include only another rule. This is not specifically limited.

The foregoing describes a process in which the radar detection apparatus initially sets a priority of a time-frequency resource. For example, when the radar detection apparatus is initially put into use, or when the radar detection apparatus is powered on to work, a priority of a time-frequency resource may be set by using the foregoing method.

S183. The first apparatus determines a first time-frequency resource in the plurality of time-frequency resources. A priority of the first time-frequency resource is not lower than a priority of a time-frequency resource other than the first time-frequency resource in the plurality of time-frequency resources. The first time-frequency resource is used to send a radar signal.

After determining the priorities of the plurality of time-frequency resources, the first apparatus may select, in descending order of priorities, a time-frequency resource with a highest priority from the plurality of time-frequency resources as the first time-frequency resource. Therefore, the priority of the first time-frequency resource is not lower than the priority of the time-frequency resource other than the first time-frequency resource in the plurality of time-frequency resources. If priorities of at least two of the plurality of time-frequency resources are the same and are the highest, the first apparatus may select one of the at least two time-frequency resources as the first time-frequency resource. For example, the first apparatus may randomly select one of the at least two time-frequency resources as the first time-frequency resource.

If the first apparatus is a processing apparatus, the first information may include information about at least one object and/or information about a radar detection apparatus carried on the at least one object. A communications apparatus may receive the first information, and send the first information to the processing apparatus. The processing apparatus determines the priorities of the plurality of time-frequency resources based on the first information, and then selects the first time-frequency resource based on the priorities of the plurality of time-frequency resources. In addition, after selecting the first time-frequency resource, the processing apparatus may send information about the first time-frequency resource to a radar detection apparatus, so that the radar detection apparatus may send a radar signal on the first time-frequency resource indicated by the information about the first time-frequency resource. For example, the radar signal sent by the radar detection apparatus on the first time-frequency resource is referred to as a first radar signal. This manner is applicable to the radar detection apparatus shown in FIG. 17A or the radar detection apparatus shown in FIG. 17B.

Alternatively, if the first apparatus is a radar detection apparatus, the first information may include information about at least one object and/or information about a radar detection apparatus carried on the at least one object. A communications apparatus may receive the first information and send the first information to a processing apparatus, and then the processing apparatus sends the first information to the radar detection apparatus. Alternatively, the communications apparatus may directly send the first information to the radar detection apparatus. After receiving the first information, the radar detection apparatus may determine the priorities of the plurality of time-frequency resources based on the first information, and then select the first time-frequency resource based on the priorities of the plurality of time-frequency resources. The radar detection apparatus may send a first radar signal on the first time-frequency resource. This manner is more suitable for a radar detection apparatus with a comparatively strong capability, for example, is more applicable to the radar detection apparatus shown in FIG. 17B.

Alternatively, if the first apparatus is a radar detection apparatus, the first information may include the priorities of the plurality of time-frequency resources. For example, a communications apparatus may receive information about at least one object and/or information about a radar detecting apparatus carried on the at least one object, and send the received information to a processing apparatus. The processing apparatus may determine the priorities of the plurality of time-frequency resources based on the information about the at least one object and/or the information about the radar detection apparatus carried on the at least one object. The processing apparatus sends the determined priorities of the plurality of time-frequency resources to the radar detection apparatus. After obtaining the priorities of the plurality of time-frequency resources, the radar detection apparatus may select the first time-frequency resource from the plurality of time-frequency resources based on the priorities of the plurality of time-frequency resources. The radar detection apparatus may send a first radar signal on the first time-frequency resource. This manner is applicable to the radar detection apparatus shown in FIG. 17A or the radar detection apparatus shown in FIG. 17B. Alternatively, because the radar detection apparatus needs to select the first time-frequency resource from the plurality of time-frequency resources based on the priorities of the plurality of time-frequency resources, this manner is more suitable for a radar detection apparatus with a comparatively strong capability, for example, is more applicable to the radar detection apparatus shown In FIG. 17B.

Figure 19B:
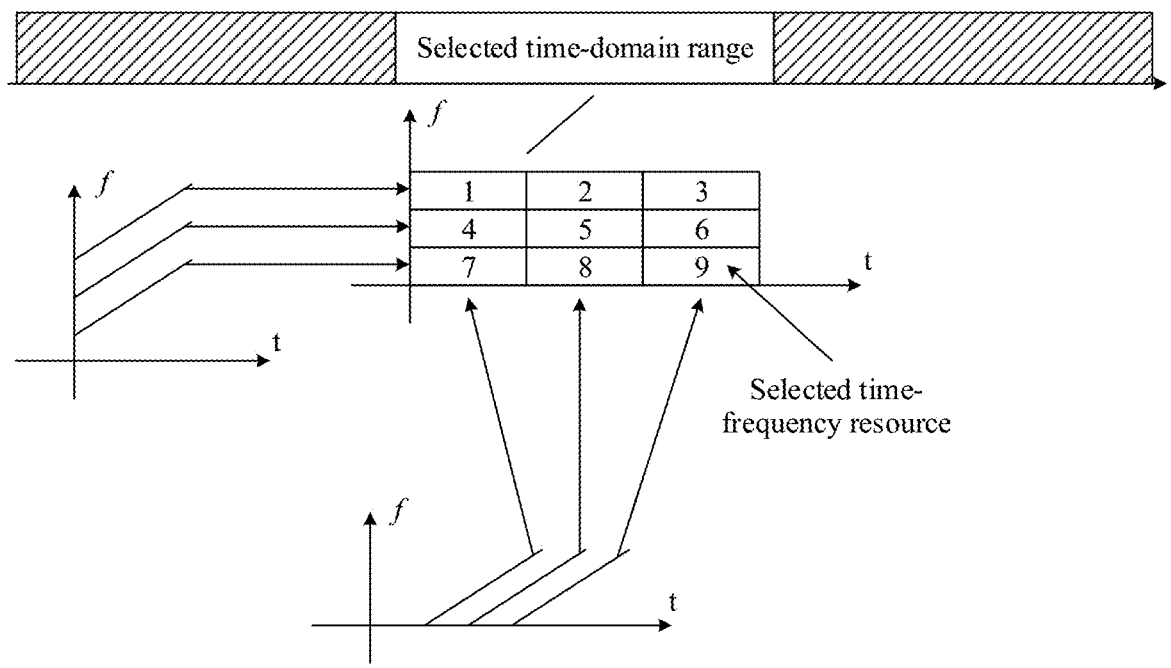
FIG. 19B is a schematic diagram of a first time-domain range and a first time-frequency resource according to an embodiment of this application.
Figure 19C:
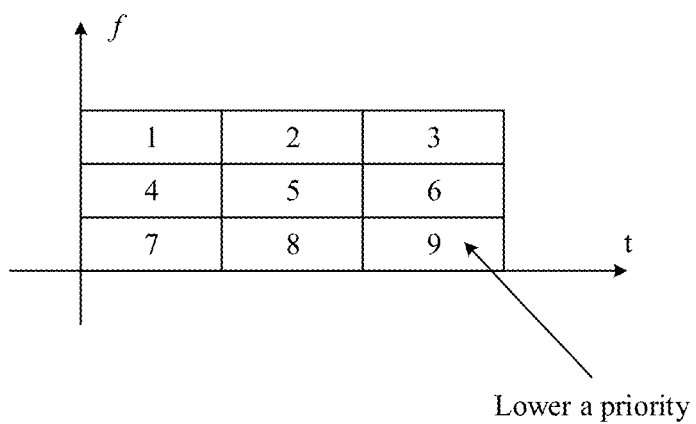
FIG. 19C is a schematic diagram of lowering a priority of a first time-frequency resource according to an embodiment of this application.

For example, FIG. 19B is a schematic diagram of the first time-domain range and the first time-frequency resource. In FIG. 19B, an oblique line in lower coordinate axes represents a waveform of the first radar signal sent by the radar detection apparatus, and left coordinate axes represent a frequency-domain location of the first radar signal sent by the radar detection apparatus. Three oblique lines in the lower coordinate axes are in a one-to-one correspondence with three oblique lines in the left coordinate axes. For example, the $1^{st}$ oblique line from left to right in the lower coordinate axes corresponds to the $1^{st}$ oblique line from top to bottom in the left coordinate axes, and the two oblique lines represent a waveform of a radar signal sent on a time-frequency resource in upper coordinate axes. In an upper area, a slashed region represents an occupied time-domain range (possibly with a comparatively high received signal power), and a blank region represents an idle time-domain range (possibly with a comparatively low received signal power). The first time-domain range may be selected from the idle time-domain range. 1 to 9 in the figure represent nine time-frequency resources included in the first time-domain range. Priorities of the time-frequency resource 1 to the time-frequency resource 9 are in the following order: the time-frequency resource 6=the time-frequency resource 7<the time-frequency resource 8<the time-frequency resource 5<the time-frequency resource 1<the time-frequency resource 2=the time-frequency resource 3=the time-frequency resource 4=the time-frequency resource 9. For example, the selected first time-frequency resource is the time-frequency resource 9.

In addition, the communications apparatus may further broadcast the information about the first time-frequency resource. For example, if the first time-frequency resource is determined by the processing apparatus, in addition to sending the information about the first time-frequency resource to the radar detection apparatus, the processing apparatus may further send the information about the first time-frequency resource to the communications apparatus, so that the communications apparatus may broadcast the information about the first time-frequency resource.

Alternatively, if the first time-frequency resource is determined by the processing apparatus, the processing apparatus may send the information about the first time-frequency resource to the radar detection apparatus, and the radar detection apparatus may send the first radar signal on the first time-frequency resource indicated by the information about the first time-frequency resource. In addition, the radar detection apparatus may further send the information about the first time-frequency resource to the processing apparatus, and the processing apparatus sends the information about the first time-frequency resource to the communications apparatus; or the radar detection apparatus may directly send the information about the first time-frequency resource to the communications apparatus, so that the communications apparatus may broadcast the information about the first time-frequency resource.

Alternatively, if the first time-frequency resource is determined by the radar detection apparatus, the radar detection apparatus may send the information about the first time-frequency resource to the processing apparatus, and the processing apparatus sends the information about the first time-frequency resource to the communications apparatus; or the radar detection apparatus may directly send the information about the first time-frequency resource to the communications apparatus, so that the communications apparatus may broadcast the information about the first time-frequency resource.

Certainly, in addition to the information about the first time-frequency resource, the communications apparatus may further broadcast other information. For example, the communications apparatus may broadcast information about an object carrying the communications apparatus and/or information about a radar detection apparatus carried on the object carrying the communications apparatus. The communications apparatus may broadcast the information about the object carrying the communications apparatus or the information about the radar detecting apparatus carried on the object carrying the communications apparatus, or broadcast the information about the object carrying the communications apparatus and the information about the radar detection apparatus carried on the object carrying the communications apparatus.

The information about the object carrying the communications apparatus may include location information of the object or a driving direction of the object, or include location information of the object and a driving direction of the object, and certainly, may further include other information of the object. The information about the radar detection apparatus carried on the object carrying the communications apparatus includes at least one of a location of the radar detection apparatus in the object or information about a time-frequency resource occupied by the radar detection apparatus, for example, includes the location of the radar detection apparatus in the object or the information about the time-frequency resource occupied by the radar detection apparatus, or includes the location of the radar detection apparatus in the object and the information about the time-frequency resource occupied by the radar detection apparatus. Certainly, the object may carry one or more radar detection apparatuses. If the object carries a plurality of radar detection apparatuses, the information, broadcast by the communications apparatus, about the radar detection apparatus carried on the object may include information about all or some of the radar detection apparatuses carried on the object. If the object carries a plurality of radar detection apparatuses, for a communications apparatus carried on the object, broadcast information about a radar detection apparatus carried on the object may be information about a radar detection apparatus that is carried on the object and that corresponds to the communications apparatus.

The radar detection apparatus may still be subject to interference after sending the first radar signal on the first time-frequency resource. In this case, to further reduce interference, in some embodiments of this application, if the radar detection apparatus determines that the radar detection apparatus is subject to interference, the first apparatus may further adjust the priorities of the plurality of time-frequency resources, to reselect a time-frequency resource to send a radar signal. In the embodiments of this application, the "adjusting" a priority may be understood as "redetermining" a priority, or may be understood as "determining" a priority.

For example, if the first apparatus is a radar detection apparatus, the radar detection apparatus may determine that the radar detection apparatus is subject to interference. Alternatively, the first apparatus is a processing apparatus. In this case, a radar detection apparatus may determine that the radar detection apparatus is subject to interference, and after determining that the radar detection apparatus is subject to interference, the radar detection apparatus may send interference indication information to the processing apparatus. The interference indication information is used to indicate that the radar detection apparatus is subject to interference. After receiving the interference indication information from the radar detection apparatus, the processing apparatus may determine that the radar detection apparatus is subject to interference.

If it is determined that the radar detection apparatus is subject to interference, the first apparatus may adjust the priorities of the plurality of time-frequency resources included in the first time-domain range. For example, the first apparatus may adjust, according to the first rule and based on the first information, the priorities of the plurality of time-frequency resources included in the first time-domain range. In addition, in this case, in addition to the foregoing first sub-rule and/or second sub-rule, the first rule may further include a third sub-rule. The third sub-rule is to lower a priority of a time-frequency resource currently used by the first apparatus. The time-frequency resource currently used by the first apparatus is a time-frequency resource causing interference, or more accurately, is a time-frequency resource subject to comparatively strong interference. If the first apparatus is a radar detection apparatus, the time-frequency resource currently used by the first apparatus is a time-frequency resource currently used by the radar detection apparatus. Alternatively, if the first apparatus is a processing apparatus, the time-frequency resource currently used by the first apparatus may be a time-frequency resource currently used by a radar detection apparatus corresponding to the processing apparatus. For example, if the radar detection apparatus determines, after sending the first radar signal on the first time-frequency resource, that the radar detection apparatus is subject to interference, the time-frequency resource currently used by the first apparatus is the first time-frequency resource.

After adjusting the priorities of the plurality of time-frequency resources, the first apparatus may select a time-frequency resource from the plurality of time-frequency resources based on adjusted priorities. For example, the first apparatus selects a fifth time-frequency resource to send a radar signal. For a manner of selecting the fifth time-frequency resource by the first apparatus, refer to the foregoing descriptions of the manner of selecting the first time-frequency resource by the first apparatus. After the fifth time-frequency resource is selected, the radar detection apparatus may send a radar signal on the fifth time-frequency resource. In addition, the communications apparatus may broadcast information about the fifth time-frequency resource. For a manner of obtaining the fifth time-frequency resource by the communications apparatus and the like, refer to the foregoing descriptions of the manner of obtaining the first time-frequency resource by the communications apparatus.

The first apparatus may directly adjust, according to the first rule and based on the first information, the priorities of the plurality of time-domain ranges included in the first time-domain range, without reselecting a time-domain range. Because the first rule further includes the third sub-rule of lowering the priority of the time-frequency resource currently used by the first apparatus, when the first apparatus reselects a time-frequency resource based on the adjusted priorities, a probability of selecting a previously used time-frequency resource again is comparatively low. Therefore, interference can be reduced to some extent.

Alternatively, the first apparatus may first redetermine a time-domain range. For a manner of determining the time-domain range, refer to the foregoing descriptions. After the time-domain range is redetermined, priorities of time-frequency resources included in the time-domain range are determined according to the first rule and based on the first information. The redetermined time-domain range may be still the first time-domain range, or may be another time-domain range. If the redetermined time-domain range is not the first time-domain range, the third sub-rule included in the first rule may not need to be used, because the redetermined time-domain range does not include the time-frequency resource currently used by the first apparatus. In this case, the first apparatus may determine, according to another sub-rule included in the first rule, the priorities of the time-frequency resources included in the time-domain range.

After determining the priorities of the time-frequency resources included in the reselected time-domain range, the first apparatus may select, based on the determined priorities, a time-frequency resource from the time-frequency resources included in the time-domain range. For example, the first apparatus selects a fifth time-frequency resource to send a radar signal. For a manner of selecting the fifth time-frequency resource by the first apparatus, refer to the foregoing descriptions of the manner of selecting the first time-frequency resource by the first apparatus. After the fifth time-frequency resource is selected, the radar detection apparatus may send a radar signal on the fifth time-frequency resource. In addition, the communications apparatus may broadcast information about the fifth time-frequency resource. For a manner of obtaining the fifth time-frequency resource by the communications apparatus and the like, refer to the foregoing descriptions of the manner of obtaining the first time-frequency resource by the communications apparatus.

In addition, after the radar detection apparatus sends the first radar signal on the first time-frequency resource, the first apparatus may obtain a detection result for at least one object. A detection result for an object may include information about the object. Therefore, the detection result for the at least one object may include information about the at least one object. As described above, information about one of the at least one object may include at least one of location information or a driving direction of the object. After obtaining the detection result for the at least one object, the first apparatus may obtain a matching degree between the detection result and second information. If the first information includes the information about the at least one object and/or information about a radar detection apparatus carried on the at least one object, the second information may be a part of the first information. For example, the second information includes the information about the at least one object. The first apparatus may adjust, based on the obtained matching degree and/or first information, the priorities of the plurality of time-frequency resources included in the first time-domain range. The first apparatus may adjust, based on the matching degree or the first information, the priorities of the plurality of time-frequency resources included in the first time-domain range, or may adjust, based on the matching degree and the first information, the priorities of the plurality of time-frequency resources included in the first time-domain range. Therefore, the priorities of the plurality of time-frequency resources may be updated in a comparatively timely manner, to reduce interference.

If the first apparatus is a radar detection apparatus, the radar detection apparatus may perform detection on the at least one object to obtain the detection result for the at least one object. After obtaining the detection result for the at least one object through detection, the radar detection apparatus may directly perform matching between the detection result and the second information, to obtain the matching degree between the detection result and the second information. Then the radar detection apparatus may adjust the priorities of the plurality of time-frequency resources based on the matching degree and/or the first information. This manner is more suitable for a radar detection apparatus with a comparatively strong capability, for example, is more suitable for the radar detection apparatus shown in FIG. 17B.

Alternatively, if the first apparatus is a radar detection apparatus, the radar detection apparatus may perform detection on the at least one object to obtain the detection result for the at least one object. After obtaining the detection result for the at least one object, the radar detection apparatus may send the detection result to a processing apparatus, so that the processing apparatus obtains the detection result for the at least one object. After obtaining the detection result for the at least one object, the processing apparatus performs matching between the detection result and the second information, to obtain the matching degree between the detection result and the second information. The processing apparatus may send the matching degree to the radar detection apparatus. For example, the processing apparatus sends third information to the radar detection apparatus, and the third information is used to indicate the matching degree. In this case, after receiving the third information, the radar detection apparatus obtains the matching degree between the detection result and the second information. Then the radar detection apparatus may adjust the priorities of the plurality of time-frequency resources based on the matching degree and/or the first information. This manner is applicable to the radar detection apparatus shown in FIG. 17A or the radar detection apparatus shown in FIG. 17B. Alternatively, because the radar detection apparatus needs to adjust the priorities of the plurality of time-frequency resources based on the matching degree and/or the first information, this manner is more suitable for a radar detection apparatus with a comparatively strong capability, for example, is more suitable for the radar detection apparatus shown in FIG. 17B.

Alternatively, if the first apparatus is a processing apparatus, after obtaining the detection result for the at least one object, a radar detection apparatus may send the detection result to the processing apparatus, so that the processing apparatus obtains the detection result for the at least one object. After obtaining the detection result for the at least one object, the processing apparatus performs matching between the detection result and the second information, to obtain the matching degree between the detection result and the second information. Then the processing apparatus may adjust the priorities of the plurality of time-frequency resources based on the matching degree and/or the first information. This manner is applicable to the radar detection apparatus shown in FIG. 17A or the radar detection apparatus shown in FIG. 17B.

Regardless of whether the processing apparatus performs matching between the detection result and the second information, or the radar detection apparatus performs matching between the detection result and the second information, matching manners may be similar. For example, the processing apparatus performs matching between the detection result and the second information. Because the detection result is specific to the at least one object and the second information is also specific to the at least one object, the processing apparatus may separately perform matching on each object during matching. For example, if an object has a corresponding detection result and also has corresponding second information, the processing apparatus performs matching between the detection result corresponding to the object and the second information corresponding to the object, to obtain a matching degree. The processing apparatus may obtain a final matching degree by combining at least one matching degree of the at least one object. For example, the final matching degree may be an average value of the at least one matching degree of the at least one object, or may be an arithmetic average value or a geometric average value, or the final matching degree may be a result obtained by performing another operation on the at least one matching degree.

A manner of adjusting, by the first apparatus based on the matching degree and/or the first information, the priorities of the plurality of time-frequency resources included in the first time-domain range may be as follows: The first apparatus determines, according to a second rule and based on the matching degree and/or the first information, the priorities of the plurality of time-frequency resources included in the first time-domain range. The second rule may include one or any combination of the following: a first sub-rule or a second sub-rule. For example, the second rule includes only the first sub-rule, or the second rule includes only the second sub-rule, or the second rule includes the first sub-rule and the second sub-rule.

The first sub-rule is as follows: when the matching degree between the detection result and the second information is less than a first threshold, and/or when the first apparatus determines that the first apparatus is subject to interference, lowering a priority of a time-frequency resource currently used by the first apparatus. The time-frequency resource currently used by the first apparatus is a time-domain resource subject to comparatively strong interference. The first sub-rule may include: when the matching degree between the detection result and the second information is less than the first threshold, lowering the priority of the time-frequency resource currently used by the first apparatus; or the first sub-rule may include: when the first apparatus determines that the first apparatus is subject to interference, lowering the priority of the time-frequency resource currently used by the first apparatus; or the first sub-rule may include: when the matching degree between the detection result and the second information is less than the first threshold, and when the first apparatus determines that the first apparatus is subject to interference, lowering the priority of the time-frequency resource currently used by the first apparatus.

For example, the first sub-rule includes: when the matching degree between the detection result and the second information is less than the first threshold, lowering the priority of the time-frequency resource currently used by the first apparatus. If the matching degree between the detection result and the second information is less than the first threshold, it indicates that the matching degree between the detection result and the second information is comparatively low, and may also indirectly indicate that a radar detection apparatus corresponding to the first apparatus is subject to interference on the currently used time-frequency resource. Therefore, the detection result is not sufficiently accurate, and it is best that the time-frequency resource currently used by the first apparatus is no longer to be used. Therefore, in this case, the priority of the time-frequency resource currently used by the first apparatus may be lowered, to reduce a possibility of selecting the time-frequency resource again, thereby reducing interference. The first threshold may be specified by a protocol, or may be set by the processing apparatus, or may be set in another manner. For example, the first threshold may be set based on a matching degree between the second information and a detection result obtained when the first apparatus is subject to interference.

If the matching degree between the detection result and the second information is greater than or equal to the first threshold, it indicates that the matching degree between the detection result and the second information is comparatively high, and may also indirectly indicate that a radar detection apparatus corresponding to the first apparatus may not be subject to interference or may be subject to slight interference on the currently used time-frequency resource. Therefore, the time-frequency resource currently used by the first apparatus can still be used. Therefore, the priority of the time-frequency resource currently used by the first apparatus may be increased, or the priority of the time-frequency resource currently used by the first apparatus may be kept unchanged.

For example, referring to FIG. 19C, 1 to 9 indicate nine time-frequency resources included in the first time-domain range, and the time-frequency resource 9 is the time-frequency resource currently used by the first apparatus, for example, the first time-frequency resource. If a fourth sub-rule is met, a priority of the time-frequency resource 9 needs to be lowered.

Alternatively, the first sub-rule includes: when the first apparatus determines that the first apparatus is subject to interference, lowering the priority of the time-frequency resource currently used by the first apparatus. The time-frequency resource currently used by the first apparatus is a time-domain resource causing interference.

If the first apparatus is a radar detection apparatus, the radar detection apparatus may directly determine whether the radar detection apparatus is subject to interference. Alternatively, if the first apparatus is a processing apparatus, after a radar detection apparatus determines that the radar detection apparatus is subject to interference, the radar detection apparatus may send interference indication information to the processing apparatus, so that the processing apparatus may determine, based on the interference indication information, that the radar detection apparatus is subject to interference.

If the first apparatus determines that the first apparatus is subject to interference, it is best that the time-frequency resource currently used by the first apparatus is no longer to be used. Therefore, in this case, the priority of the time-frequency resource currently used by the first apparatus may be lowered, to reduce a possibility of selecting the time-frequency resource again, thereby reducing interference.

Alternatively, the first sub-rule includes: when the matching degree between the detection result and the second information is less than the first threshold, and when the first apparatus determines that the first apparatus is subject to interference, lowering the priority of the time-frequency resource currently used by the first apparatus.

That the radar detection apparatus is subject to interference and that the matching degree between the detection result and the second information is less than the first threshold may indicate a same problem, and both indicate that the radar detection apparatus is subject to interference. In this case, if the radar detection apparatus determines that the radar detection apparatus is subject to interference but has not obtained a detection result, the first apparatus may adjust the priorities of the plurality of time-frequency resources in the aforementioned processing manner used after the radar detection apparatus is subject to interference. In this case, the first sub-rule may include: when the matching degree between the detection result and the second information is less than the first threshold, and when the first apparatus determines that the first apparatus is subject to interference, lowering the priority of the time-frequency resource currently used by the first apparatus. Alternatively, if the radar detection apparatus has obtained the detection result, the first apparatus may adjust the priorities of the plurality of time-frequency resources based on the matching degree and/or the first information. If the radar detection apparatus has obtained the detection result, and the matching degree between the detection result and the second information is less than the first threshold, it can be considered that the first sub-rule includes: when the matching degree between the detection result and the second information is less than the first threshold, lowering the priority of the time-frequency resource currently used by the first apparatus. Alternatively, if the matching degree between the detection result and the second information is less than the first threshold, the first apparatus may also basically determine that the first apparatus is subject to interference. Therefore, it can also be considered that the first sub-rule includes: when the matching degree between the detection result and the second information is less than the first threshold, and when the first apparatus determines that the first apparatus is subject to interference, lowering the priority of the time-frequency resource currently used by the first apparatus.

Certainly, after the radar detection apparatus obtains the detection result, the first apparatus may also adjust the priorities of the plurality of time-frequency resources even if the matching degree between the detection result and the second information is greater than or equal to the first threshold (because the priorities may be alternatively adjusted according to another sub-rule included in the second rule). In other words, a priority of a time-frequency resource may be adjusted in real time, regardless of whether the radar detection apparatus is subject to interference, and even if the radar detection apparatus is not subject to interference, the priority of the time-frequency resource may also be adjusted. Therefore, the priority can be updated in a more timely manner.

The second sub-rule is as follows: when a distance between a first object and the first apparatus is greater than a distance between a second object and the first apparatus, and/or when a detection range of a first radar detection apparatus carried on the first object and a detection range of a second radar detection apparatus corresponding to the first apparatus have no intersection in space, and a detection range of a third radar detection apparatus carried on the second object and the detection range of the second radar detection apparatus corresponding to the first apparatus have an intersection in space, a priority of a second time-frequency resource is higher than a priority of a third time-frequency resource.

The second sub-rule and the first rule may be a same rule. Therefore, for content related to the second sub-rule, refer to the foregoing descriptions of the first rule.

Certainly, in addition to at least one of the first sub-rule or the second sub-rule, the second rule may further include another rule; or the second rule may not include the first sub-rule or the second sub-rule, but include only another rule. This is not specifically limited.

If the first apparatus is a radar detection apparatus, after adjusting the priorities of the plurality of time-frequency resources, the radar detection apparatus may select a time-frequency resource with a highest priority from the plurality of time-frequency resources in descending order of adjusted priorities. For example, the selected time-frequency resource is referred to as a fourth time-frequency resource. In this case, a priority of the fourth time-frequency resource is not lower than a priority of a time-frequency resource other than the fourth time-frequency resource in the plurality of time-frequency resources. If priorities of at least two of the plurality of time-frequency resources are the same and are the highest, the radar detection apparatus may select one of the at least two time-frequency resources as the fourth time-frequency resource. For example, the radar detection apparatus may randomly select a time-frequency resource. After selecting the fourth time-frequency resource, the radar detection apparatus may send a radar signal on the fourth time-frequency resource. For example, the radar signal sent by the radar detection apparatus on the fourth time-frequency resource is referred to as a second radar signal. This manner is applicable to the radar detection apparatus shown in FIG. 17A or the radar detection apparatus shown in FIG. 17B. Alternatively, because the radar detection apparatus needs to select the fourth time-frequency resource, this manner is more suitable for a radar detection apparatus with a comparatively strong capability, for example, is more suitable for the radar detection apparatus shown in FIG. 17B.

In addition, the radar detection apparatus may further send information about the fourth time-frequency resource to a processing apparatus, and the processing apparatus sends the information about the fourth resource to a communications apparatus; or the radar detection apparatus may directly send the information about the fourth time-frequency resource to the communications apparatus. The communications apparatus may broadcast the information about the fourth time-frequency resource, so that another object may determine that the fourth time-frequency resource is occupied by the radar detection apparatus.

Alternatively, if the first apparatus is a processing apparatus, after adjusting the priorities of the plurality of time-frequency resources, the processing apparatus may select a time-frequency resource with a highest priority from the plurality of time-frequency resources in descending order of adjusted priorities. For example, the selected time-frequency resource is referred to as a fourth time-frequency resource. In this case, a priority of the fourth time-frequency resource is not lower than a priority of a time-frequency resource other than the fourth time-frequency resource in the plurality of time-frequency resources. If priorities of at least two of the plurality of time-frequency resources are the same and are the highest, the processing apparatus may select one of the at least two time-frequency resources as the fourth time-frequency resource. For example, the processing apparatus may randomly select a time-frequency resource. After selecting the fourth time-frequency resource, the processing apparatus sends information about the fourth time-frequency resource to a radar detection apparatus, and the radar detection apparatus may send a radar signal on the fourth time-frequency resource indicated by the information about the fourth time-frequency resource. For example, the radar signal sent by the radar detection apparatus on the fourth time-frequency resource is referred to as a second radar signal. This manner is applicable to the radar detection apparatus shown in FIG. 17A or the radar detection apparatus shown in FIG. 17B.

In addition, the processing apparatus may further send the information about the fourth time-frequency resource to a communications apparatus. Alternatively, the processing apparatus may send the information about the fourth time-frequency resource to the radar detection apparatus, the radar detection apparatus sends the second radar signal by using the fourth time-frequency resource, the radar detection apparatus sends the information about the fourth time-frequency resource to the processing apparatus, and then the processing apparatus sends the information about the fourth time-frequency resource to the communications apparatus. The communications apparatus may broadcast the information about the fourth time-frequency resource, so that another object may determine that the fourth time-frequency resource is occupied by the radar detection apparatus.

Figure 19D:
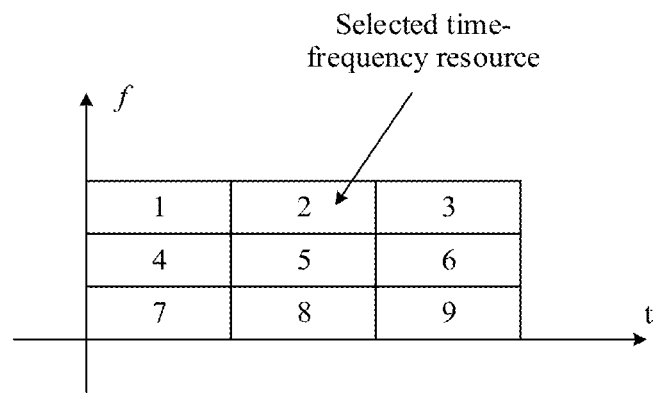
FIG. 19D is a schematic diagram of reselecting a time-frequency resource based on adjusted priorities according to an embodiment of this application.

For example, FIG. 19D is a schematic diagram of reselecting a time-frequency resource based on adjusted priorities according to an embodiment of this application. In FIG. 19D, 1 to 9 indicate nine time-frequency resources included in the first time-domain range. The time-frequency resource 9 is a time-frequency resource previously used by the first apparatus. According to the fourth sub-rule or a fifth sub-rule, a priority of the time-frequency resource 9 has been lowered. For example, the adjusted priorities are in the following order: a priority of the time-frequency resource 3=a priority of the time-frequency resource 6=a priority of the time-frequency resource 7=a priority of the time-frequency resource 9<a priority of the time-frequency resource 8<a priority of the time-frequency resource 5<a priority of the time-frequency resource 1<a priority of the time-frequency resource 2=a priority of the time-frequency resource 4. For example, the first apparatus selects the time-frequency resource 2 based on the adjusted priorities, and the time-frequency resource 2 is the fourth time-frequency resource.

Certainly, after the radar detection apparatus sends the second radar signal by using the fourth time-frequency resource, if the radar detection apparatus determines that the radar detection apparatus is subject to interference, the radar detection apparatus has obtained a detection result, or the like, the priorities of the plurality of time-frequency resources may be further adjusted. For an adjustment manner, refer to the foregoing descriptions.

In some embodiments of this application, a priority of a time-frequency resource may be set initially. For example, when the radar detection apparatus is initially put into use, or when the radar detection apparatus is powered on to work, a priority of a time-frequency resource may be set. During detection, the priority of the time-frequency resource may be further adjusted. For example, after the radar detection apparatus obtains a detection result, or after the radar detection apparatus is subject to interference, the priority of the time-frequency resource may be adjusted, to avoid, as much as possible, selecting a time-frequency resource subject to interference to send a radar signal, so as to reduce interference between radar detection apparatuses.

There may be a case in which a priority of a time-frequency resource may not be set when the radar detection apparatus is initially put into use (or when the radar detection apparatus is powered on to work), but the priority of the time-frequency resource may be determined during detection by the radar detection apparatus. Therefore, an embodiment of this application further provides a second communication method. The method may be used to determine a priority of a time-frequency resource during detection by a radar detection apparatus.

Figure 20:
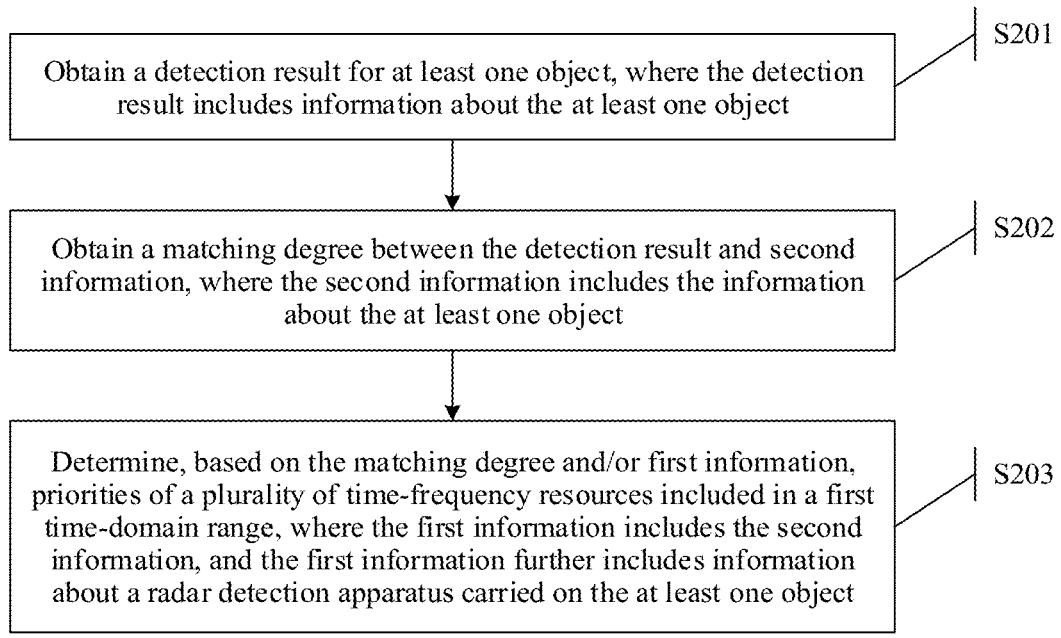
FIG. 20 is a flowchart of a second communication method according to an embodiment of this application.

FIG. 20 is a flowchart of the method. In the following description process, an example in which the method is applied to the network architecture shown in FIG. 16 is used, and an example in which the method is applied to the system architecture shown in FIG. 17A or FIG. 17B is also used. The method provided in the embodiment shown in FIG. 20 may be performed by a first apparatus. The first apparatus may be the radar detection apparatus or the processing apparatus shown in FIG. 17A or FIG. 17B. In addition, the first apparatus may be installed on a vehicle in the network architecture shown in FIG. 16.

S201. The first apparatus obtains a detection result for at least one object. The detection result includes information about the at least one object.

As described above, an "object" may be a carrier that carries a radar detection apparatus, for example, a vehicle or an RSU.

After sending a radar signal, a radar detection apparatus corresponding to the first apparatus may obtain the detection result for the at least one object. If the first apparatus is a radar detection apparatus, the radar detection apparatus corresponding to the first apparatus is the first apparatus itself. Alternatively, if the first apparatus is a processing apparatus, the radar detection apparatus corresponding to the first apparatus is a radar detection apparatus that can communicate with the processing apparatus.

Information about one of the at least one object includes at least one of location information or a driving direction of the object, for example, includes the location information of the object, or includes the driving direction of the object, or includes the location information and the driving direction of the object.

S202. The first apparatus obtains a matching degree between the detection result and second information. The second information includes the information about the at least one object.

After obtaining the detection result for the at least one object, the first apparatus may obtain the matching degree between the detection result and the second information. For example, a communications apparatus corresponding to the first apparatus receives first information from another communications apparatus, and the first information includes the information about the at least one object and/or information about a radar detection apparatus carried on the at least one object. The first information includes the information about the at least one object or the information about the radar detection apparatus carried on the at least one object, or the first information includes the information about the at least one object and the information about the radar detection apparatus carried on the at least one object. For descriptions of the first information, refer to related descriptions in the embodiment shown in FIG. 18. The second information may be a part of the first information. For example, the second information includes the information about the at least one object.

Because the detection result is specific to the at least one object and the second information is also specific to the at least one object, when matching is performed between the detection result and the second information, matching may be separately performed on each object. For example, if an object has a corresponding detection result and also has corresponding second information, matching may be performed between the detection result corresponding to the object and the second information corresponding to the object, to obtain a matching degree. A final matching degree may be obtained by combining at least one matching degree of the at least one object. For example, the final matching degree may be an average value of the at least one matching degree of the at least one object, or may be an arithmetic average value or a geometric average value, or the final matching degree may be a result obtained by performing another operation on the at least one matching degree. The operation of performing matching between the detection result and the second information may be performed by a radar detection apparatus, or may be performed by a processing apparatus.

S203. The first apparatus determines, based on the matching degree and/or the first information, priorities of a plurality of time-frequency resources included in the first time-domain range. The first information includes the second information, and the first information further includes the information about the radar detection apparatus carried on the at least one object. The first apparatus may determine, based on the matching degree or the first information, the priorities of the plurality of time-frequency resources included in the first time-domain range; or the first apparatus may determine, based on the matching degree and the first information, the priorities of the plurality of time-frequency resources included in the first time-domain range.

For example, the first time-domain range may include the plurality of time-frequency resources. How to determine specific time-frequency resources in the first time-domain range is not limited to these embodiments of this application. If the technical solution in embodiments of this application are applied to a collaborative radar detection apparatus, at least two of the plurality of time-frequency resources may overlap in the time domain, and at least two of the plurality of time-frequency resources may overlap in the frequency domain, or may be identical in the frequency domain. The "overlapping" described herein may be understood as having an intersection but not being identical. Alternatively, if the technical solution in embodiments of this application are applied to a non-collaborative radar detection apparatus, the plurality of time-frequency resources may be time-divided, and may also be frequency-divided. This is equivalent to that the plurality of time-frequency resources are time-divided and frequency-divided.

If the first apparatus is a radar detection apparatus, the radar detection apparatus may perform detection on the at least one object to obtain the detection result for the at least one object. After obtaining the detection result for the at least one object through detection, the radar detection apparatus may directly perform matching between the detection result and the second information, to obtain the matching degree between the detection result and the second information. Then the radar detection apparatus may determine the priorities of the plurality of time-frequency resources based on the matching degree and/or the first information. This manner is more suitable for a radar detection apparatus with a comparatively strong capability, for example, is more suitable for the radar detection apparatus shown in FIG. 17B.

Alternatively, if the first apparatus is a radar detection apparatus, the radar detection apparatus may perform detection on the at least one object to obtain the detection result for the at least one object. After obtaining the detection result for the at least one object, the radar detection apparatus may send the detection result to a processing apparatus, so that the processing apparatus obtains the detection result for the at least one object. After obtaining the detection result for the at least one object, the processing apparatus performs matching between the detection result and the second information, to obtain the matching degree between the detection result and the second information. The processing apparatus may send the matching degree to the radar detection apparatus. For example, the processing apparatus sends third information to the radar detection apparatus, and the third information is used to indicate the matching degree. In this case, after receiving the third information, the radar detection apparatus obtains the matching degree between the detection result and the second information. Then the radar detection apparatus may adjust the priorities of the plurality of time-frequency resources based on the matching degree and/or the first information. This manner is applicable to the radar detection apparatus shown in FIG. 17A or the radar detection apparatus shown in FIG. 17B. Alternatively, because the radar detection apparatus needs to adjust the priorities of the plurality of time-frequency resources based on the matching degree and/or the first information, this manner is more suitable for a radar detection apparatus with a comparatively strong capability, for example, is more suitable for the radar detection apparatus shown in FIG. 17B.

Alternatively, if the first apparatus is a processing apparatus, after obtaining the detection result for the at least one object, a radar detection apparatus may send the detection result to the processing apparatus, so that the processing apparatus obtains the detection result for the at least one object. After obtaining the detection result for the at least one object, the processing apparatus performs matching between the detection result and the second information, to obtain the matching degree between the detection result and the second information. Then the processing apparatus may adjust the priorities of the plurality of time-frequency resources based on the matching degree and/or the first information. This manner is applicable to the radar detection apparatus shown in FIG. 17A or the radar detection apparatus shown in FIG. 17B.

A manner of determining, by the first apparatus based on the matching degree and/or the first information, the priorities of the plurality of time-frequency resources included in the first time-domain range may be as follows: The first apparatus determines, according to a second rule and based on the matching degree and/or the first information, the priorities of the plurality of time-frequency resources included in the first time-domain range. The second rule may include one or any combination of the following: a first sub-rule or a second sub-rule. For example, the second rule includes only the first sub-rule, or the second rule includes only the second sub-rule, or the second rule includes the first sub-rule and the second sub-rule. For descriptions of these sub-rules, refer to related descriptions in the embodiment shown in FIG. 18.

If the first apparatus is a radar detection apparatus, after adjusting the priorities of the plurality of time-frequency resources, the radar detection apparatus may select a time-frequency resource with a highest priority from the plurality of time-frequency resources in descending order of adjusted priorities. For example, the selected time-frequency resource is referred to as a fourth time-frequency resource. In this case, a priority of the fourth time-frequency resource is not lower than a priority of a time-frequency resource other than the fourth time-frequency resource in the plurality of time-frequency resources. If priorities of at least two of the plurality of time-frequency resources are the same and are the highest, the radar detection apparatus may select one of the at least two time-frequency resources as the fourth time-frequency resource. For example, the radar detection apparatus may randomly select a time-frequency resource. After selecting the fourth time-frequency resource, the radar detection apparatus may send a radar signal on the fourth time-frequency resource. For example, the radar signal sent by the radar detection apparatus on the fourth time-frequency resource is referred to as a second radar signal. Because the radar detection apparatus needs to select the fourth time-frequency resource, this manner is more suitable for a radar detection apparatus with a comparatively strong capability, for example, is more suitable for the radar detection apparatus shown in FIG. 17B.

In addition, the radar detection apparatus may further send information about the fourth time-frequency resource to a processing apparatus, and the processing apparatus sends the information about the fourth resource to a communications apparatus; or the radar detection apparatus may directly send the information about the fourth time-frequency resource to the communications apparatus. The communications apparatus may broadcast the information about the fourth time-frequency resource, so that another object may determine that the fourth time-frequency resource is occupied by the radar detection apparatus.

Alternatively, if the first apparatus is a processing apparatus, after adjusting the priorities of the plurality of time-frequency resources, the processing apparatus may select a time-frequency resource with a highest priority from the plurality of time-frequency resources in descending order of adjusted priorities. For example, the selected time-frequency resource is referred to as a fourth time-frequency resource. In this case, a priority of the fourth time-frequency resource is not lower than a priority of a time-frequency resource other than the fourth time-frequency resource in the plurality of time-frequency resources. If priorities of at least two of the plurality of time-frequency resources are the same and are the highest, the processing apparatus may select one of the at least two time-frequency resources as the fourth time-frequency resource. For example, the processing apparatus may randomly select a time-frequency resource. After selecting the fourth time-frequency resource, the processing apparatus sends information about the fourth time-frequency resource to a radar detection apparatus, and the radar detection apparatus may send a radar signal on the fourth time-frequency resource indicated by the information about the fourth time-frequency resource. For example, the radar signal sent by the radar detection apparatus on the fourth time-frequency resource is referred to as a second radar signal. This manner is applicable to the radar detection apparatus shown in FIG. 17A or the radar detection apparatus shown in FIG. 17B.

In addition, the processing apparatus may further send the information about the fourth time-frequency resource to a communications apparatus. Alternatively, the processing apparatus may send the information about the fourth time-frequency resource to the radar detection apparatus, the radar detection apparatus sends the second radar signal by using the fourth time-frequency resource, the radar detection apparatus sends the information about the fourth time-frequency resource to the processing apparatus, and then the processing apparatus sends the information about the fourth time-frequency resource to the communications apparatus. The communications apparatus may broadcast the information about the fourth time-frequency resource, so that another object may determine that the fourth time-frequency resource is occupied by the radar detection apparatus.

Certainly, in addition to the information about the fourth time-frequency resource, the communications apparatus may further broadcast other information. For example, the communications apparatus may broadcast information about an object carrying the communications apparatus and/or information about a radar detection apparatus carried on the object carrying the communications apparatus. The communications apparatus may broadcast the information about the object carrying the communications apparatus or the information about the radar detecting apparatus carried on the object carrying the communications apparatus, or broadcast the information about the object carrying the communications apparatus and the information about the radar detection apparatus carried on the object carrying the communications apparatus. For descriptions of this part of content, refer to related descriptions in the embodiment shown in FIG. 18.

Certainly, after the radar detection apparatus sends the second radar signal by using the fourth time-frequency resource, if the radar detection apparatus has obtained a detection result or the like, the priorities of the plurality of time-frequency resources may be further adjusted. An adjustment manner may be similar to the manner of determining a priority in these embodiments.

In some embodiments of this application, during detection by the radar detection apparatus, the first apparatus may determine the priorities of the plurality of time-frequency resources included in the first time-domain range, so that a time-frequency resource with a comparatively high priority may be selected to send a radar signal. The time-frequency resource with the comparatively high priority is, for example, a time-frequency resource with a comparatively low possibility of a resource collision. Therefore, in this manner, a probability of a resource collision can be reduced, so as to reduce or avoid interference between radars.

It can be understood that, to implement the foregoing functions, each apparatus, for example, the first apparatus or the communications apparatus, includes a corresponding hardware structure and/or software module for performing each function. A person of ordinary skill in the art should easily be aware that, with reference to the units and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, functional modules of the first apparatus may be divided. For example, the functional modules may be divided based on the functions, or two or more functional modules may be integrated into one functional module. The integrated module may be implemented in a form of hardware, or may be implemented in a form of a software functional module. It should be noted that, in embodiments of this application, module division is exemplary, and is merely a logical function division. In actual implementation, another division manner may be used.

Figure 21:
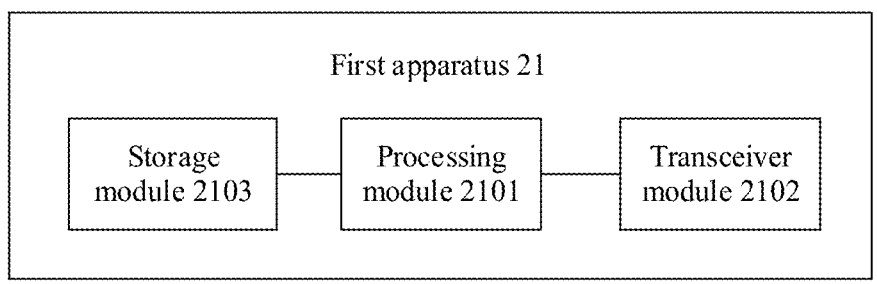
FIG. 21 is a first schematic structural diagram of a first apparatus according to an embodiment of this application.

For example, when the functional modules of the first apparatus are divided through integration, FIG. 21 is a possible schematic structural diagram of the first apparatus in the foregoing embodiments of this application. The first apparatus 21 may include a processing module 2101 and a transceiver module 2102. The processing module 2101 may be configured to perform all operations, except sending and receiving operations, performed by the first apparatus in the embodiment shown in FIG. 18, for example, S182 and S183, and/or configured to support another process of the technology described in this specification. The transceiver module 2102 may be configured to perform all sending and receiving operations performed by the first apparatus in the embodiment shown in FIG. 18, for example, S181, and/or configured to support another process of the technology described in this specification.

The transceiver module 2102 is configured to receive first information from a second apparatus.

The processing module 2101 is configured to determine, based on the first information, priorities of a plurality of time-frequency resources included in a first time-domain range.

The processing module 2101 is further configured to determine a first time-frequency resource in the plurality of time-frequency resources. A priority of the first time-frequency resource is not lower than a priority of a time-frequency resource other than the first time-frequency resource in the plurality of time-frequency resources. The first time-frequency resource is used to send a radar signal.

In an optional implementation, the first time-domain range is one of a plurality of time-domain ranges, and the plurality of time-domain ranges do not overlap in the time domain.

In an optional implementation, at least two of the plurality of time-frequency resources overlap in the time domain, or the plurality of time-frequency resources do not overlap in the frequency domain.

In an optional implementation, the first information includes information about at least one object and/or information about a radar detection apparatus carried on the at least one object, information about one of the at least one object includes at least one of location information or a driving direction of the object, and information about a radar detection apparatus carried on the one of the at least one object includes at least one of a location of the radar detection apparatus in the object or information about a time-frequency resource occupied by the radar detection apparatus. Alternatively, the first information includes the priorities of the plurality of time-frequency resources included in the first time-domain range.

In an optional implementation, the processing module 2101 is configured to determine, based on the first information in the following manner, the priorities of the plurality of time-frequency resources included in the first time-domain range:
  determining, according to a first rule and based on the first information, a priority of a time-frequency resource included in the first time-domain range, where the first rule includes:
  when a distance between a first object and the first apparatus 21 is greater than a distance between a second object and the first apparatus 21, and/or when a detection range of a first radar detection apparatus carried on the first object and a detection range of a second radar detection apparatus corresponding to the apparatus have no intersection in space, and a detection range of a third radar detection apparatus carried on the second object and the detection range of the second radar detection apparatus corresponding to the apparatus have an intersection in space, a priority of a second time-frequency resource is higher than a priority of a third time-frequency resource, where
  the second time-frequency resource is a time-frequency resource occupied by the first radar detection apparatus carried on the first object, and the third time-frequency resource is a time-frequency resource occupied by the second radar detection apparatus carried on the second object.

In an optional implementation, the first apparatus 21 is a radar detection apparatus, and the transceiver module 2102 is further configured to send a first radar signal on the first time-frequency resource.

In an optional implementation, the first apparatus 21 is a processing apparatus, and the transceiver module 2102 is further configured to send information about the first time-frequency resource to a radar detection apparatus. The information about the first time-frequency resource is to be used by the radar detection apparatus to send a radar signal.

In an optional implementation, the first apparatus 21 is a radar detection apparatus, and the transceiver module 2102 is further configured to send information about the first time-frequency resource to a processing apparatus or a communications apparatus. Alternatively, the first apparatus 21 is a processing apparatus, and the transceiver module 2102 is further configured to send information about the first time-frequency resource to a communications apparatus.

In an optional implementation, the first apparatus 21 is a radar detection apparatus, and the processing module 2101 is further configured to: after determining the first time-frequency resource in the plurality of time-frequency resources, determine that the radar detection apparatus is subject to interference. Alternatively, the first apparatus 21 is a processing apparatus, and the transceiver module 2102 is further configured to: after the processing module 2101 determines the first time-frequency resource in the plurality of time-frequency resources, receive interference indication information from a radar detection apparatus. The interference indication information is used to indicate that the radar detection apparatus is subject to interference.

In an optional implementation, the processing module 2101 is further configured to adjust, according to the first rule and based on the first information, the priorities of the plurality of time-frequency resources included in the first time-domain range. The first rule further includes lowering a priority of a time-frequency resource currently used by the first apparatus.

In an optional implementation, the processing module 2101 is further configured to:
  obtain a detection result for at least one object, where the detection result includes information about the at least one object;
  obtain a matching degree between the detection result and second information, where the second information is a part of the first information, and the second information includes the information about the at least one object; and
  adjust, based on the matching degree and/or the first information, the priorities of the plurality of time-frequency resources included in the first time-domain range.

In an optional implementation, the first apparatus 21 is a radar detection apparatus, and the processing module 2101 is configured to obtain the detection result for the at least one object in the following manner: performing detection on the at least one object, and obtaining the detection result. Alternatively, the first apparatus 21 is a processing apparatus, and the processing module 2101 is configured to obtain the detection result for the at least one object in the following manner: receiving, by using the transceiver module 2102, the detection result from a radar detection apparatus.

In an optional implementation, the first apparatus 21 is a radar detection apparatus, and the processing module 2101 is configured to obtain the matching degree between the detection result and the second information in the following manner: performing matching between the detection result and the obtained second information, to obtain the matching degree between the detection result and the second information; or sending, by using the transceiver module 2102, the detection result to the processing apparatus, and receiving, by using the transceiver module 2102, third information from the processing apparatus, where the third information is used to indicate the matching degree between the detection result and the second information.

In an optional implementation, the first apparatus 21 is a processing apparatus, and the processing module 2101 is configured to obtain the matching degree between the detection result and the second information in the following manner: performing matching between the detection result and the obtained second information, to obtain the matching degree between the detection result and the second information.

In an optional implementation, the processing module 2101 is further configured to adjust, based on the matching degree and/or the first information in the following manner, the priorities of the plurality of time-frequency resources included in the first time-domain range: determining, according to a second rule and based on the matching degree and/or the first information, the priorities of the plurality of time-frequency resources included in the first time-domain range. The second rule includes one or any combination of the following:
  when the matching degree between the detection result and the second information is less than a first threshold, and/or when the first apparatus 21 determines that the first apparatus 21 is subject to interference, lowering a priority of a time-frequency resource currently used by the first apparatus 21; or
  when a distance between a first object and the first apparatus 21 is greater than a distance between a second object and the first apparatus 21, and/or when a detection range of a first radar detection apparatus carried on the first object and a detection range of a second radar detection apparatus corresponding to the first apparatus 21 have no intersection in space, and a detection range of a third radar detection apparatus carried on the second object and the detection range of the second radar detection apparatus corresponding to the first apparatus 21 have an intersection in space, a priority of a second time-frequency resource is higher than a priority of a third time-frequency resource, where
  the second time-frequency resource is a time-frequency resource occupied by the first radar detection apparatus carried on the first object, and the third time-frequency resource is a time-frequency resource occupied by the second radar detection apparatus carried on the second object.

In an optional implementation, the first apparatus 21 is a radar detection apparatus.

The processing module 2101 is further configured to determine a fourth time-frequency resource based on adjusted priorities. According to the adjusted priorities, a priority of the fourth time-frequency resource is not lower than a priority of a time-frequency resource other than the fourth time-frequency resource in the plurality of time-frequency resources.

The transceiver module 2102 is further configured to send a radar signal on the fourth time-frequency resource.

In an optional implementation, the first apparatus 21 is a processing apparatus.

The processing module 2101 is further configured to determine a fourth time-frequency resource based on adjusted priorities. According to the adjusted priorities, a priority of the fourth time-frequency resource is not lower than a priority of a time-frequency resource other than the fourth time-frequency resource in the plurality of time-frequency resources.

The transceiver module 2102 is further configured to send information about the fourth time-frequency resource to a radar detection apparatus. The information about the fourth time-frequency resource is to be used by the radar detection apparatus to send a radar signal.

Optionally, the first apparatus 21 may further include a storage module 2103, configured to store a program instruction and/or data for the processing module 2101 to read.

The optional design may be implemented independently, or may be integrated with any one of the foregoing optional designs for implementation.

Figure 22:
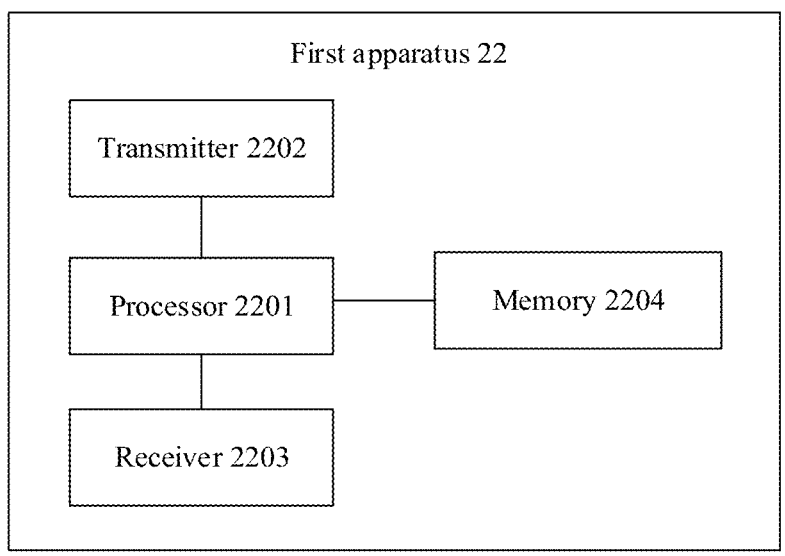
FIG. 22 is a second schematic structural diagram of a first apparatus according to an embodiment of this application.

FIG. 22 is another possible schematic structural diagram of a first apparatus according to an embodiment of this application. The first apparatus 22 may include a processor 2201, a transmitter 2202, and a receiver 2203. A function of the processor 2201 may correspond to a specific function of the processing module 2101 shown in FIG. 21, and functions of the transmitter 2202 and the receiver 2203 may correspond to specific functions of the transceiver module 2102 shown in FIG. 21. Details are not described herein again. Optionally, the first apparatus 22 may further include a memory 2204, configured to store a program instruction and/or data for the processor 2201 to read.

Figure 23:
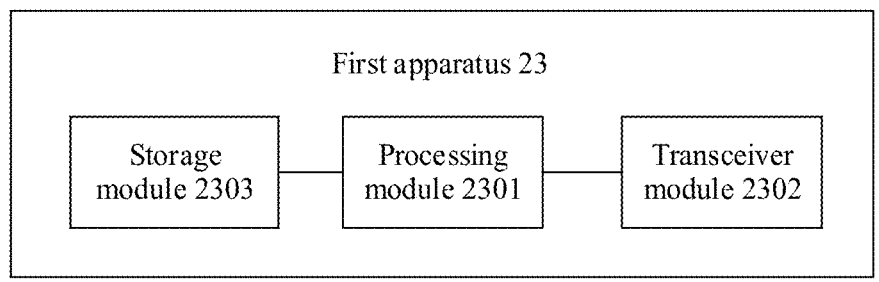
FIG. 23 is a third schematic structural diagram of a first apparatus according to an embodiment of this application.

For example, when the functional modules of the first apparatus are divided through integration, FIG. 23 is a possible schematic structural diagram of the first apparatus in the foregoing embodiments of this application. The first apparatus 23 may include a processing module 2301 and a transceiver module 2302. The processing module 2301 may be configured to perform all operations, except sending and receiving operations, performed by the first apparatus in the embodiment shown in FIG. 20, for example, S201, S202, and S203, and/or configured to support another process of the technology described in this specification. The transceiver module 2302 may be configured to perform all sending and receiving operations performed by the first apparatus in the embodiment shown in FIG. 20, for example, the operation of sending the priority of the fourth time-frequency resource to the communications apparatus, and/or configured to support another process of the technology described in this specification.

The processing module 2301 is configured to obtain a detection result for at least one object. The detection result includes information about the at least one object.

The processing module 2301 is further configured to obtain a matching degree between the detection result and second information. The second information includes the information about the at least one object.

The processing module 2301 is further configured to determine, based on the matching degree and/or first information, priorities of a plurality of time-frequency resources included in the first time-domain range. The first information includes the second information, and the first information further includes information about a radar detection apparatus carried on the at least one object.

Information about one object in the information about the at least one object includes at least one of location information or the driving direction of the object. Information about a radar detection apparatus carried on the one of the at least one object includes at least one of a location of the radar detection apparatus in the object or information about a time-frequency resource occupied by the radar detection apparatus.

In an optional implementation, the first apparatus 23 is a radar detection apparatus, and the processing module 2301 is configured to obtain the detection result for the at least one object in the following manner: performing detection on the at least one object, and obtaining the detection result. Alternatively, the first apparatus 23 is a processing apparatus, and the processing module 2301 is configured to obtain the detection result for the at least one object in the following manner: receiving, by using the transceiver module 2302, the detection result from a radar detection apparatus.

In an optional implementation, the first apparatus 23 is a radar detection apparatus, and the processing module 2301 is configured to obtain the matching degree between the detection result and the second information in the following manner:

performing matching between the detection result and the obtained second information, to obtain the matching degree between the detection result and the second information; or sending, by using the transceiver module 2302, the detection result to the processing apparatus, and receiving, by using the transceiver module 2302, third information from the processing apparatus, where the third information is used to indicate the matching degree between the detection result and the second information.

In an optional implementation, the first apparatus 23 is a processing apparatus, and the processing module 2301 is configured to obtain the matching degree between the detection result and the second information in the following manner: performing matching between the detection result and the obtained second information, to obtain the matching degree between the detection result and the second information.

In an optional implementation, the processing module 2301 is configured to determine, based on the matching degree and/or the first information in the following manner, the priorities of the plurality of time-frequency resources included in the first time-domain range: determining, according to a second rule and based on the matching degree and/or the first information, a priority of a time-frequency resource included in the first time-domain range. The second rule includes one or any combination of the following:

when the matching degree between the detection result and the second information is less than a first threshold, and/or when the first apparatus 23 determines that the first apparatus 23 is subject to interference, lowering a priority of a time-frequency resource currently used by the first apparatus 23; or when a distance between a first object and the first apparatus 23 is greater than a distance between a second object and the first apparatus 23, and/or when a detection range of a first radar detection apparatus carried on the first object and a detection range of a second radar detection apparatus corresponding to the first apparatus 23 have no intersection in space, and a detection range of a third radar detection apparatus carried on the second object and the detection range of the second radar detection apparatus corresponding to the first apparatus 23 have an intersection in space, a priority of a second time-frequency resource is higher than a priority of a third time-frequency resource; or the second time-frequency resource is a time-frequency resource occupied by the first radar detection apparatus carried on the first object, and the third time-frequency resource is a time-frequency resource occupied by the second radar detection apparatus carried on the second object.

In an optional implementation, the first apparatus 23 is a radar detection apparatus.

The processing module 2301 is further configured to determine a fourth time-frequency resource based on the determined priorities. According to the determined priorities, a priority of the fourth time-frequency resource is not lower than a priority of a time-frequency resource other than the fourth time-frequency resource in the plurality of time-frequency resources.

The transceiver module 2302 is further configured to send a second radar signal on the fourth time-frequency resource.

In an optional implementation, the first apparatus 23 is a processing apparatus.

The processing module 2301 is further configured to determine a fourth time-frequency resource based on the determined priorities. According to the determined priorities, a priority of the fourth time-frequency resource is not lower than a priority of a time-frequency resource other than the fourth time-frequency resource in the plurality of time-frequency resources.

The transceiver module 2302 is further configured to send information about the fourth time-frequency resource to a radar detection apparatus. The information about the fourth time-frequency resource is to be used by the radar detection apparatus to send a radar signal.

Optionally, the first apparatus 23 may further include a storage module 2303, configured to store a program instruction and/or data for the processing module 2301 to read.

The optional design may be implemented independently, or may be integrated with any one of the foregoing optional designs for implementation.

Figure 24:
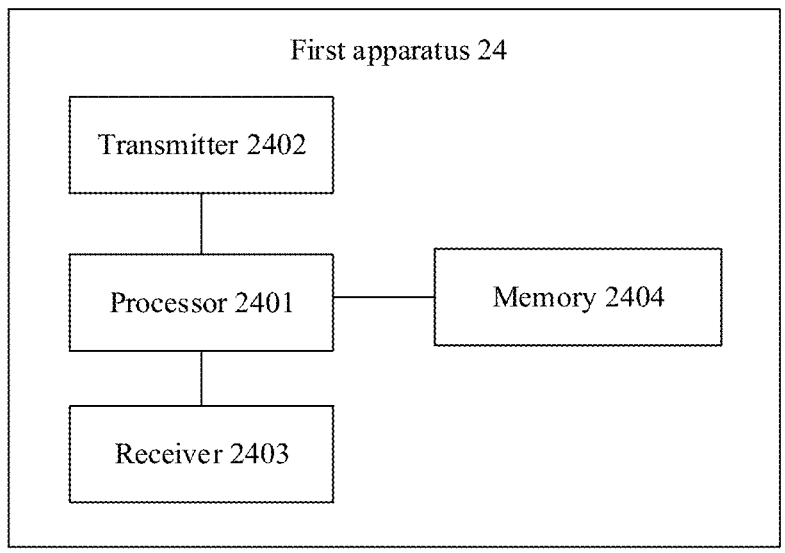
FIG. 24 is a fourth schematic structural diagram of a first apparatus according to an embodiment of this application.

FIG. 24 is another possible schematic structural diagram of a first apparatus according to an embodiment of this application. The first apparatus 24 may include a processor 2401, a transmitter 2402, and a receiver 2403. A function of the processor 2401 may correspond to a specific function of the processing module 2301 shown in FIG. 23, and functions of the transmitter 2402 and the receiver 2403 may correspond to specific functions of the transceiver module 2302 shown in FIG. 23. Details are not described herein again. Optionally, the first apparatus 24 may further include a memory 2404, configured to store a program instruction and/or data for the processor 2401 to read.

Figure 25:
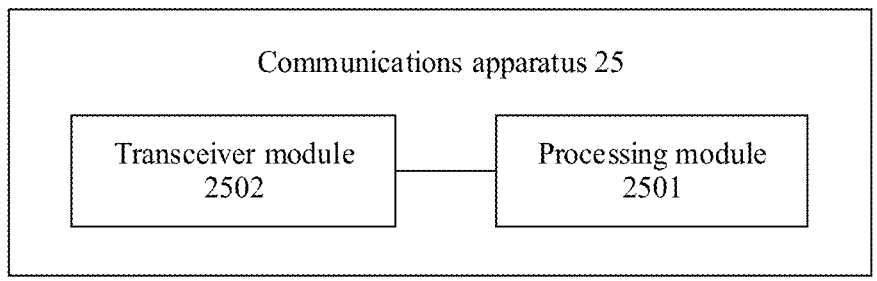
FIG. 25 is a first schematic structural diagram of a communications apparatus according to an embodiment of this application.

For example, when functional modules of the communications apparatus are divided through integration, FIG. 25 is a possible schematic structural diagram of the communications apparatus in the foregoing embodiments of this application. The communications apparatus 25 may include a processing module 2501 and a transceiver module 2502. The processing module 2501 may be configured to perform all operations, except sending and receiving operations, performed by the communications apparatus in the embodiment shown in FIG. 18, for example, determining to-be-broadcast content, and/or configured to support another process of the technology described in this specification. The transceiver module 2502 may be configured to perform all sending and receiving operations performed by the first apparatus in the embodiment shown in FIG. 18, for example, the operation of receiving the information from the another communications apparatus or the operation of receiving the information from the processing apparatus or the radar detection apparatus, and/or configured to support another process of the technology described in this specification. Alternatively, the processing module 2501 may be configured to perform all operations, except sending and receiving operations, performed by the communications apparatus in the embodiment shown in FIG. 20, for example, determining to-be-broadcast content, and/or configured to support another process of the technology described in this specification. The transceiver module 2502 may be configured to perform all sending and receiving operations performed by the first apparatus in the embodiment shown in FIG. 20, for example, the operation of receiving the information from the other communications apparatus or the operation of receiving the information from the processing apparatus or the radar detection apparatus, and/or configured to support another process of the technology described in this specification. The transceiver module 2502 may include an interface for communication between the communications apparatus and the processing apparatus, an interface for communication between the communications apparatus and the radar detection apparatus, and an interface for communication between the communications apparatus and the other communications apparatus. The interface used by the communications apparatus to communicate with the processing apparatus and the interface used by the communications apparatus to communicate with the radar detection apparatus may be a same interface, or may be different interfaces. In addition, the interface used by the communications apparatus to communicate with the other communications apparatus and the interface used by the communications apparatus to communicate with the processing apparatus or the radar detection apparatus may be different interfaces. For example, the communications apparatus communicates with the radar detection apparatus or the processing apparatus in a wired manner, but communicates with the other communications apparatus in a wireless manner.

The transceiver module 2502 is configured to receive information about a first time-frequency resource. The information about the first time-frequency resource is information about a time-frequency resource used by a radar detection apparatus corresponding to the communications apparatus and the processing apparatus.

The transceiver module 2502 is further configured to broadcast the information about the first time-frequency resource.

In an optional implementation, the transceiver module 2502 is further configured to broadcast information about an object carrying the communications apparatus and/or information about a radar detection apparatus carried on the object carrying the communications apparatus. The information about the object includes at least one of location information of the object or a driving direction of the object. The information about the radar detection apparatus carried on the object includes a location of the radar detection apparatus in the object.

In an optional implementation, the transceiver module 2502 is further configured to:

receive, from another communications apparatus, information about at least one object and/or information about a radar detection apparatus carried on the at least one object, where information about one of the at least one object includes at least one of location information or a driving direction of the object, and information about a radar detection apparatus carried on the one of the at least one object includes at least one of a location of the radar detection apparatus in the object or information about a time-frequency resource occupied by the radar detection apparatus; and send the received information to the processing apparatus.

Figure 26:
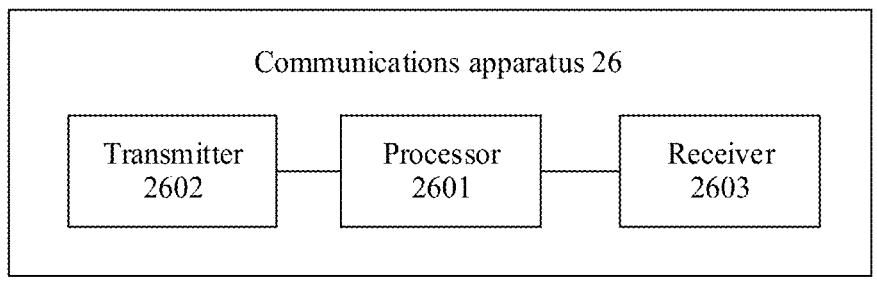
FIG. 26 is a second schematic structural diagram of a communications apparatus according to an embodiment of this application.

FIG. 26 is another possible schematic structural diagram of a communications apparatus according to an embodiment of this application. The communications apparatus 26 may include a processor 2601, a transmitter 2602, and a receiver 2603. A function of the processor 2601 may correspond to a specific function of the processing module 2501 shown in FIG. 25, and functions of the transmitter 2602 and the receiver 2603 may correspond to specific functions of the transceiver module 2502 shown in FIG. 25. Details are not described herein again. Optionally, the first apparatus 26 may further include a memory 2604, configured to store a program instruction and/or data for the processor 2601 to read.

Figure 27:
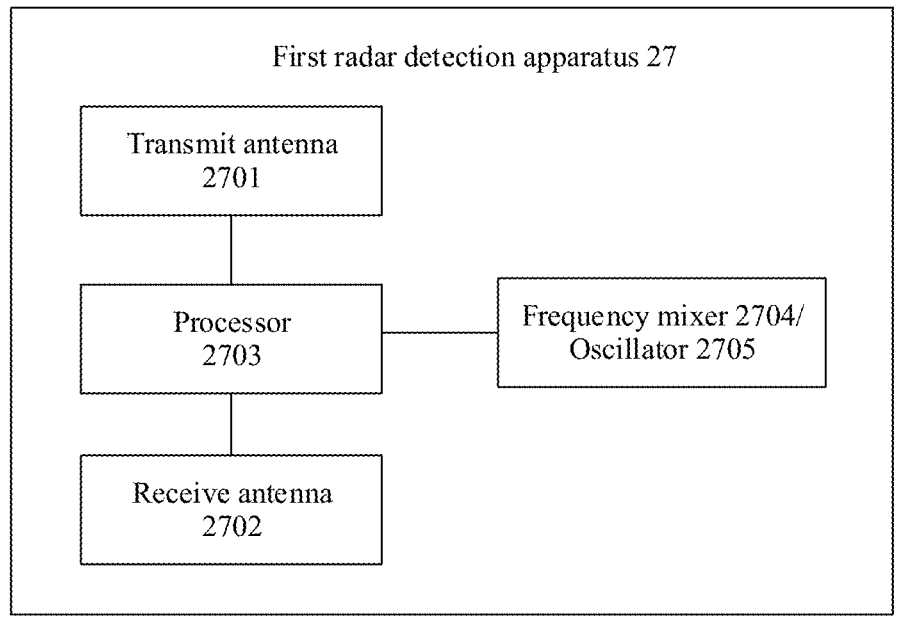
FIG. 27 is another schematic structural diagram of a first apparatus according to an embodiment of this application.

If the first apparatus is a radar detection apparatus, FIG. 27 provides another possible schematic structural diagram of the first apparatus. The first apparatus provided in FIG. 21 to FIG. 24 may be a part or an entirety of a radar apparatus in an actual communication scenario, or may be a functional module integrated into a radar apparatus or located outside a radar apparatus, for example, may be a chip system. This specifically depends on implementation of a corresponding function. A structure and a composition of the first apparatus are not specifically limited.

In this optional manner, the first apparatus 27 includes a transmit antenna 2701, a receive antenna 2702, and a processor 2703. Further, optionally, the first apparatus 27 further includes a frequency mixer 2704 and/or an oscillator 2705. Further, optionally, the first apparatus 27 may further include a low-pass filter, a directional coupler, and/or the like. The transmit antenna 2701 and the receive antenna 2702 are configured to support the detection apparatus in performing radio communication. The transmit antenna 2701 supports transmission of a radar signal, and the receive antenna 2702 supports reception of a radar signal and/or reception of a reflected signal, to finally implement a detection function. The processor 2703 performs some possible determining and/or processing functions. Further, the processor 2703 further controls an operation of the transmit antenna 2701 and/or the receive antenna 2702. The processor 2703 controls the transmit antenna 2701 to transmit a signal that needs to be transmitted, and a signal received by the receive antenna 2702 may be transmitted to the processor 2703 for corresponding processing. The components included in the first apparatus 27 may be configured to cooperate to perform the method provided in the embodiment shown in FIG. 18, or may be configured to cooperate to perform the method provided in the embodiment shown in FIG. 20. Optionally, the first apparatus 27 may further include a memory, configured to store a program instruction and/or data. The transmit antenna 2701 and the receive antenna 2702 may be disposed separately, or may be integrated as a transceiver antenna to perform a corresponding sending/receiving function.

Figure 28:
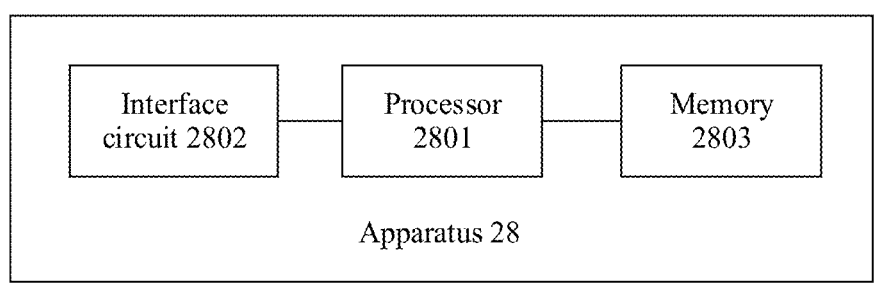
FIG. 28 is a schematic structural diagram of an apparatus according to an embodiment of this application.

FIG. 28 is a schematic structural diagram of an apparatus 28 according to an embodiment of this application. The apparatus 28 shown in FIG. 28 may be a first apparatus, or may be a chip or a circuit that can implement a function of the first apparatus. For example, the chip or the circuit may be disposed in the first apparatus. The apparatus 28 shown in FIG. 28 may include a processor 2801 (for example, the processing module 2101 may be implemented by the processor 2801, and the processor 2201 and the processor 2801 may be, for example, a same component; or the processing module 2301 may be implemented by the processor 2801, and the processor 2401 and the processor 2801 may be, for example, a same component), and an interface circuit 2802 (for example, the transceiver module 2102 may be implemented by the interface circuit 2802, and the transmitter 2202 and the receiver 2203 may be, for example, a same component as the interface circuit 2802; or the transceiver module 2302 may be implemented by the interface circuit 2802, and the transmitter 2402 and the receiver 2403 may be, for example, a same component as the interface circuit 2802). The processor 2801 may enable the apparatus 24 to implement the steps performed by the first apparatus in the method provided in the embodiment shown in FIG. 18, or enable the apparatus 28 to implement the steps performed by the first apparatus in the method provided in the embodiment shown in FIG. 20. Optionally, the apparatus 28 may further include a memory 2803, and the memory 2803 may be configured to store an instruction. The processor 2801 executes the instruction stored in the memory 2803, so that the apparatus 28 implements the steps performed by the first apparatus in the method provided in the embodiment shown in FIG. 18, or the apparatus 28 implements the steps performed by the first apparatus in the method provided in the embodiment shown in FIG. 20.

Further, the processor 2801, the interface circuit 2802, and the memory 2803 may communicate with each other through an internal connection path, to transfer a control signal and/or a data signal. The memory 2803 is configured to store a computer program. The processor 2801 may invoke the computer program from the memory 2803 and run the computer program, to control the interface circuit 2802 to receive a signal or send a signal, so as to perform the steps performed by the first apparatus in the method provided in the embodiment shown in FIG. 18, or perform the steps performed by the first apparatus in the method provided in the embodiment shown in FIG. 20. The memory 2803 may be integrated into the processor 2801, or may be disposed separately from the processor 2801.

Optionally, if the apparatus 28 is a device, the interface circuit 2802 may include a receiver and a transmitter. The receiver and the transmitter may be a same component, or may be different components. When the receiver and the transmitter are a same component, the component may be referred to as a transceiver.

Optionally, if the apparatus 28 is a chip or a circuit, the interface circuit 2802 may include an input interface and an output interface. The input interface and the output interface may be a same interface, or may be different interfaces.

Optionally, if the apparatus 28 is a chip or a circuit, the apparatus 28 may not include the memory 2803, and the processor 2801 may read an instruction (a program or code) from a memory outside the chip or the circuit, to implement the steps performed by the first apparatus in the method provided in the embodiment shown in FIG. 18; or the processor 2801 may read an instruction (a program or code) from a memory outside the chip or the circuit, to implement the steps performed by the first apparatus in the method provided in the embodiment shown in FIG. 20.

Optionally, if the apparatus 28 is a chip or a circuit, the apparatus 28 may include a resistor, a capacitor, or another corresponding functional component, and the processor 2801 or the interface circuit 2802 may be implemented by a corresponding functional component.

In an implementation, a function of the interface circuit 2802 may be implemented by a transceiver circuit or a dedicated transceiver chip. The processor 2801 may be implemented by a dedicated processing chip, a processing circuit, a processor, or a general-purpose chip.

In another implementation, the first apparatus provided in some embodiments of this application may be implemented by a general-purpose computer. In other words, program code for implementing functions of the processor 2801 and the interface circuit 2802 is stored in the memory 2803, and the processor 2801 implements the functions of the processor 2801 and the interface circuit 2802 by executing the program code stored in the memory 2803.

The aforementioned functions and actions of the modules or the units in the apparatus 28 are merely examples for description. The functional units in the apparatus 28 may be configured to perform the actions or the processing processes performed by the first apparatus in the embodiment shown in FIG. 18, or may be configured to perform the actions or the processing processes performed by the first apparatus in the embodiment shown in FIG. 20. To avoid repetition, detailed descriptions thereof are omitted herein.

In further another implementation, when software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

It should be noted that the processor in the embodiments of this application may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. Alternatively, if the first apparatus is a processing apparatus, the processing apparatus may directly be a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in this application. The processor apparatus may be a combination of processors implementing a computing function, for example, a combination of one or more microprocessors, or a combination of the DSP and a microprocessor.

Method or algorithm steps described in combination with the embodiments of this application may be implemented by hardware, or may be implemented by a processor by executing a software instruction. The software instruction may include a corresponding software module. The software module may be stored in a random access memory (RAM), a flash memory, a read-only memory (ROM) memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in the ASIC. In addition, the ASIC may be located in the first apparatus. Certainly, the processor and the storage medium may exist in the first apparatus as discrete components.

It can be understood that FIG. 21 to FIG. 24 or FIG. 28 merely show simplified designs of the first apparatus. In actual application, the first apparatus may include any quantity of transmitters, receivers, processors, controllers, memories, and other elements that may exist.

An embodiment of this application further provides a communications system. The communications system includes the radar detection apparatus and the communications apparatus that are mentioned in the foregoing embodiments of this application, or includes the radar detection apparatus and the processing apparatus, or includes the radar detection apparatus, the communications apparatus, and the processing apparatus. The communications system may be a device, and each apparatus is located in the device and serves as a functional module of the device. Alternatively, the communications system may include a plurality of devices, and the first apparatus, the communications apparatus, and the like are separately located in different devices.

The foregoing descriptions about implementations allow a person skilled in the art to clearly understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely exemplary. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a ROM, a RAM, a magnetic disk, or an optical disc.

The foregoing descriptions are merely specific implementations of the embodiments of this application, but are not intended to limit the protection scope of the embodiments of this application. Any variation or replacement within the technical scope disclosed in this application shall fall within the protection scope of the embodiments of this application. Therefore, the protection scope of the embodiments of this application shall be subject to the protection scope of the claims.

What is claimed is:

1. A communication method, comprising:
receiving, by a first apparatus, first information from a second apparatus;
determining, by the first apparatus based on the first information, priorities of a plurality of time-frequency resources comprised in a first time-domain range; and
determining, by the first apparatus, a first time-frequency resource in the plurality of time-frequency resources, wherein a priority of the first time-frequency resource is the highest among the priorities of the plurality of time-frequency resources, and the first time-frequency resource is utilized to send a radar signal.

2. The method according to claim 1, wherein the first time-domain range is one of a plurality of time-domain ranges, and the plurality of time-domain ranges do not overlap in a time domain.

3. The method according to claim 1, wherein:
at least two of the plurality of time-frequency resources overlap in a time domain, or
the plurality of time-frequency resources do not overlap in a frequency domain.

4. The method according to claim 1, wherein:
the first information comprises information about at least one of one or more objects or information about a radar detection apparatus carried on the one or more objects, information about an object of the one or more objects comprising at least one of location information or a driving direction of the object, and information about a radar detection apparatus carried on the object comprising at least one of a location of the radar detection apparatus in the object or information about a time-frequency resource occupied by the radar detection apparatus; or
the first information comprises the priorities of the plurality of time-frequency resources comprised in the first time-domain range.

5. The method according to claim 1, wherein the determining, by the first apparatus based on the first information, the priorities of the plurality of time-frequency resources comprised in the first time-domain range comprises:
determining, by the first apparatus according to a rule and based on the first information, the first priority of the first time-frequency resource comprised in the first time-domain range, wherein the rule comprises:
at least one of when a first distance between a first object and the first apparatus is greater than a second distance between a second object and the first apparatus, or when a first detection range of a first radar detection apparatus carried on the first object and a second detection range of a second radar detection apparatus corresponding to the first apparatus does not have an intersection in space, and a third detection range of a third radar detection apparatus carried on the second object and the second detection range of the second radar detection apparatus corresponding to the first apparatus have an intersection in space, a second priority of a second time-frequency resource is higher than a third priority of a third time-frequency resource, wherein
the second time-frequency resource is occupied by the first radar detection apparatus carried on the first object, and the third time-frequency resource is occupied by the second radar detection apparatus carried on the second object.

6. The method according to claim 1, wherein
the first apparatus is a radar detection apparatus, and the method further comprises: sending, by the radar detection apparatus, a first radar signal on the first time-frequency resource.

7. The method according to claim 1, wherein
the first apparatus is a processing apparatus, and the method further comprises: sending, by the processing apparatus, information about the first time-frequency resource to a radar detection apparatus, wherein the first time-frequency resource is to be utilized by the radar detection apparatus to send the radar signal.

8. The method according to claim 1, wherein
the first apparatus is a radar detection apparatus, and the method further comprises: sending, by the radar detection apparatus, information about the first time-frequency resource to a processing apparatus or a communications apparatus; or
the first apparatus is the processing apparatus, and the method further comprises: sending, by the processing apparatus, information about the first time-frequency resource to the communications apparatus.

9. The method according to claim 1, wherein
the first apparatus is a radar detection apparatus, and after the determining the first time-frequency resource in the plurality of time-frequency resources, the method further comprises: determining, by the radar detection apparatus, that the radar detection apparatus is subject to interference; or
the first apparatus is a processing apparatus, and after the determining the first time-frequency resource in the plurality of time-frequency resources, the method further comprises: receiving, by the processing apparatus, interference indication information from the radar detection apparatus, wherein the interference indication information is utilized to indicate that the radar detection apparatus is subject to interference.

10. The method according to claim 5, wherein the method further comprises:
adjusting, by the first apparatus according to the rule and based on the first information, the priorities of the plurality of time-frequency resources comprised in the first time-domain range, wherein the rule further comprises lowering a priority of a time-frequency resource of the plurality of time-frequency resources currently utilized by the first apparatus.

11. The method according to claim 1, wherein a time-frequency resource of the plurality of time-frequency resources with a comparatively high priority is a time-frequency resource with a comparatively low possibility of a collision.

12. An apparatus, comprising:
one or more processors, and
a storage medium in communication with the one or more processors, the storage medium configured to store program instructions, wherein, when executed by the one or more processors, the instructions cause the apparatus to perform:

receiving first information from a second apparatus;

determining, based on the first information, priorities of a plurality of time-frequency resources comprised in a first time-domain range; and determining a first time-frequency resource in the plurality of time-frequency resources, wherein a priority of the first time-frequency resource is the highest among the priorities of the plurality of time-frequency resources, and the first time-frequency resource is utilized to send a radar signal.

13. The apparatus according to claim 12, wherein the first time-domain range is one of a plurality of time-domain ranges, and the plurality of time-domain ranges do not overlap in a time domain.

14. The apparatus according to claim 12, wherein at least two of the plurality of time-frequency resources overlap in a time domain, or the plurality of time-frequency resources do not overlap in a frequency domain.

15. The apparatus according to claim 12, wherein the first information comprises information about at least one of one or more objects or information about a radar detection apparatus carried on the one or more objects, information about an object of the one or more objects comprising at least one of location information or a driving direction of the object, and information about a radar detection apparatus carried on the object comprising at least one of a location of the radar detection apparatus in the object or information about a time-frequency resource occupied by the radar detection apparatus; or the first information comprises the priorities of the plurality of time-frequency resources comprised in the first time-domain range.

16. The apparatus according to claim 12, wherein the determining, based on the first information, the priorities of the plurality of time-frequency resources comprised in the first time-domain range further comprises:

determining, according to a rule and based on the first information, the first priority of the first time-frequency resource comprised in the first time-domain range, wherein the rule comprises:

at least one of when a first distance between a first object and the first apparatus is greater than a second distance between a second object and the apparatus, or when a first detection range of a first radar detection apparatus carried on the first object and a second detection range of a second radar detection apparatus corresponding to the apparatus do not have an intersection in space, and a third detection range of a third radar detection apparatus carried on the second object and the second detection range of the second radar detection apparatus corresponding to the apparatus have an intersection in space, a second priority of a second time-frequency resource is higher than a third priority of a third time-frequency resource, wherein the second time-frequency resource is occupied by the radar detection apparatus carried on the first object, and the third time-frequency resource is occupied by the second radar detection apparatus carried on the second object.

17. The apparatus according to claim 12, wherein the apparatus is a radar detection apparatus.

18. The apparatus according to claim 12, wherein a time-frequency resource of the plurality of time-frequency resources with a comparatively high priority is a time-frequency resource with a comparatively low possibility of a collision.

19. A non-transitory computer-readable storage medium, wherein the computer-readable storage medium stores a computer program, and when the computer program operates on a computer, the computer is enabled to perform the method of:

receiving first information from a second apparatus;

determining, based on the first information, priorities of a plurality of time-frequency resources comprised in a first time-domain range; and determining a first time-frequency resource in the plurality of time-frequency resources, wherein a priority of the first time-frequency resource is the highest among the priorities of the plurality of time-frequency resources, and the first time-frequency resource is utilized to send a radar signal.

* * * * *